(12) United States Patent
Rotem et al.

(10) Patent No.: US 12,544,065 B2
(45) Date of Patent: Feb. 10, 2026

(54) SUTURING DEVICE AND METHOD FOR ITS USE

(71) Applicant: NOVELRAD LTD., M.P. Hefer (IL)

(72) Inventors: Shachar Rotem, M.P. Hefer (IL); Netanel Sharabani, Rishpon (IL); Ori Goldor, Amikam (IL)

(73) Assignee: NOVELRAD LTD., M.P. Hefer (IL)

( * ) Notice: Subject to any disclaimer, the term of this patent is extended or adjusted under 35 U.S.C. 154(b) by 721 days.

(21) Appl. No.: 17/631,509

(22) PCT Filed: Aug. 10, 2020

(86) PCT No.: PCT/IB2020/057513
§ 371 (c)(1),
(2) Date: Jan. 31, 2022

(87) PCT Pub. No.: WO2021/024236
PCT Pub. Date: Feb. 11, 2021

(65) Prior Publication Data
US 2022/0265268 A1    Aug. 25, 2022

Related U.S. Application Data

(60) Provisional application No. 62/884,493, filed on Aug. 8, 2019.

(51) Int. Cl.
*A61B 17/062* (2006.01)
*A61B 17/00* (2006.01)
*A61B 17/04* (2006.01)

(52) U.S. Cl.
CPC ........ *A61B 17/062* (2013.01); *A61B 17/0483* (2013.01); *A61B 2017/00738* (2013.01); *A61B 2017/00867* (2013.01)

(58) Field of Classification Search
CPC .............. A61B 17/062; A61B 17/0483; A61B 17/06066; A61B 17/06166;
(Continued)

(56) References Cited

U.S. PATENT DOCUMENTS

| 4,440,171 A | 4/1984 | Nomoto et al. |
| 5,389,103 A | 2/1995 | Melzer et al. |

(Continued)

FOREIGN PATENT DOCUMENTS

| CN | 114206230 A | 3/2022 |
| EP | 2230987 B1 | 2/2013 |

(Continued)

OTHER PUBLICATIONS

Japanese Office Action for JP2022500474 Mailed on Apr. 3, 2024.
Japanese Office Action for JP2022-522842 Mailed on May 28, 2024.

*Primary Examiner* — Katherine M Shi
*Assistant Examiner* — Mohammed S Adam
(74) *Attorney, Agent, or Firm* — The Roy Gross Law Firm, LLC; Roy D. Gross

(57) ABSTRACT

A suturing device includes a shuttle for holding a suture, a shuttle transmitter and a shuttle receiver. The shuttle transmitter includes a shuttle holder for holding the shuttle and a shuttle releaser displaceable relative to the shuttle holder for releasing the shuttle from the shuttle holder. The shuttle holder advances through a material at a first location while holding the shuttle until the shuttle engages the shuttle receiver. The shuttle releaser then releases the shuttle from the shuttle holder for withdrawal of the shuttle transmitter through the material, leaving the shuttle engaged with the shuttle receiver. The shuttle transmitter the penetrates the material at a second location opposite the shuttle receiver and retrieves the shuttle, holding it while withdrawing through the material at the second location. This sequence (Continued)

can be repeated to form a wide range of multi-stitch suture patterns for vascular closure and a wide range of other applications.

24 Claims, 45 Drawing Sheets

(58) Field of Classification Search
CPC .......... A61B 17/0625; A61B 17/06004; A61B 17/0482; A61B 17/0469; A61B 2017/00738; A61B 2017/0414; A61B 2017/0477

See application file for complete search history.

(56) References Cited

U.S. PATENT DOCUMENTS

| | | |
|---|---|---|
| 5,478,351 A | 12/1995 | Meade |
| 5,613,974 A | 3/1997 | Andreas et al. |
| 5,814,054 A | 9/1998 | Kortenbach et al. |
| 6,051,006 A | 4/2000 | Shluzas et al. |
| 6,077,276 A | 6/2000 | Kontos et al. |
| 6,136,010 A | 10/2000 | Modesitt et al. |
| 6,245,079 B1 | 6/2001 | Nobles et al. |
| 6,355,050 B1 | 3/2002 | Andreas et al. |
| 6,746,457 B2 | 6/2004 | Dana et al. |
| 6,964,668 B2 | 11/2005 | Modesitt et al. |
| 7,094,246 B2 | 8/2006 | Anderson et al. |
| 7,211,093 B2 | 5/2007 | Sauer et a |
| 7,354,443 B2 | 4/2008 | Moll et al. |
| 7,449,024 B2 | 11/2008 | Stafford et al. |
| 7,601,161 B1 | 10/2009 | Nobles et al. |
| 7,618,425 B2 | 11/2009 | Yamamoto et al. |
| 8,137,364 B2 | 3/2012 | Zung et al. |
| 8,287,556 B2 | 10/2012 | Gilkey et al. |
| 8,313,498 B2 | 11/2012 | Pantages et al. |
| 8,454,631 B2 | 6/2013 | Viola et al. |
| 8,628,545 B2 | 1/2014 | Cabrera et al. |
| 8,641,728 B2 | 2/2014 | Stokes |
| 8,709,020 B2 | 4/2014 | Nobles et al. |
| 8,821,518 B2 | 9/2014 | Saliman et al. |
| 8,870,917 B2 | 10/2014 | Walters et al. |
| 9,265,488 B2 | 2/2016 | Galligan et al. |
| 9,398,907 B2 | 7/2016 | Nobles et al. |
| 9,775,603 B2 | 10/2017 | Kasahara et al. |
| 10,076,323 B2 | 9/2018 | Smith et al. |
| 10,182,804 B2 | 1/2019 | Walters et al. |
| 2003/0025023 A1 | 2/2003 | Rosenfeld |
| 2005/0154403 A1 | 7/2005 | Sauer et al. |
| 2007/0276413 A1 | 11/2007 | Nobles et al. |
| 2009/0005793 A1 | 1/2009 | Pantages et al. |
| 2009/0105752 A1 | 4/2009 | Shonteff et al. |
| 2010/0130990 A1 | 5/2010 | Saliman |
| 2010/0152751 A1* | 6/2010 | Meade .................. A61B 34/30 606/144 |
| 2011/0022063 A1 | 1/2011 | Mcclurg et al. |
| 2011/0028998 A1* | 2/2011 | Adams ............... A61B 17/0482 606/145 |
| 2012/0116366 A1 | 5/2012 | Houser |
| 2013/0245646 A1 | 9/2013 | Lane et al. |
| 2014/0249552 A1 | 9/2014 | Tang |
| 2015/0230790 A1 | 8/2015 | Hashimoto et al. |
| 2016/0066916 A1 | 3/2016 | Overmyer |
| 2017/0086819 A1 | 3/2017 | Raybin et al. |
| 2018/0235604 A1 | 8/2018 | Comee et al. |
| 2019/0142402 A1 | 5/2019 | Larzon et al. |
| 2019/0282226 A1 | 9/2019 | Epstein et al. |

FOREIGN PATENT DOCUMENTS

| | | |
|---|---|---|
| EP | 2083702 B1 | 2/2019 |
| JP | 2001524864 A | 12/2001 |
| JP | 2003-305046 A | 10/2003 |
| JP | 2013525083 A | 6/2013 |
| WO | 2000051498 A1 | 9/2000 |
| WO | 2005070305 A1 | 8/2005 |
| WO | 2015042378 A2 | 3/2015 |
| WO | 2018156603 A1 | 8/2018 |
| WO | 2020057513 A1 | 3/2020 |
| WO | 2021111429 A1 | 6/2021 |

* cited by examiner

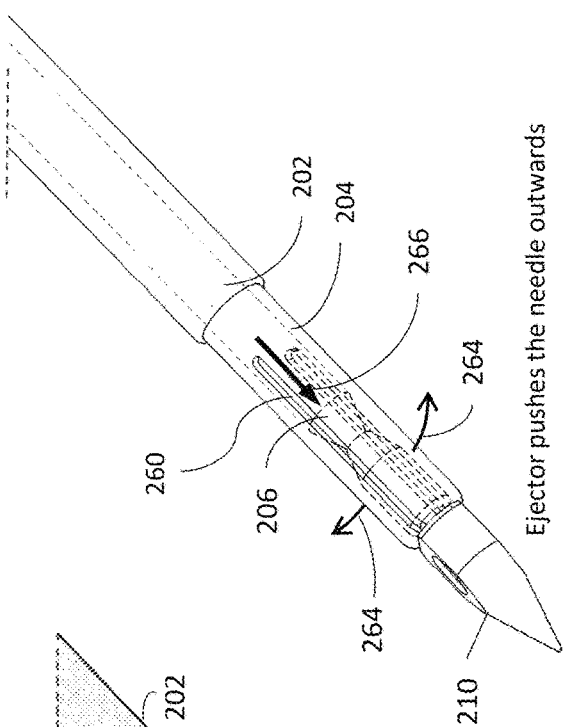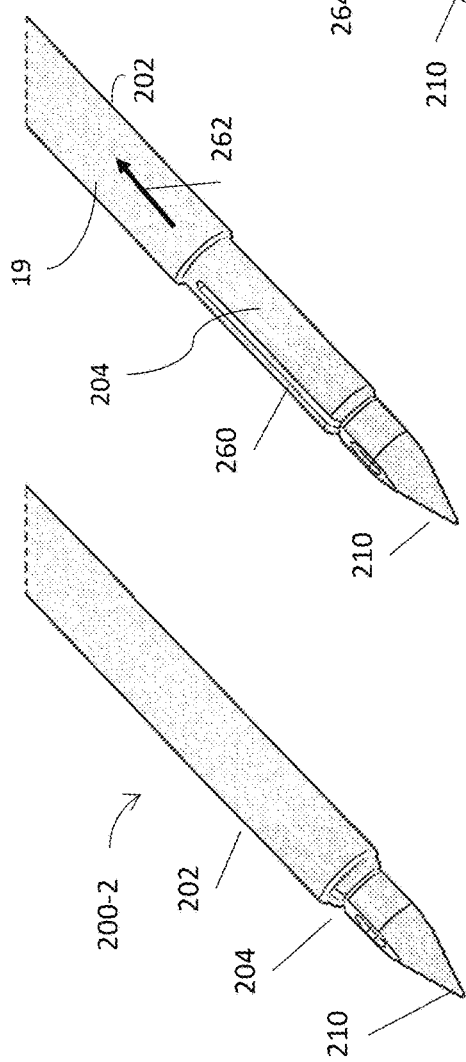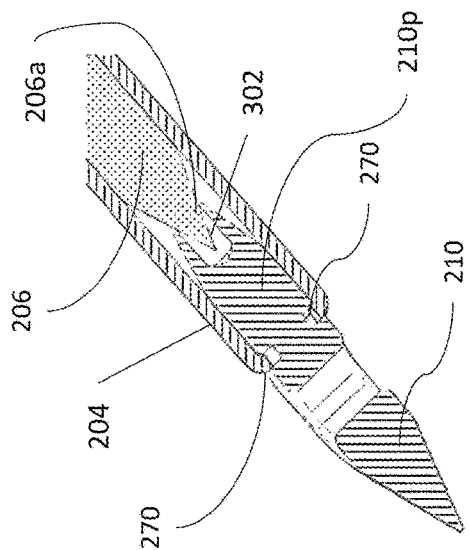

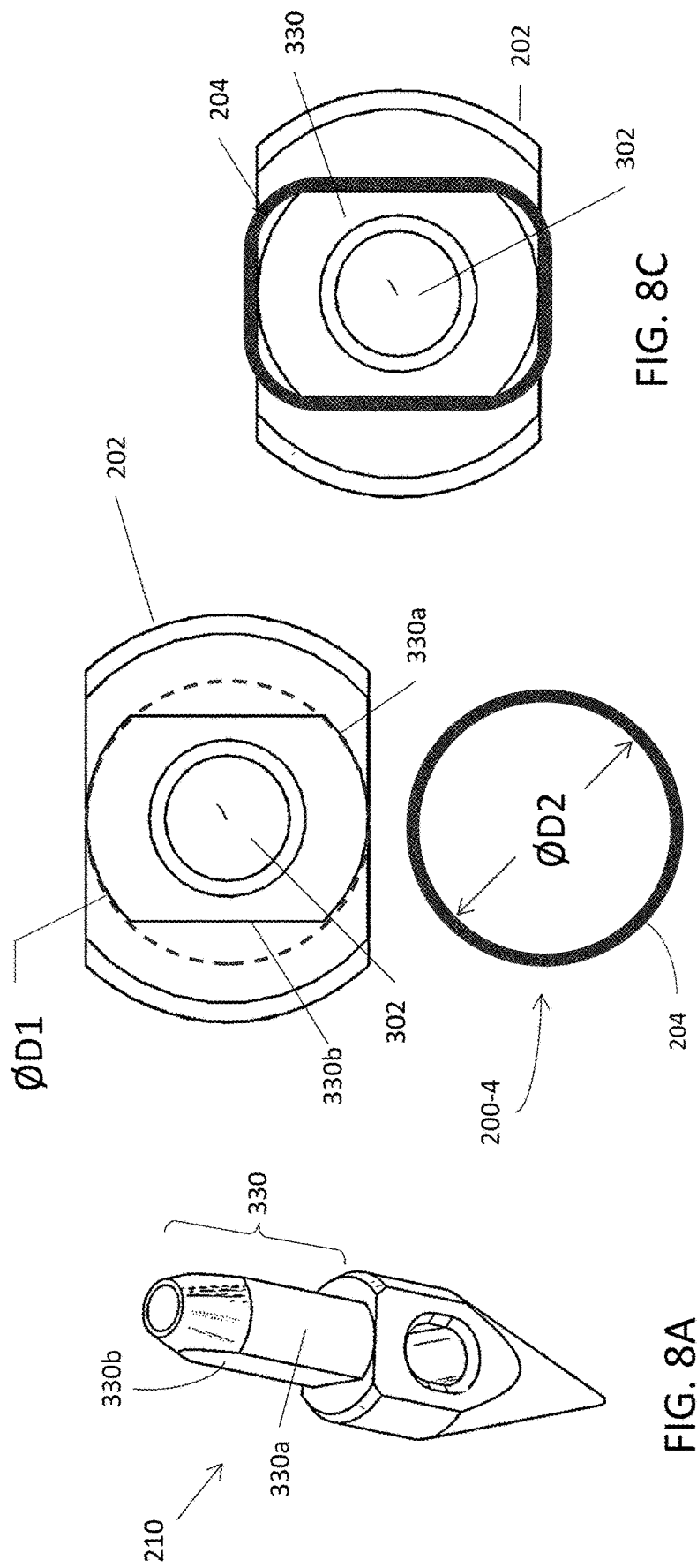

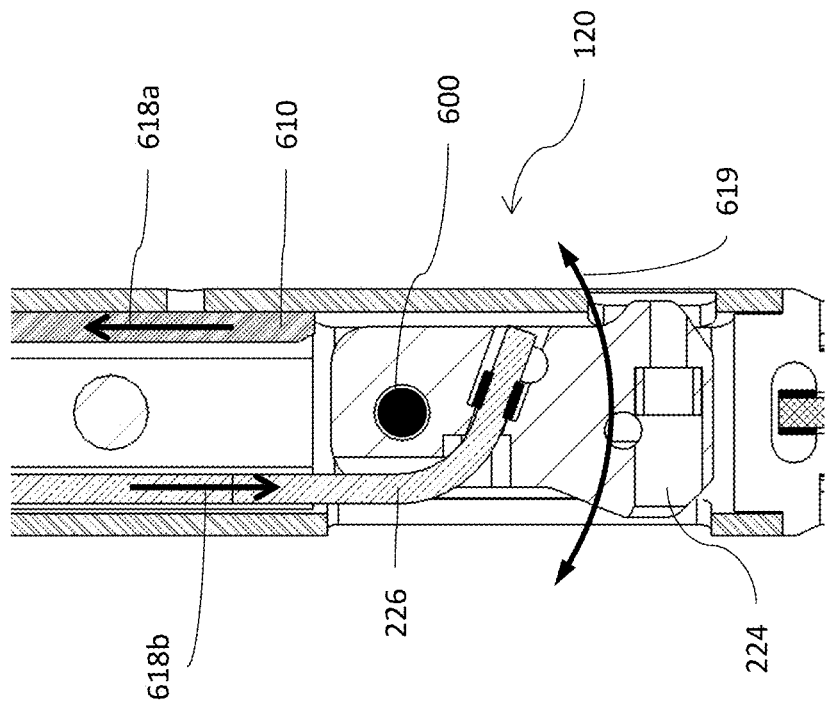
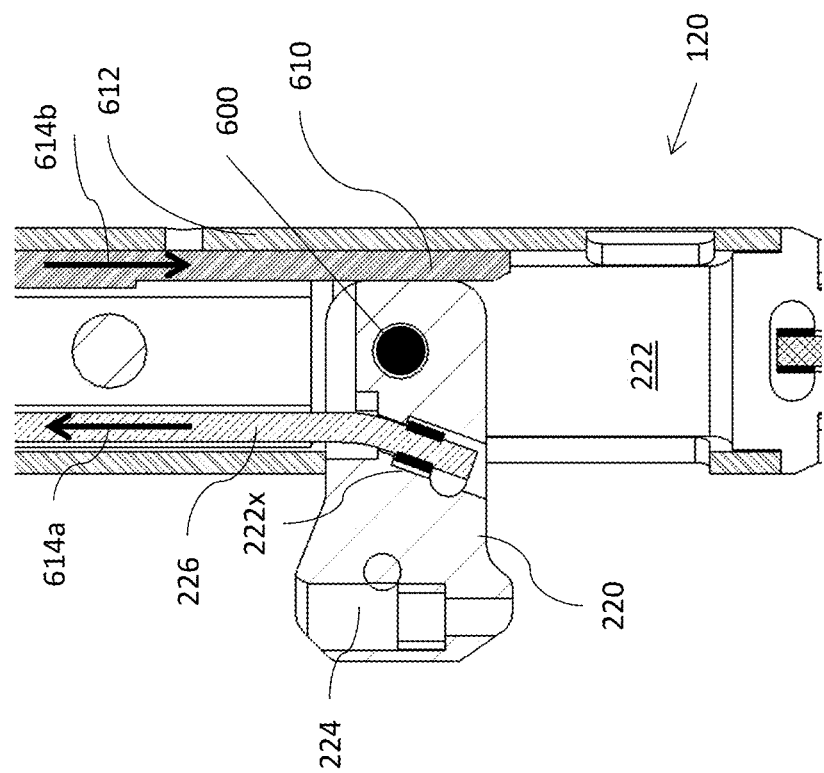
FIG. 15D
FIG. 15C

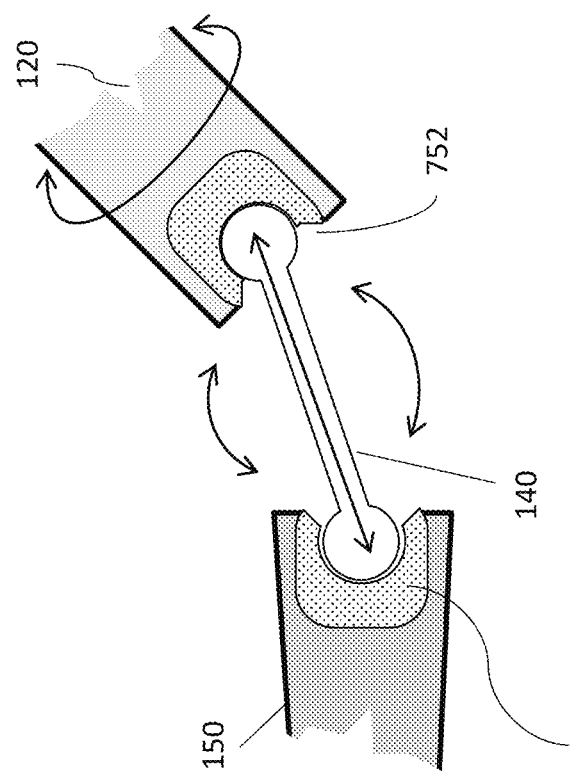
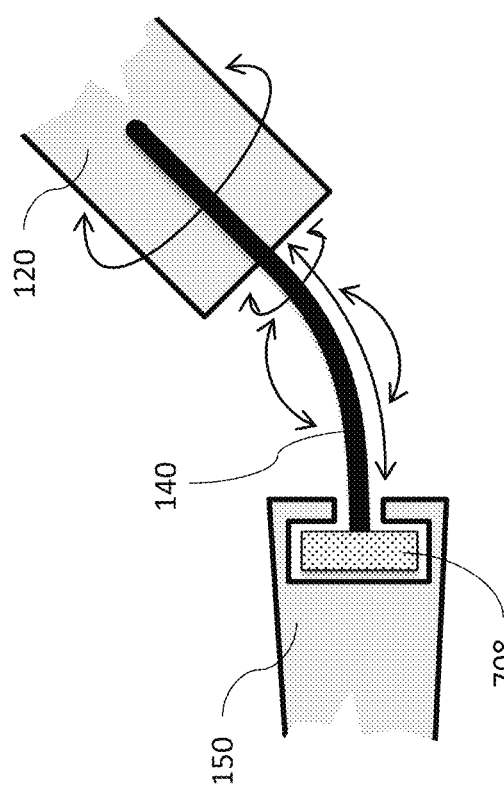
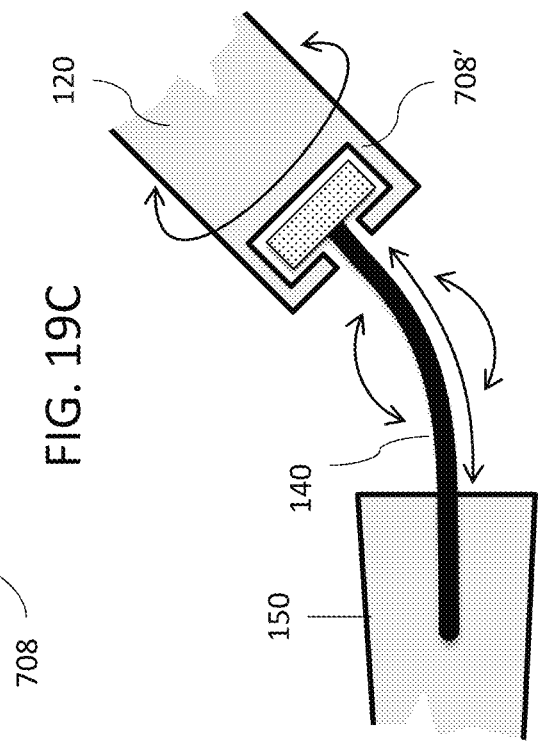
FIG. 19E
FIG. 19C
FIG. 19D

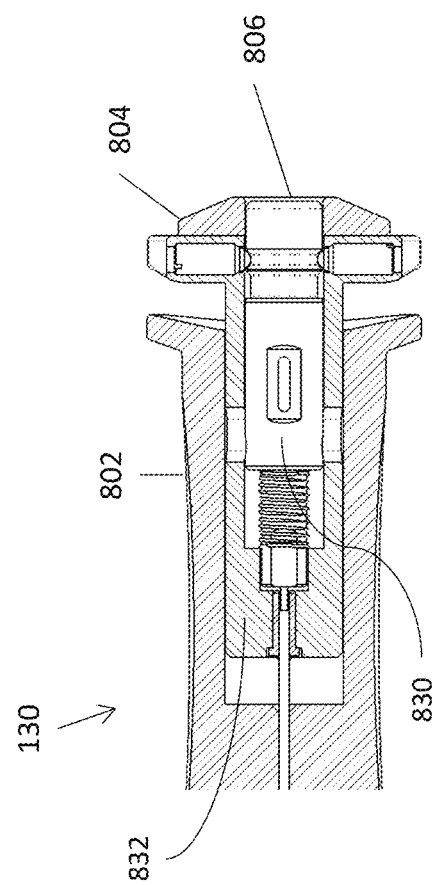
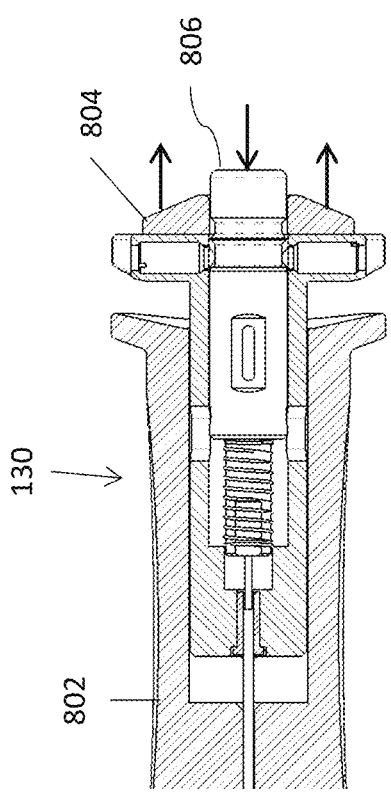
FIG. 20
FIG. 21

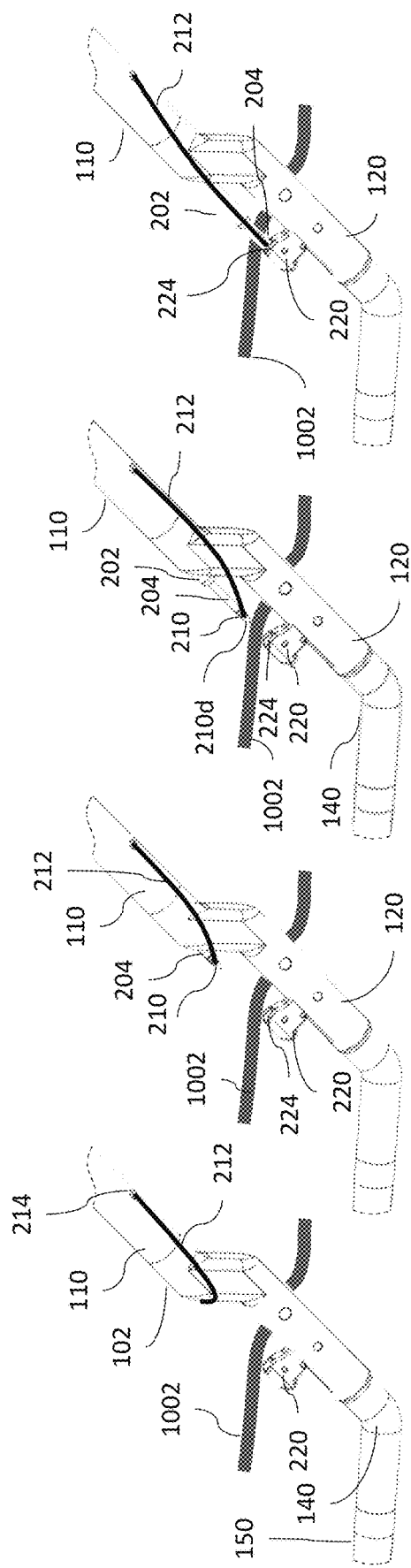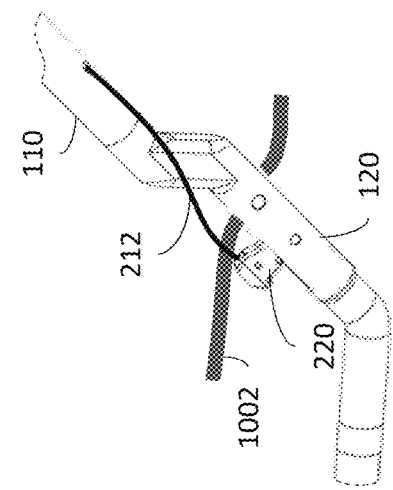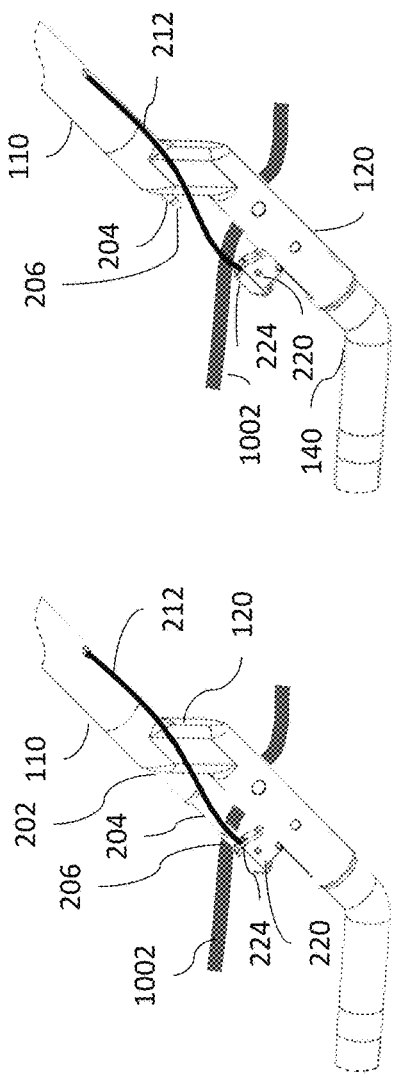

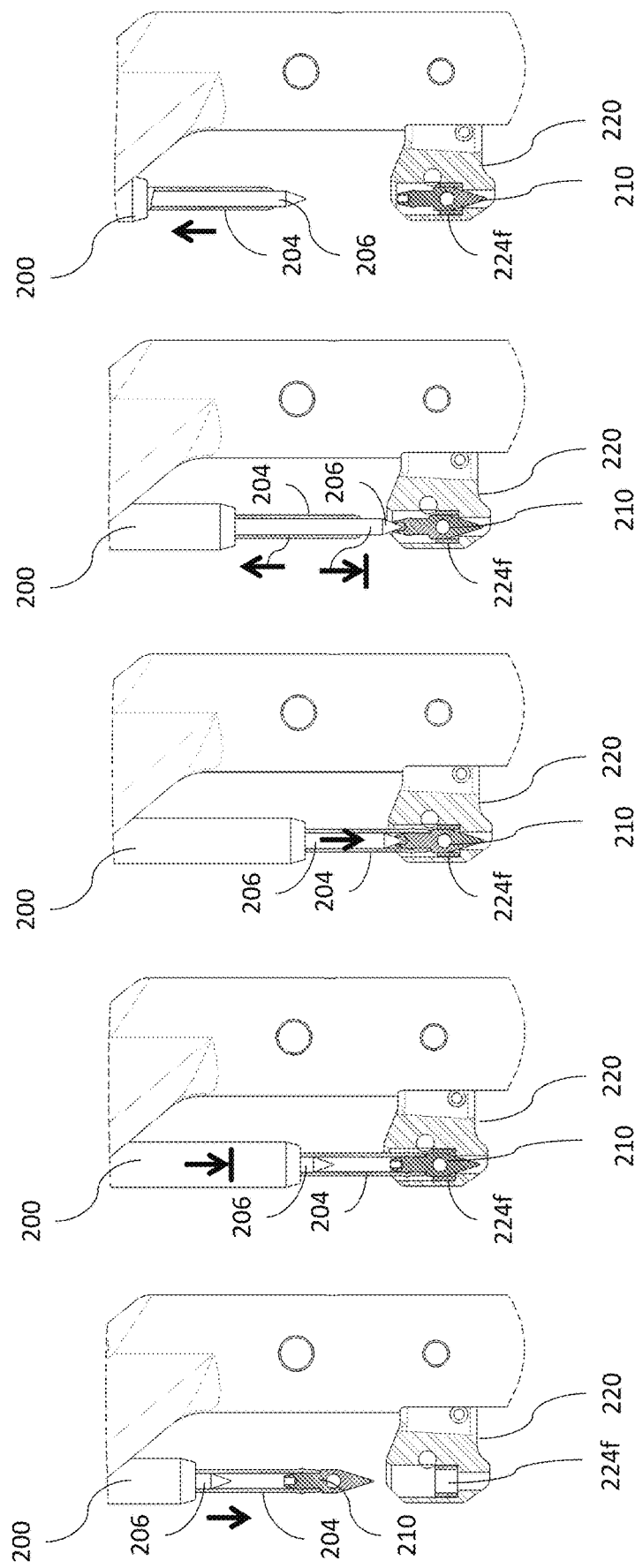

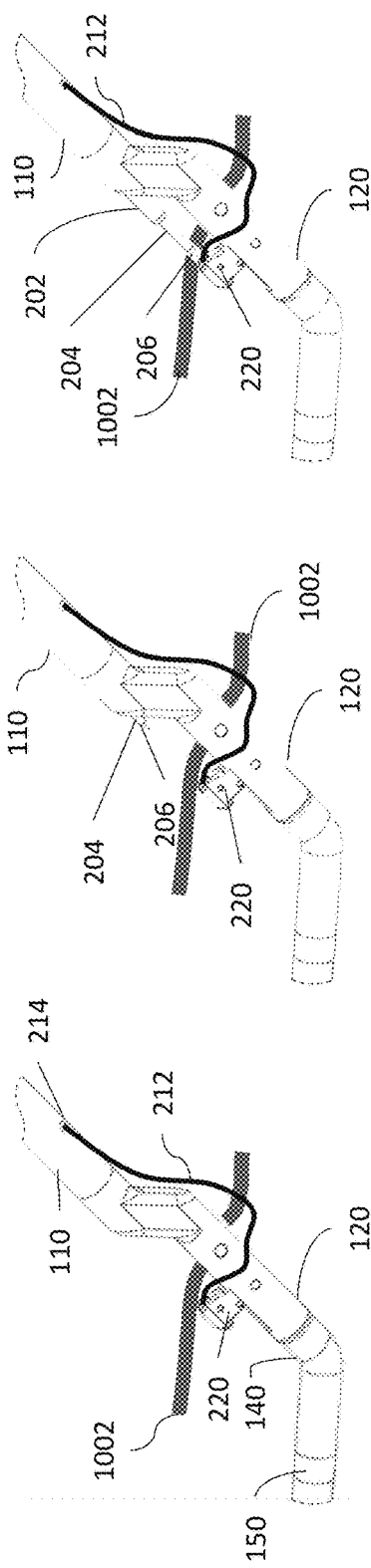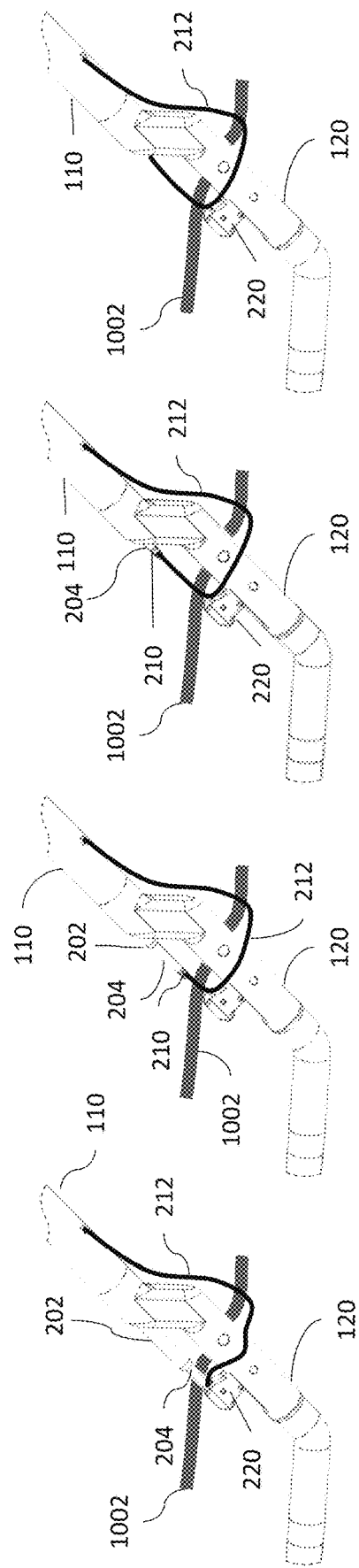

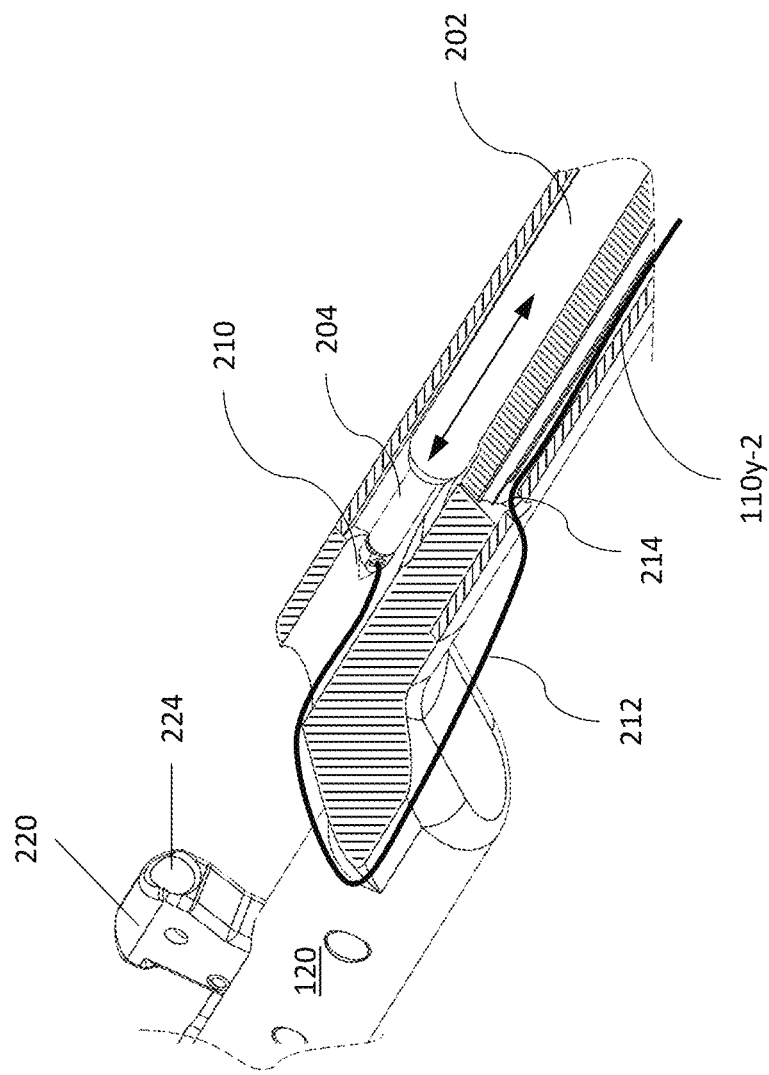

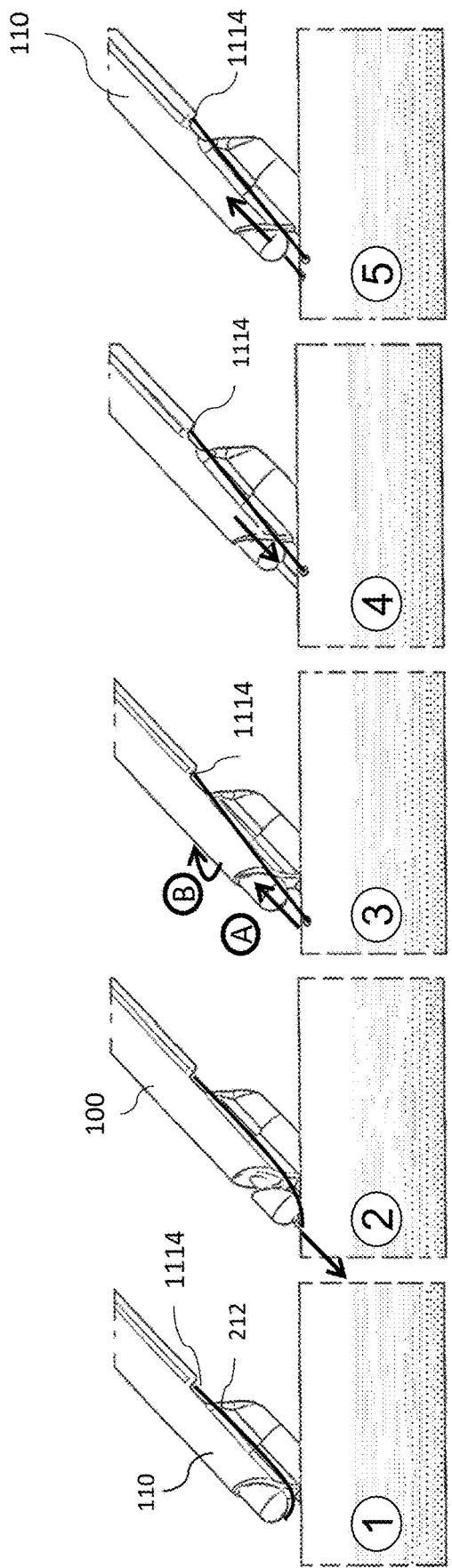

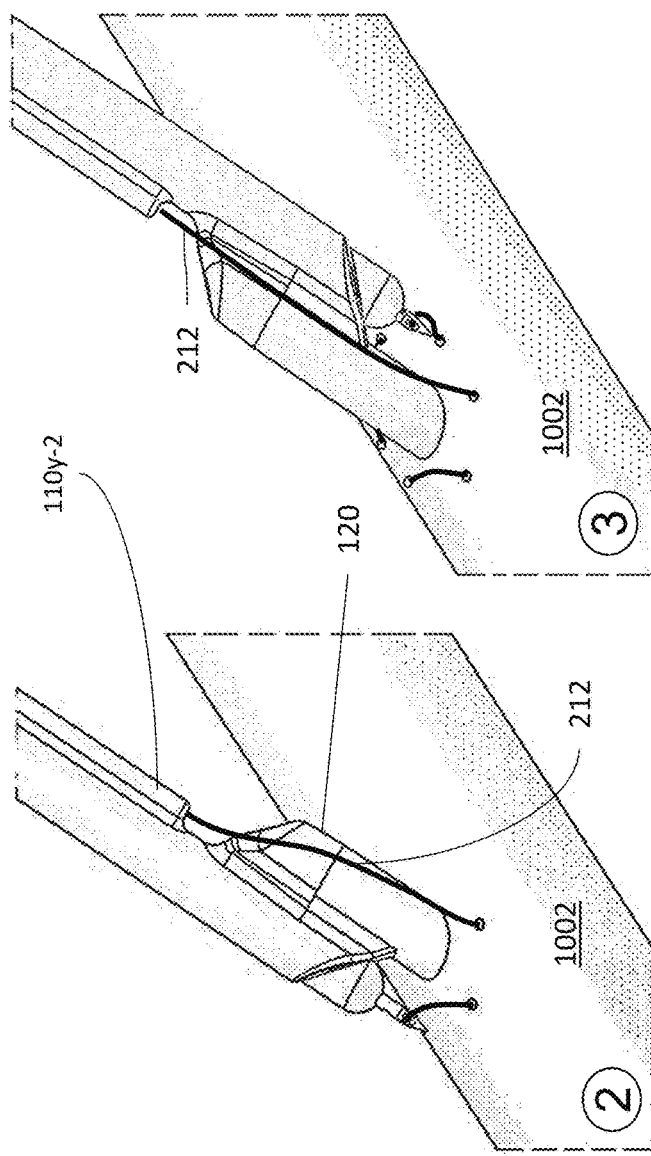
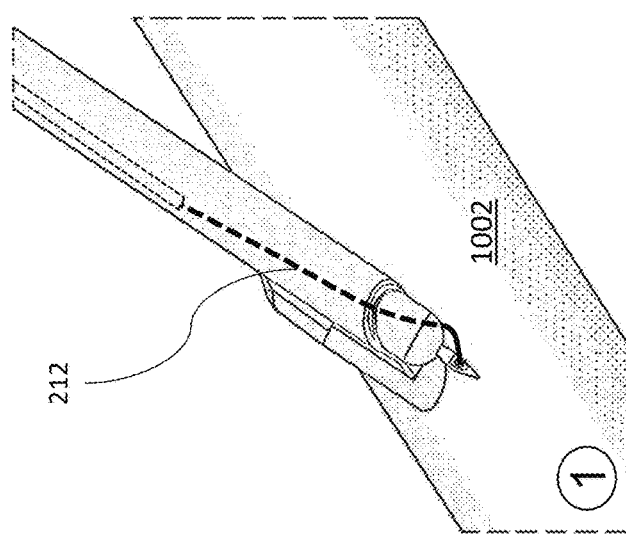
FIG. 30A  FIG. 30B  FIG. 30C

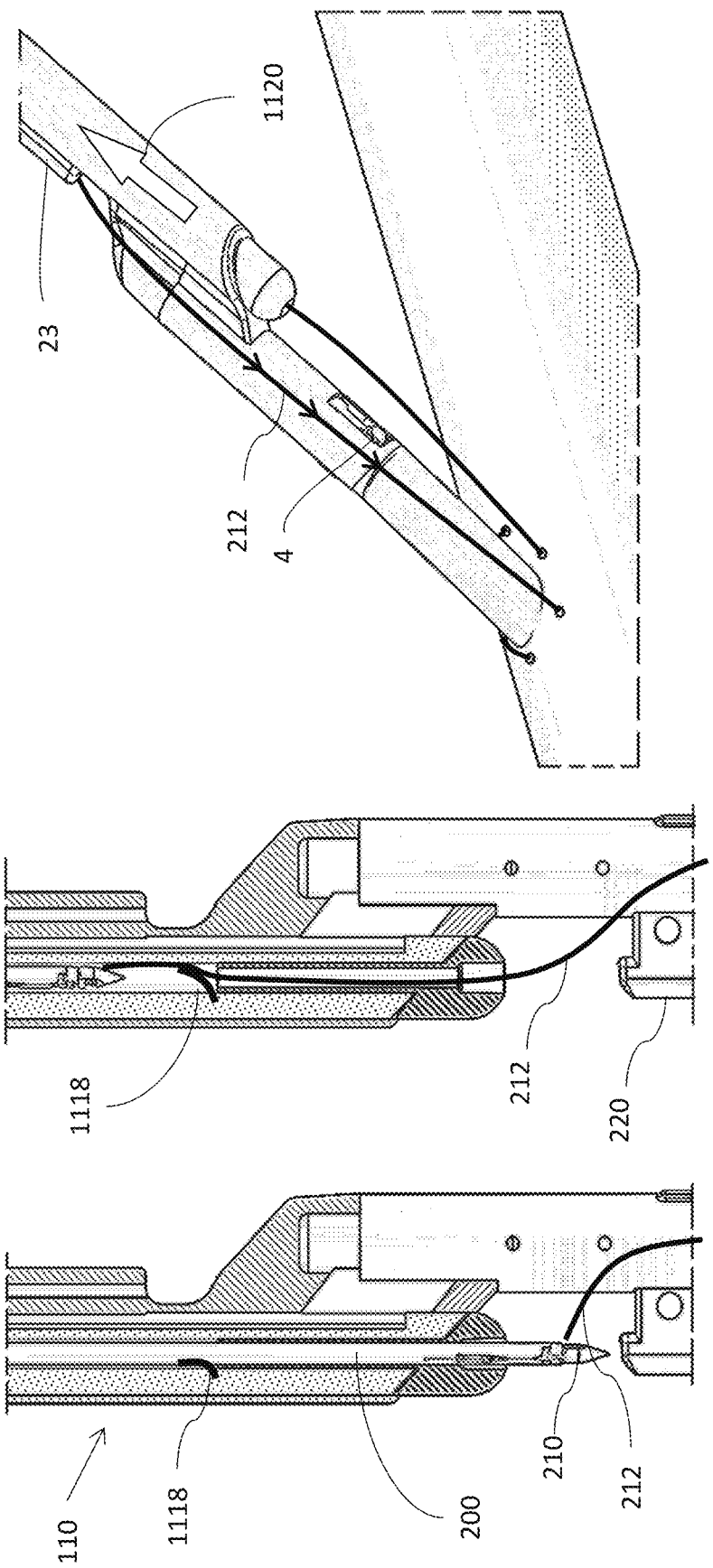

SUTURING DEVICE AND METHOD FOR ITS USE

TECHNICAL FIELD

The disclosure is directed to suturing devices, and in particular suturing devices for suturing applications, such as closing incisions, joining tissues, or regions of tissue, and/or modifying the shape of tissue.

BACKGROUND

Suturing is a common technique, employed for closure of incisions in tissue and vessels, typically made during surgery, and other medical procedures. When various suturing patterns are desired, surgeons must use different suturing devices. Additionally, depending on the suturing operations, especially in small and confined spaces, such as blood vessels, suturing must be by many different tools or manually, requiring high skill levels of the surgeon.

SUMMARY

The disclosed subject matter is directed to a suturing apparatus that performs precise suturing operations, for multiple types of suture stitches, in small and confined surgical spaces, such as blood vessels.

Thus, according to an embodiment of the present invention, there is provided a suturing device for passing a suture through a material at a first location from a first side to a second side of the material and back through the material at a second location from the second side to the first side of the material, the suturing device comprising: (a) a shuttle for holding a suture; (b) a shuttle transmitter comprising a shuttle holder for holding the shuttle and a shuttle releaser displaceable relative to the shuttle holder for releasing the shuttle from the shuttle holder; and (c) a shuttle receiver for receiving the shuttle on the second side of the material, the shuttle holder holding the shuttle so that the shuttle and the shuttle transmitter together form a first penetrating configuration movable so as to advance the shuttle through the material at the first location until the shuttle engages the shuttle receiver, the shuttle releaser releasing the shuttle from the shuttle holder for withdrawal of the shuttle transmitter through the material at the first location leaving the shuttle engaged with the shuttle receiver; the shuttle transmitter presenting a second penetrating configuration with a penetrating tip movable when aligned with the second location opposite the shuttle receiver to penetrate the material at the second location; and the shuttle holder holding the shuttle for withdrawing the shuttle through the material at the second location.

According to a further feature of an embodiment of the present invention, the shuttle has a pointed distal tip for the first penetrating configuration.

According to a further feature of an embodiment of the present invention, the shuttle has a medial region for connection of the suture and a proximal region for engagement with the shuttle holder.

According to a further feature of an embodiment of the present invention, the medial region has at least one recess configured to accommodate a suture within an overall diameter of the shuttle.

According to a further feature of an embodiment of the present invention, the medial region comprises a transverse opening for receiving a part of a suture.

According to a further feature of an embodiment of the present invention, the proximal region has an at least partially conical outer surface, and an axial recess.

According to a further feature of an embodiment of the present invention, the proximal region has an engagement surface comprising a partial cylindrical surface having a first diameter D1 and at least one chamfer surface such that a perimeter of the engagement surface is less than $\pi D1$.

According to a further feature of an embodiment of the present invention, the shuttle holder comprises a tubular element having a diameter D2, where D2 is less than D1, the tubular element being elastically deformable to fit over the engagement surface.

According to a further feature of an embodiment of the present invention, the shuttle holder comprises a tubular element.

According to a further feature of an embodiment of the present invention, the tubular element is formed from a superelastic alloy.

According to a further feature of an embodiment of the present invention, the holder of the shuttle transmitter is formed with at least one resilient feature for engaging the proximal region of the shuttle.

According to a further feature of an embodiment of the present invention, the at least one resilient feature cooperates with the proximal region of the shuttle to provide snap-engagement of the holder with the shuttle.

According to a further feature of an embodiment of the present invention, the releaser is displaceable relative to the holder to disengage the at least one resilient feature from the shuttle.

According to a further feature of an embodiment of the present invention, there is also provided a bridging portion in mechanical communication with the shuttle transmitter and with the shuttle receiver so as to maintain alignment of the shuttle transmitter with the shuttle receiver.

According to a further feature of an embodiment of the present invention, the shuttle receiver is retractably mounted to the bridging portion.

According to a further feature of an embodiment of the present invention, extension of the shuttle receiver from a retracted position to an extended position is implemented by displacement of an actuator element through a first range of motion, and wherein further displacement of the actuator element beyond the first range of motion locks the shuttle receiver against retraction.

According to a further feature of an embodiment of the present invention, there is also provided a dilator deployed distally to the bridging portion, the dilator being interconnected with the bridging portion via a rotatable and deflectable joint.

According to a further feature of an embodiment of the present invention, there is also provided: a shaft extending proximally from the bridging portion; a bleeder port opening in the bridging portion; and, a bleeder tube extending from the bleeder port opening proximally along the shaft to a bleeder tube outlet.

According to a further feature of an embodiment of the present invention, there is also provided: a suture feed volume in communication with a suture release aperture; and a suture located partially within the suture feed volume and extending from the suture release aperture to the shuttle, the suture being attached to the shuttle, wherein the shuttle transmitter and the shuttle receiver are aligned along a first axis, at least part of the bridging portion being offset from the first axis in a first direction, and wherein the suture release aperture is oriented to face away from the first axis and opens towards the first direction.

According to a further feature of an embodiment of the present invention, the shuttle transmitter has a penetrating portion having a penetrating length for traversing the material at the first and second locations, the penetrating length being larger than a length of the shuttle.

According to a further feature of an embodiment of the present invention, the shuttle transmitter is associated with a flexible shaft.

According to a further feature of an embodiment of the present invention, the shuttle receiver comprises a pocket for receiving the shuttle.

According to a further feature of an embodiment of the present invention, there is also provided a resilient retaining element associated with the pocket and configured for releasably retaining the shuttle within the pocket.

According to a further feature of an embodiment of the present invention, the shuttle transmitter is axially displaceable within a shaft, and wherein the shaft further comprises a shuttle lock effective on withdrawal of the shuttle within the shaft after completion of a suturing process to trap the shuttle within the shaft.

According to a further feature of an embodiment of the present invention, the shuttle transmitter further comprises a preload member selectively displaceable so as to grip the material between the preload member and the shuttle receiver prior to penetration of the shuttle transmitter through the material.

According to a further feature of an embodiment of the present invention, the preload member is deployed concentrically around the shuttle holder.

There is also provided according to an embodiment of the present invention, a suturing method for suturing a material comprising the steps of: (a) providing: (i) a shuttle holding a suture, (ii) a shuttle transmitter configured for selectively holding and releasing the shuttle, the shuttle transmitter when holding the shuttle forming a first penetrating configuration, the shuttle transmitter after releasing the shuttle presenting a second penetrating configuration, and (iii) a shuttle receiver for receiving the shuttle; (b) advancing the shuttle transmitter in the first penetrating configuration so that at least the shuttle penetrates the material at a first location and engages the shuttle receiver; (c) releasing the shuttle from the shuttle transmitter and withdrawing the shuttle transmitter from the material without the shuttle; (d) repositioning the shuttle transmitter and the shuttle receiver so that the shuttle transmitter and the shuttle are aligned on opposite sides of the material at a second location; (e) advancing the shuttle transmitter in the second penetrating configuration so as to penetrate the material at the second location in a direction towards the shuttle; (f) holding the shuttle with the shuttle transmitter and withdrawing the shuttle through the material at the second location, the shuttle drawing with it the suture such that the suture extends into the material at the first location and out of the material at the second location.

According to a further feature of an embodiment of the present invention, steps (b) and (c) are repeated at at least one additional suture entry location on the material and steps (d) and (e) are repeated at at least one additional suture exit location on the material, thereby forming a multi-stitch pattern.

According to a further feature of an embodiment of the present invention, the multi-stitch pattern substantially circumscribes an opening in the material.

According to a further feature of an embodiment of the present invention, the multi-stitch pattern is a purse string suture substantially circumscribing an opening in the material.

According to a further feature of an embodiment of the present invention, the multi-stitch pattern is a spiral suture.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 6A, 6B, 6C, and 6D are perspective views of another alternate suturing module for the suturing apparatus of FIG. 1A;

FIGS. 8A, 8B, and 8C are perspective views of another alternate suturing module for the suturing apparatus of FIG. 1A;

FIGS. 15C, and 15D are cross sectional views of a shuttle receiver and actuation and locking mechanism for the suturing apparatus of FIG. 1A;

FIGS. 19A, 19B, 19C, 19D and 19E are schematic diagrams of the rotational mechanisms of the flexible joint, with respect to the bridging portion of the suturing apparatus;

FIGS. 20 and 21 are cross-sectional views through the handle of the suturing apparatus of FIG. 1A, illustrating the device in two states of operation corresponding to a holding state and a releasing state of the shuttle transmitter, respectively;

FIGS. 23A-23G are diagrams of an operational sequence for shuttle (needle) insertion;

FIGS. 24A-24F are perspective views of a shuttle in a suture anchoring operation;

FIGS. 25A-25G are diagrams of an operational sequence for shuttle (needle) retraction;

FIG. 25H is a partial cross-sectional view of the suturing apparatus in the position of FIG. 25G;

FIGS. 29A-29E are diagrams of the apparatus with the preload member performing a suturing operation;

FIGS. 30A-30C are diagrams of the apparatus with the preload member showing movement of the suture during a stitching operation; and, FIGS. 31A-31C are diagrams of the apparatus with the preload member retrieving the needle with the suture from the needle receiver.

DETAILED DESCRIPTION OF THE DRAWINGS

Figure 1A:
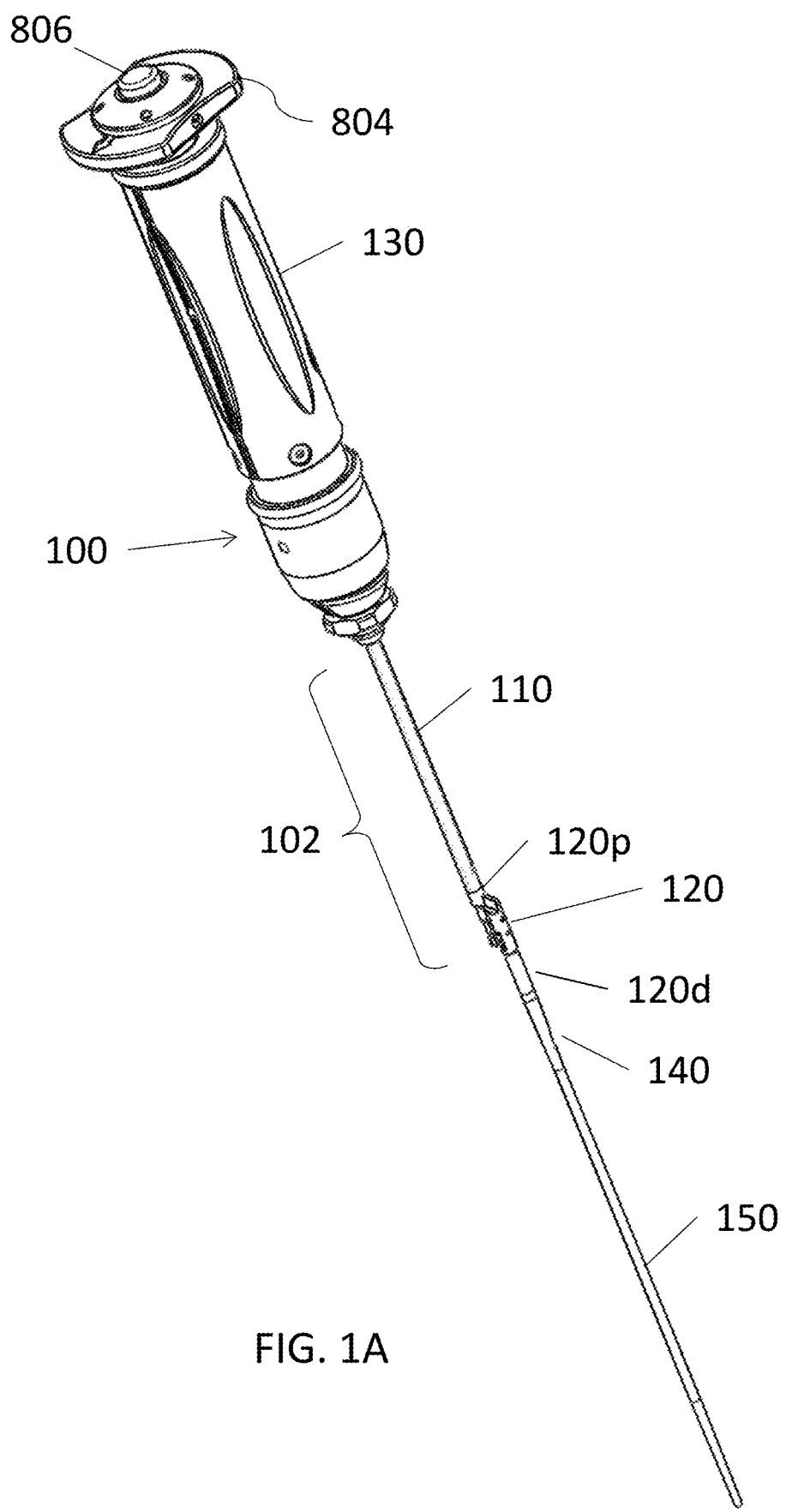
FIG. 1A is a perspective view of a suturing apparatus in accordance with an embodiment of the disclosed subject matter for vascular closure applications.

Before explaining at least one embodiment of the disclosed subject matter in detail, it is to be understood that the disclosed subject matter is not necessarily limited in its application to the details of construction and the arrangement of the components and/or methods set forth in the following description and/or illustrated in the drawings. The disclosed subject matter is capable of other embodiments or of being practiced or carried out in various ways.

Throughout this document, references to directions, such as proximal, distal, inward, outward, inner, outer, upper, lower, up, down, top, bottom, right, left, forward, backward, and the like, are made. These directional references, including their derivatives, are to typical orientations for the apparatus 100, shown in the drawing figures (FIGs.) and/or components thereof. They are exemplary only, and not limiting in any way, as they are for description and explanation purposes.

Before referring to the drawings, by way of introduction, an aspect of the present invention relates to a device and method for suturing a material or materials, for example, in vivo biological tissue as part of a surgical procedure. In general terms, the device and method employ a shuttle, typically in the form of a pointed shuttle needle, to hold a suture, and a shuttle transmitter to selectively hold and release the shuttle. The shuttle transmitter, when holding the shuttle, forms a first penetrating configuration, and after releasing the shuttle, presents a second penetrating configuration. At this second penetrating configuration the shuttle transmitter is typically configured to present a pointed, needle like, end.

The shuttle transmitter manipulates the shuttle from one side of the material, referred to arbitrarily as the proximal side, to perform passes of the suture from the proximal side to the distal side and from the distal side to the proximal side, thereby facilitating a wide range of running stitch patterns. Specifically, a pass from the proximal side to the distal side is performed by advancing the shuttle transmitter in the first penetrating configuration, i.e., while the shuttle is gripped, so that at least the shuttle penetrates the material at a first location, and then releasing the shuttle from the shuttle transmitter, preferably to be held temporarily by a shuttle receiver, and withdrawing the shuttle transmitter from the material without the shuttle. A pass of the suture from the distal side to the proximal side is performed by advancing the shuttle transmitter in the second penetrating configuration, i.e., without the shuttle, for collecting and retrieving the shuttle through the sutured material. The shuttle transmitter penetrates the material at a second location aligned with the shuttle that is temporarily retained in the shuttle receiver, engages and holds the shuttle, and withdraws the shuttle through the material at the second location. During each pass, the shuttle draws with it the suture such that the suture extends into the material at the first location and out of the material at the second location.

The shuttle needle transmitter thus serves as a "Push-Pull Mechanism" (PPM) for the corresponding shuttle needle to perform the following operations:

1. Push the needle through a sutured media.
2. Eject the Needle at the other side of the media or inside the media and retreat without it.
3. Be reconfigured to provide a penetrating end.
4. Re-penetrate the media to reengage/collect the needle and pull/retreat with the needle.

This process of passing the shuttle in alternating directions through the material can be repeated at a series of locations, and allows formation of a wide range of running-stitch suture configurations for a wide range of different applications.

In order to facilitate collection of the shuttle by the shuttle transmitter for a distal-to-proximal pass, both the shuttle and the shuttle transmitter are preferably displaced so as to be aligned with the material at the second location. The shuttle may advantageously be held, and displaced, while released from the shuttle transmitter, by a shuttle receiver which is configured to receive and retain the shuttle. Alignment of the shuttle transmitter and the shuttle receiver on opposite sides of the material to be sutured may be maintained by a bridging portion, which forms a mechanical interconnection between the shuttle transmitter and the shuttle receiver. Various non-limiting examples of each of these structures will be described in detail below.

Aspects of the present invention find a wide range of applications in both non-medical and medical fields. Within the medical field, aspects of the present invention are applicable to a wide range of procedures, whether external/superficial, shallow incisions, minimally invasive procedures, and conventional surgically procedures. By way of one non-limiting set of exemplary preferred implementations, the present invention will be illustrated herein primarily in the context of a vascular closure device. It will be appreciated that this example is only one of a large number of suitable applications for the technology, as will be clear to a person ordinarily skilled in the art. Brief reference will be made below to a number of other non-limiting examples of additional applications.

Turning now to the non-limiting example of FIG. 1A, this shows a suturing apparatus 100 in accordance with an embodiment of the disclosed subject matter particularly adapted for vascular closure applications. The suturing apparatus 100 includes a suturing module 102, formed of an optional shaft 110, with proximal 110*p* and distal 110*d* ends, and a bridging portion 120 extending laterally from the distal end 110*d* of the shaft 110. The bridging portion 120 includes proximal 120*p* and distal 120*d* ends, and connects to the shaft 110 at the proximal end 120*p*. An optional handle 130 is at the proximal end 110*p* of the shaft 110, and is used to manipulate the components of the suturing module 102. A flexible connector 140 extends from the distal end 120*d* of the bridging portion 120, and an optional dilator 150 extends distally from the flexible connector 140. The bridging portion 120 is, for example, connected to the flexible connector 140, so as to be rotatable relative to the flexible connector 140.

Figure 1B:
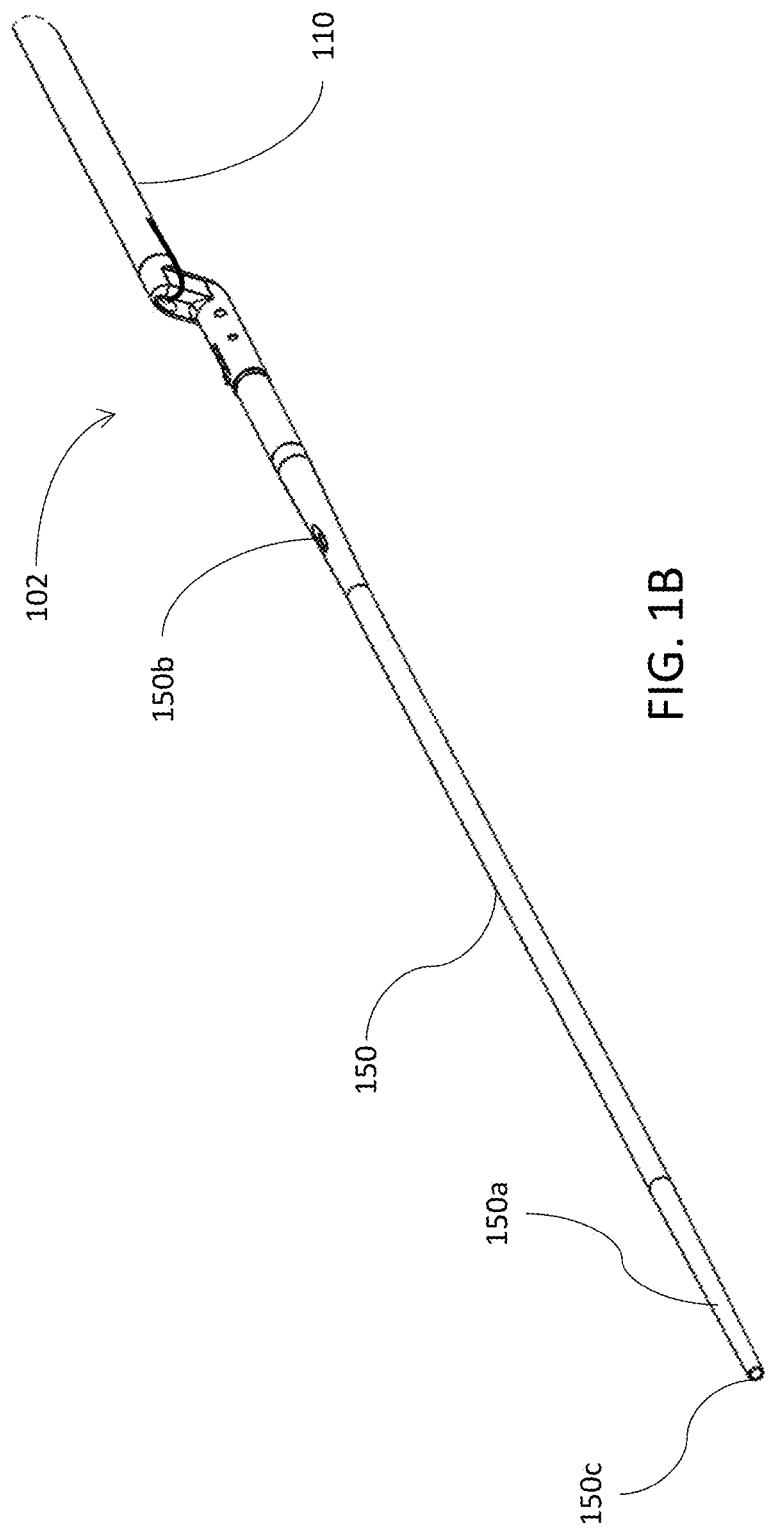
FIG. 1B is an enlarged perspective view of a distal portion of the suturing apparatus of FIG. 1A.

FIG. 1B is an enlarged view of the distal part of suturing apparatus 100, showing the suturing module 102 and an exemplary implementation of the dilator 150 employed for expanding a blood vessel during preparation for the suturing procedure and/or for another procedure to be performed via the vascular access point. The dilator 150 has a distal conical portion 150*a* which facilitates expansion of the blood vessel as inserted. An internal channel extends from a lateral entrance point 150*b* to an aperture at a hollow tip 150*c* of the dilator. This internal channel serves for over-the-wire insertion of the device, in a manner known in the art.

Figure 2A:
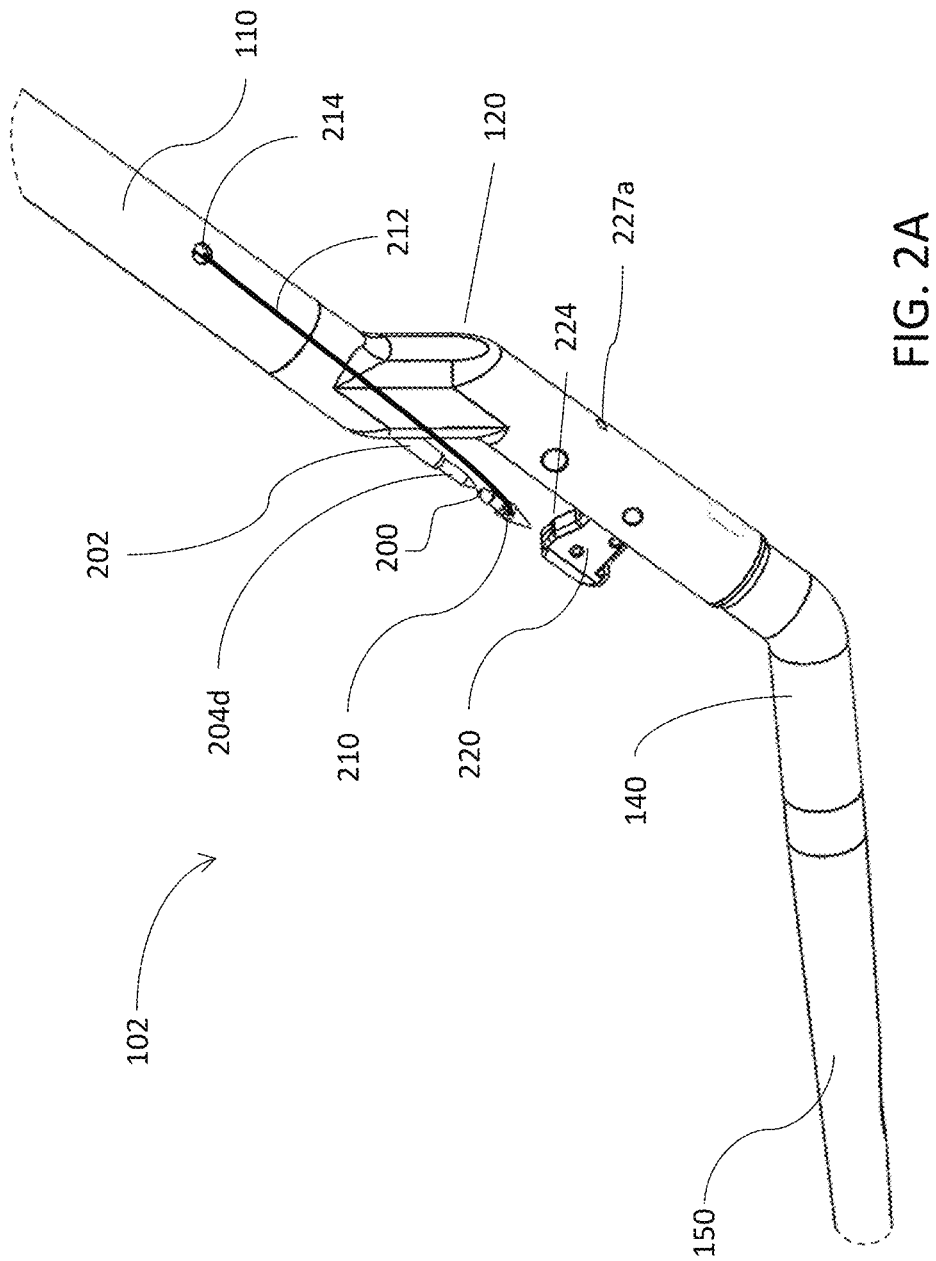
FIGS. 2A and 2B are perspective views of the suturing module of the suturing apparatus of FIG. 1A.
Figure 2B:
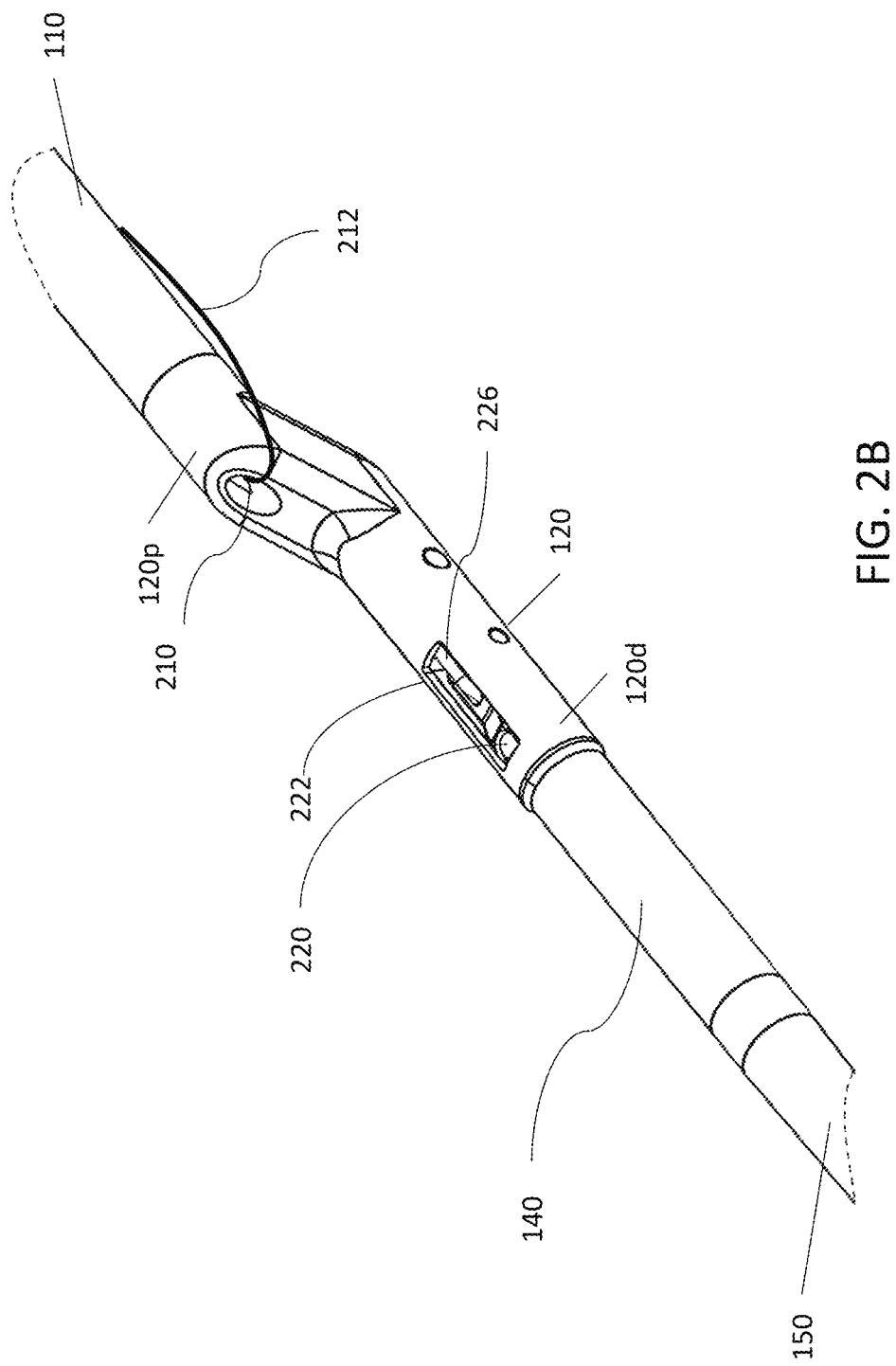
Figure 2C:
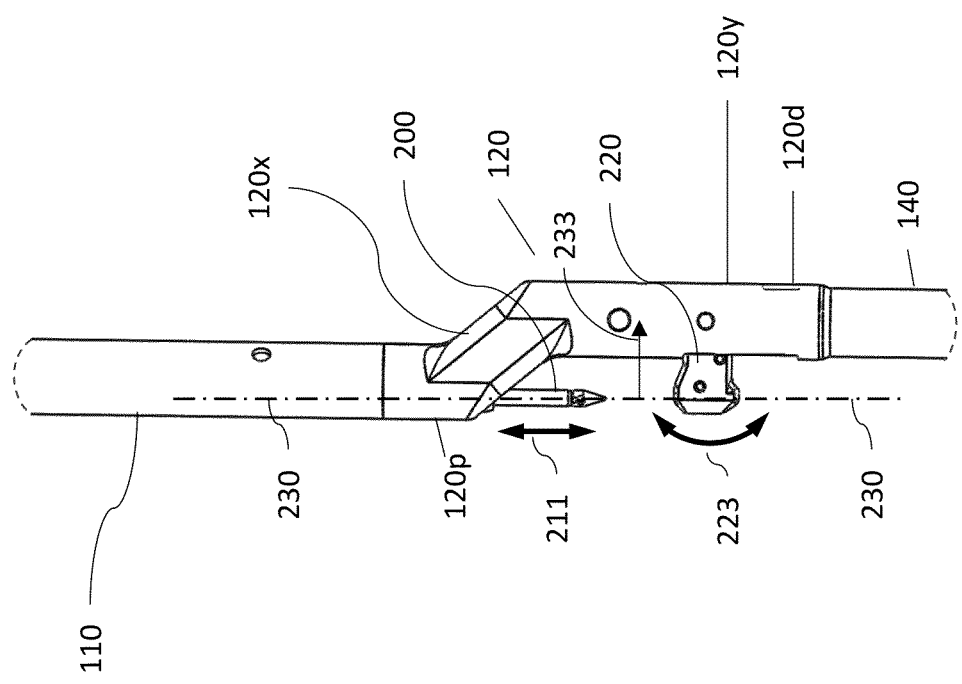
FIG. 2C is a side view of the suturing module of the suturing apparatus of FIG. 1A.

FIGS. 2A-2C, to which attention is also directed, show the suturing module 102 of the suturing apparatus 100 (FIG. 1A). The suturing module or suturing mechanism 102 (these terms used interchangeably herein) includes a shuttle transmitter 200, a shuttle, typically implemented as a shuttle needle 210 (optionally engaged with a suture 212 or suture filament), and a shuttle (needle) receiver 220. The suturing module 102 may be designed and configured to suture media much thicker than the length of the needle 210, as will become clear from the structure and function of the module as detailed below. The shaft 110 supports a shuttle or needle transmitter 200, which is movable proximally and distally within the shaft 110, with this movement controllable by the handle 130, as detailed herein below. The shuttle or needle transmitter 200 may be configured to push and pull the needle 210 through a sutured media (e.g., tissue).

The shuttle 210 is primarily exemplified herein in an implementation where the shuttle has a penetrating point and functions as a needle. Shuttle 210 is thus referred to interchangeably as a "shuttle needle 210", and in some cases simply "needle 210". Likewise, "shuttle transmitter 200" and "shuttle receiver 220" may alternatively be referred to as needle transmitter 200 and needle receiver 220, respectively. It should be noted however that the invention may also be implemented employing a shuttle without a penetrating point, for example as will be discussed below with reference to FIG. 9C, and that all features described herein are equally applicable to such embodiments unless explicitly stated otherwise.

Functionally, needle transmitter 200 includes a shuttle holder for holding the shuttle 210 and a shuttle releaser displaceable relative to the shuttle holder for releasing the shuttle 210 from the shuttle holder. In the non-limiting example illustrated here, as will be further described below with reference to FIGS. 3C-8C, the shuttle holder is implemented as a tubular element (e.g., a tube 204) which engages an external engagement surface of shuttle 210, while the releaser is implemented as a rod 206, displaceable internally within the tubular element. The term "tubular element" is used herein to refer to any hollow element which has a generally tube-like appearance, including but not limited to regular tubes of circular, polygonal or other cross-sectional shape, such tubes with a shaped internal contour for positive engagement and tubes with cut away slots or other features to increase flexibility or provide an engagement configuration. It should be noted that these implementations of the shuttle holder and the shuttle releaser are considered advantageous as being particularly simple and compact, but that substantially any holder arrangement for holding the shuttle 210, externally, internally or via any other suitable mechanical engagement, whether by friction, by mechanical engagement or any other form or retention, may be used. In each case, a corresponding releaser is provided. The releaser may be implemented either as an element which interacts with the holder to neutralize (release) a holding or gripping effect, or may interact directly with the shuttle to eject the shuttle through overcoming retention forces applied by the holder, or some combination of the above.

In the implementation illustrated here, the shuttle transmitter 200 includes a tube 204, and a rod 206, for example, arranged coaxially and, for example, axially displaceably, with respect to each other. The tube 204 is moveable proximally and distally in the shaft 110, with movement controlled, for example, by the handle 130, as detailed below. The rod 206 is moveable proximally and distally within and out of the tube 204, with the movement controlled, for example, by the handle 130, as detailed below.

Tube 204 may advantageously have regions of different dimensions, with a first dimension near its distal end, and a region of increased diameter (or if not circular, increased transverse dimensions) further from its distal end. This facilitates a clearance around shuttle 210 when withdrawn within a guide channel to leave space for the suture alongside the tube (as shown below in FIG. 25H). In the implementation illustrated here, the increased diameter is implemented by providing an additional outer tube 202 external to tube 204. In certain implementations, outer tube 204 is in fixed relation to tube 202, in which case they may alternatively be implemented as a single element formed with a variable external diameter. Alternatively, as described below with reference to FIGS. 6A-6D, outer tube 202 may be displaceable along tube 204 to provide additional functionality related to locking the holder.

The rod 206, in this example, includes a pointed tip 206a at its distal end 206d for piercing tissue in various applications detailed herein. The rod 206 also functions as an ejector (or "releaser") for a shuttle 210. The rod 206 ejects the needle 210 from the transmitter 200, for example, after the needle 210 has been transferred through the sutured media. Ejecting of needle 210 is implemented, for example, after the needle 210 is securely located inside (the pocket 224) of the needle receiver 220. The rod 206 may hold the needle 210 inside the receiver 220 while the needle transmitter 200 is disengaging, optionally retracting through the sutured media, preventing release of needle 210 from the needle receiver 220 during this process. Rod 206 may thus release shuttle needle 210 while it is stationary, due to the relative motion of rod 206 and tube 204. The rod 206 in this example has a sharp suture needle-like shape 206a, as its distal end. Before the needle transmitter 200 is activated, to pass through a sutured media, without the needle 210, for example, to engage the needle 210, located in the needle receiver 220, the ejector 206 is advanced relative to the distal end of tube 204 to provide the aforementioned second penetrating configuration. Additional applications for the rod 206 are detailed below.

At least a penetrating length 229 (FIG. 3B) of needle transmitter 200, typically including the rod (ejector member) 206 and tube 204, possibly with additional elements, typically have a cross-section not larger than the shuttle needle 210. The cross section may in certain applications have a dimension corresponding to a range of USP #4-0 or similar.

The distal end 204d of the tube 204, coupled with the pointed tip 206a of the rod 206, form a holder or engaging mechanism for a shuttle 210, shown being held or engaged by the tube 204. Additionally, the distal end 204d of the tube 204, coupled with the pointed tip 206a of the rod 206, form a releaser or ejector for the shuttle 210 (into a pocket 224 of a shuttle receiver 220), as part of a shuttle 210 ejection and insertion operation, as shown in FIGS. 23A-23G and 24, and detailed below, as well as a mechanism for gripping and engaging the shuttle 210, to remove the shuttle 210 from the pocket 224, as part of a shuttle 210 reconnection and retraction operation, as shown in FIGS. 25A-25G, and detailed below.

Figure 9C:
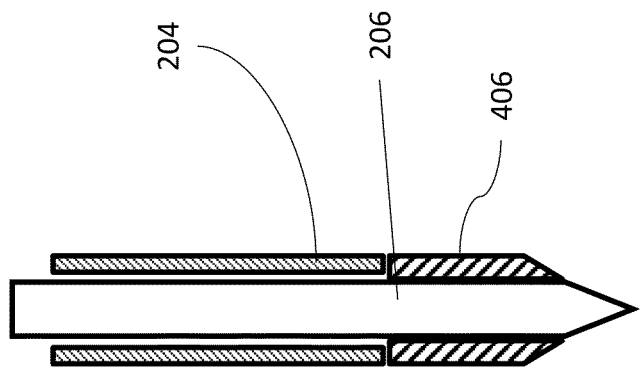
FIGS. 9A, 9B and 9C are diagrams of shuttles, including shuttle needles, for the suturing apparatus of FIG. 1A.

The shuttle 210 is, for example, a shuttle needle, as shown for example in FIGS. 9A and 9B, and detailed below, and a shuttle, as shown in FIG. 9C. The shuttle 210 receives and holds a suture 212, for example, extending from an opening (suture release aperture) 214 in the shaft 110, where it is fed along an internal lumen or otherwise stored in a suture feed volume. The opening 214 is, for example, located on the shaft 110 at the opposite side of the suturing line of action (230 FIG. 2C). As an alternative geometrical definition of this feature, the shuttle transmitter 200 and the shuttle receiver 220 are preferably aligned along a first axis 230, corresponding to the "suturing line of action". At least part of the bridging portion is offset from this first axis in a first direction 233. The suture release aperture 214 is preferably oriented to face away from the first axis and preferably opens towards the first direction. In other words, in intuitive terms, the suture release aperture is located on the "rear" of the device relative to the current suturing line of action, and is optimized for feeding the suture in a direction that is generally away from the current suturing line of action. This preferred positioning of the suture release aperture plays an important role in certain applications and certain suturing patterns for minimizing risk of tangling of the suture about the device as the device is turned during operation. This feature will be better understood with reference to FIGS. 30A-30C, below.

The shuttle transmitter 200, including the outer tube 202, tube 204, and rod 206, with the shuttle 210 attached, is preferably fully retractable into the shaft 110, as shown, for example, in FIG. 2B, as well as extendable from the shaft 110, as shown by the double headed arrow 211 of FIG. 2C. For medical applications, both the tube 204 and the rod 206 are typically made of surgical grade metals, including super elastic and shape memory alloys and materials such as Nitinol, although other metal and non-metallic materials may also be used.

The bridging portion 120 supports a receiver 220, also known as a shuttle receiver, these terms used interchangeably herein, which is, for example, pivotally mounted in a slot 222 of the bridging portion 120, to be retractable into (FIG. 2B) and out of the (FIGS. 2A and 2C) slot 222, as shown by the double headed curved arrow 223 of FIG. 2C. The receiver 220 includes a pocket 224, for receiving the shuttle 210, for example, in a frictional or snap-lock engagement. The frictional engagement is such that the shuttle 210 can be placed into the pocket 224 and held therein, as well as removed from the pocket 222 by the shuttle transmitter 200. The deployment of the receiver 220 is controlled by an actuator 226, which is, for example, a wire which behaves in a spring-like manner, preferably pre-shaped to return to a deflected form when advanced so as to bias the receiver 220 towards a retracted position, inside the slot 222 of the bridging portion 120, and operative to move the receiver 220 to an extended position, projecting outside of the slot 222 of the bridging portion 120 when actuator 226 is pulled. The actuator 226 is, for example, controlled by manipulating the handle 130, as detailed below. The actuator 226 may be made of surgical grade metals, including super elastic and shape memory alloys and materials such as Nitinol.

The bridging portion 120 also preferably includes an opening or port 227a for a bleeder tube 228. The bleeder tube extends to the shaft 110, and a port 227b, through which blood can be detected.

Based on blood being detected, the user can determine that the bridging portion is inside the tissue, for example, the vessel, at the proper surgical site (location).

Also, as shown in FIG. 2C, the bridging portion 120 includes a deflected portion 120x at the proximal end 120p, that generates a lateral offset from the axis of suturing motion 230 in direction 233 for the continuation of bridging portion 120, implemented here as a linear portion 120y. This construction results in a linear line of suturing with a predefined offset between the suture line of action 230 and the center line of the rotation member.

Figures 3A, 3B:
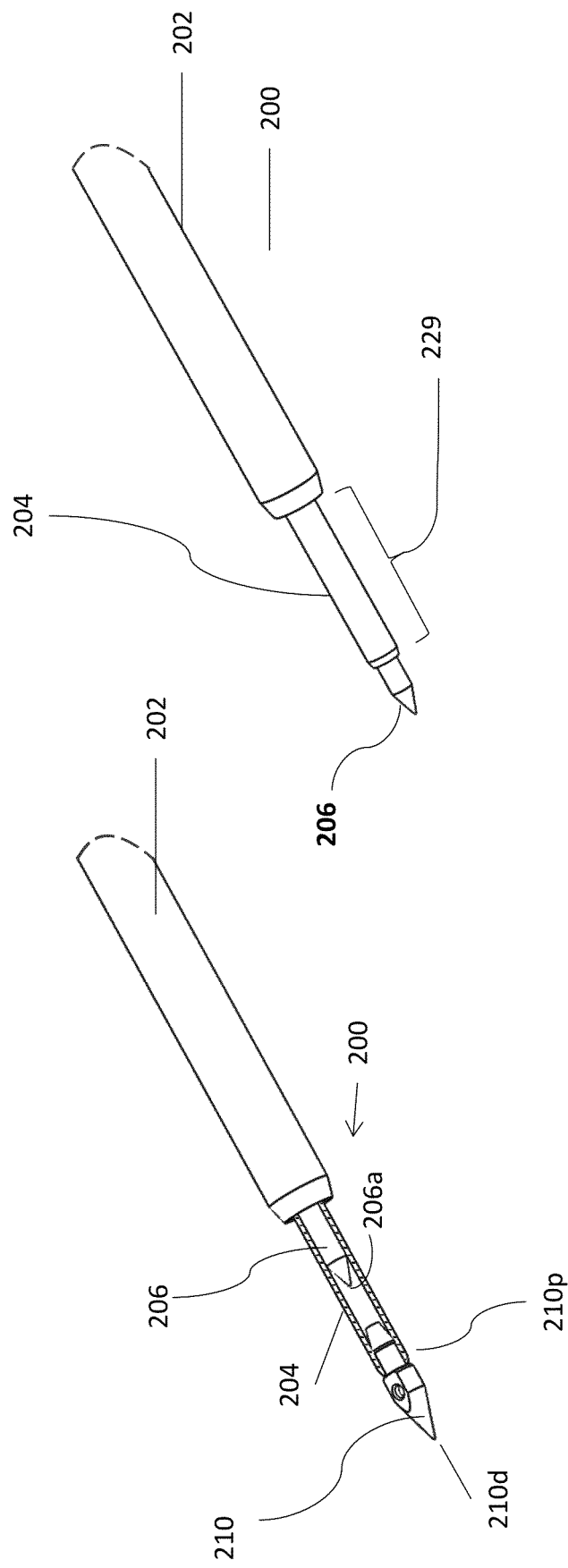
FIGS. 3A, 3B, and 3C are side views of a needle transmitter module of the apparatus of FIG. 1A.
Figure 3C:
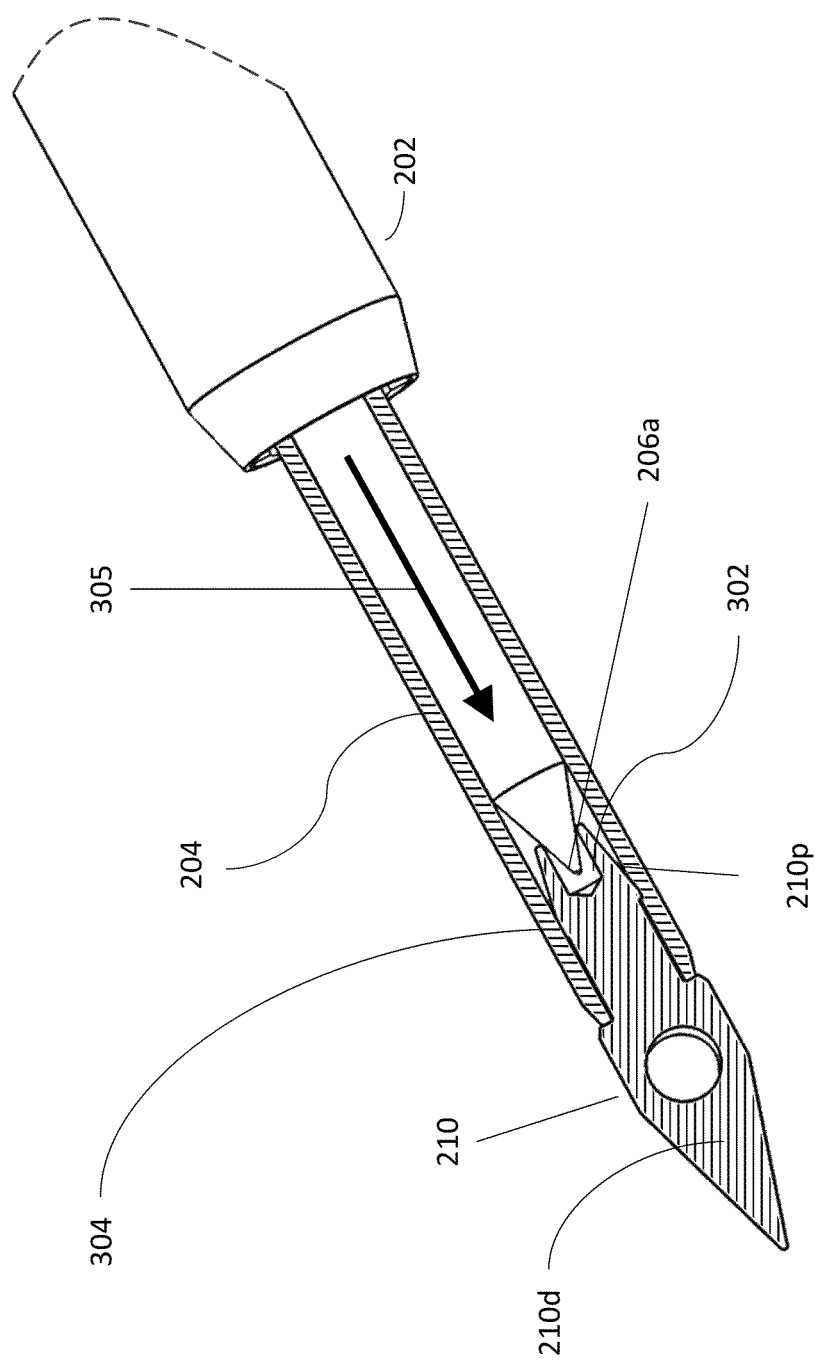

Attention is also directed to FIGS. 3A-3C, which show an embodiment of the shuttle transmitter 200. As shown in FIG. 3A, the outer tube 202 supports the tube 204. The tube 204 is, for example, made of a super elastic alloy, such as Nitinol, and grips the shuttle 210, to engage the shuttle 210, for example, a shuttle needle. The rod 206 is moved distally into contact with the shuttle needle 210, such that its distal pointed tip 206a seats in a recess 302 of the shuttle needle 210, as shown in FIG. 3C. Further distal motion from this position results in the rod 206 functioning as an ejector or releaser, for releasing the shuttle needle 210.

FIG. 3B shows the tube 204, for example, extending from the outer tube 202 to a length typically longer than the sutured media thickness, thereby defining a penetrating length of shuttle transmitter 200 as represented by the square bracket 229. It will be noted that it is primarily this penetrating length which defines the thickness of material (e.g., tissue) which can be sutured using suturing module 102. Accordingly, this penetrating length 229 is typically chosen to be longer than a length of shuttle needle 210, and in certain preferred cases at least twice as long, more preferably at least three times longer, and in many cases, more than 5 times, the length of the shuttle needle. Certain implementations of the present invention are thus able to effect bidirectional suturing through a material having a thickness greater than the length of shuttle needle 210.

The elongated portion of tube 204, designated by numeral 229, together with the overall suture mechanism construction having a parallel line of action relative to the bridge portion described in FIG. 2C provides flexible, axial, position of the suturing device relative to the sutured media. This allows suturing of an access hole in a blood vessel or any suture material thinner than 229, even if the material is thicker than the length of the shuttle needle which is passed back-and-forth (hence the term "shuttle").

FIG. 3C shows a shuttle needle 210 being gripped or engaged by the shuttle transmitter 200, prior to being ejected into a shuttle receiver 220. In this embodiment, the shuttle needle 210 includes an oversize diameter portion 304 at its proximal end 210p, the oversized diameter portion 304 being of a larger diameter than the diameter of the tube 204. With the tube 204 preferably being made of Nitinol, the distal movement (as indicated by the arrow 305) of the rod 206, with its tip 206a, seated in the recess 302 of the shuttle needle 210, pushes the shuttle needle 210 distally, such that the oversize diameter portion 304 of the shuttle needle 210, pushes the tube 204 outward, deforming the tube 204, creating engagement forces that allow the pull of the shuttle needle 210 during suturing.

Figure 4A:
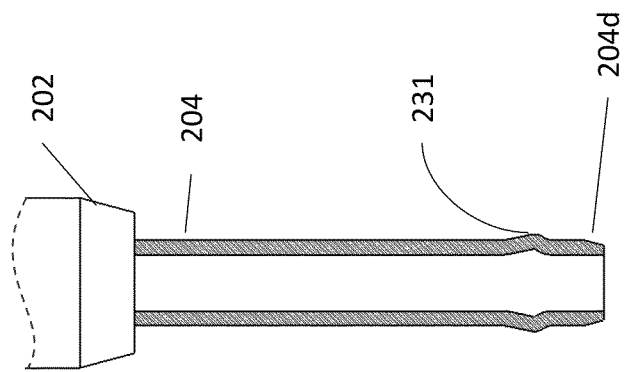
FIGS. 4A and 4B are perspective views of an alternate suturing module for the suturing apparatus of FIG. 1A.
Figure 4B:
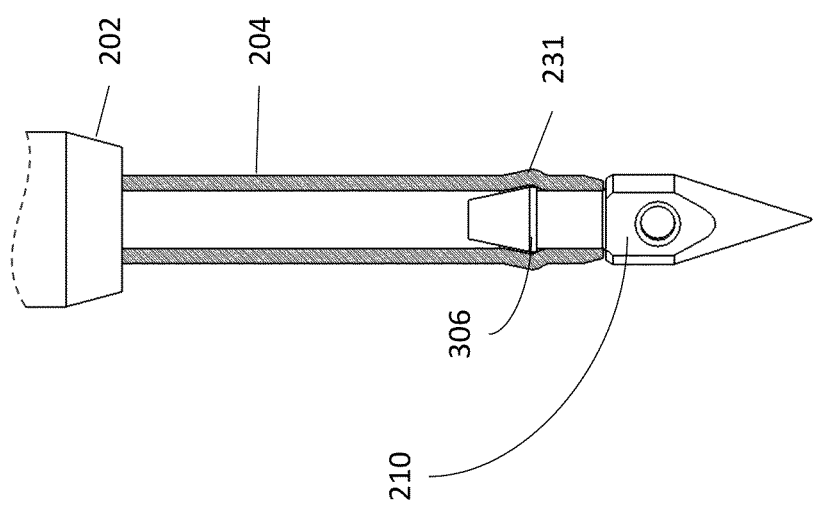

FIGS. 4A and 4B show another embodiment of the tube 204, for gripping (also referred to as engaging or holding) the shuttle 210, such as a shuttle needle. Here, the tube 204, for example, at the distal end 204d, may optionally include a preformed internal recess 231, for example, in the form of a circumferential band at which the tube is made wider. This internal recess 231 forms a catch chamber for engaging a correspondingly shaped ridge 306 around the shuttle needle 210, to hold the shuttle needle 210 in place engaged with the tube 204. Ridge 306 may advantageously be formed at the transition between a medial region for connection of the suture and a proximal region for engagement with the shuttle holder, where the proximal region has an at least partially conical outer surface, and the ridge 306 is formed at the larger diameter edge of the conical outer surface. As the shuttle needle 210, for example, at the ridge 306 is of a diameter larger than the diameter than the tube 204, and most preferably with the tube 204 being of a super elastic alloy, such as Nitinol, distal movement of the shuttle needle 210 pushes the tube 204 outward, deforming the tube 204, creating engagement forces that allow withdrawal of the shuttle needle 210 during suturing.

These views, as well as the subsequent views of various implementations of the shuttle needle, illustrate a number of additional particularly preferred but non-limiting features and properties of the shuttle needle. Specifically, the medial region of the shuttle is preferably provided with at least one side indention, typically allowing a suture to trail next to the needle without enlarging the overall dimension of the shuttle-plus-suture cross-section. A lateral opening 506, optionally with more than one diameter, in the medial region of the shuttle is preferably provided for attachment of a suture, as further described below with reference to FIGS. 12A and 12B. The proximal region of the shuttle needle preferably has an at least partially conical outer surface, and a central recess. The conical outer surface helps to align the shuttle transmitter with the shuttle needle when the transmitter is collecting the shuttle needle from the pocket. A radially-inward step behind the conical surface in certain implementations provides an arrow-like head (without a point, in the case of an axial recess), with a narrowed neck portion in the medial region. In the case of a shuttle holder in the form of a tubular element (e.g., tube 204), the tubular element preferably has dimensions and/or a shape sufficiently small to engage the broadest region of the at least partially conical surface while being larger than the narrowed neck portion.

Figure 5A:
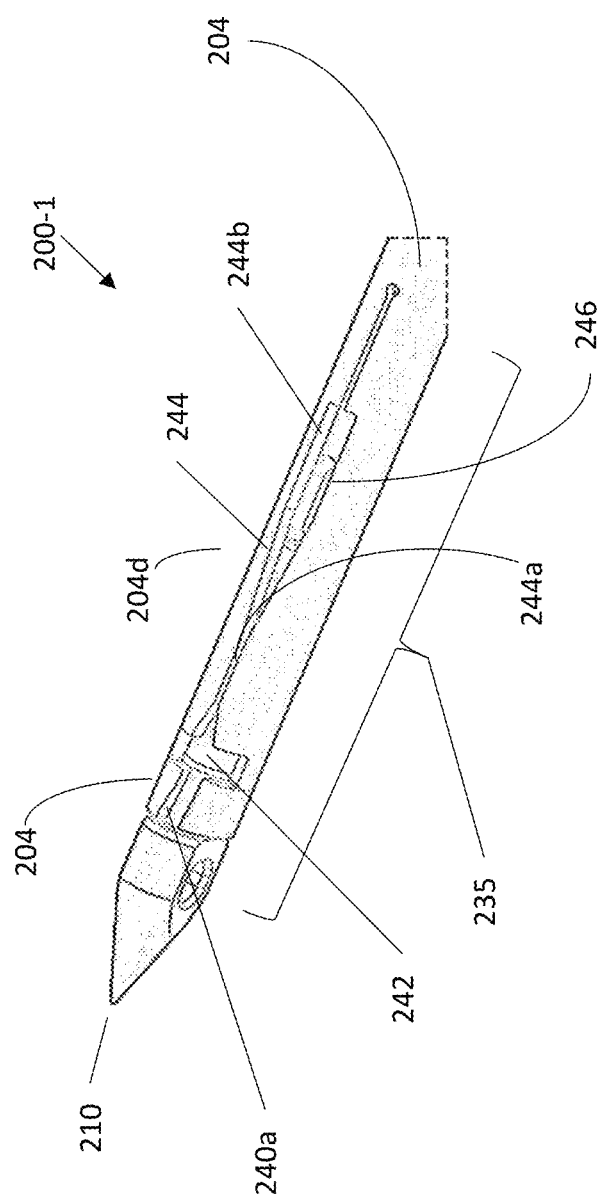
FIGS. 5A, 5B and 5C are perspective views of another alternate suturing module for the suturing apparatus of FIG. 1A.
Figure 5C:
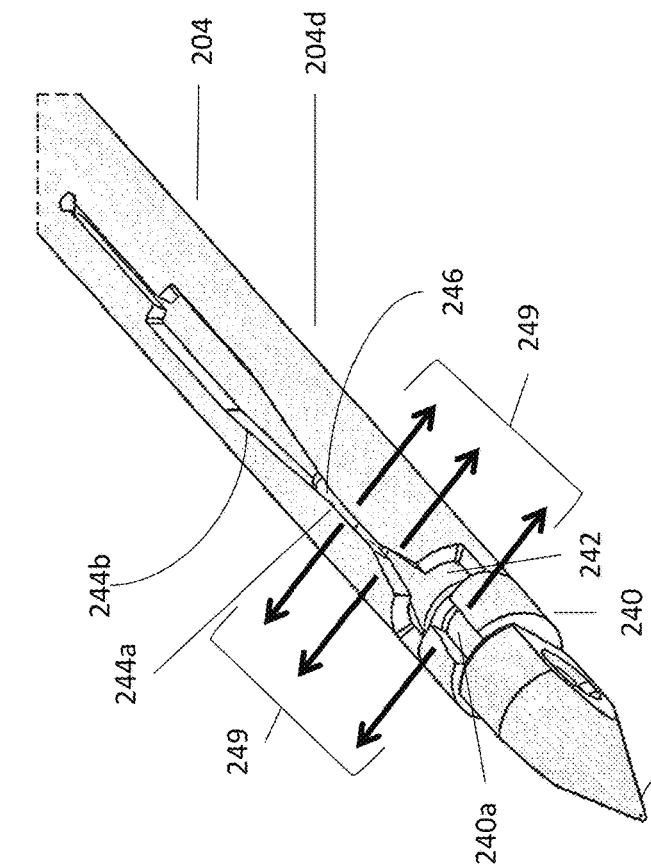
Figure 5B:
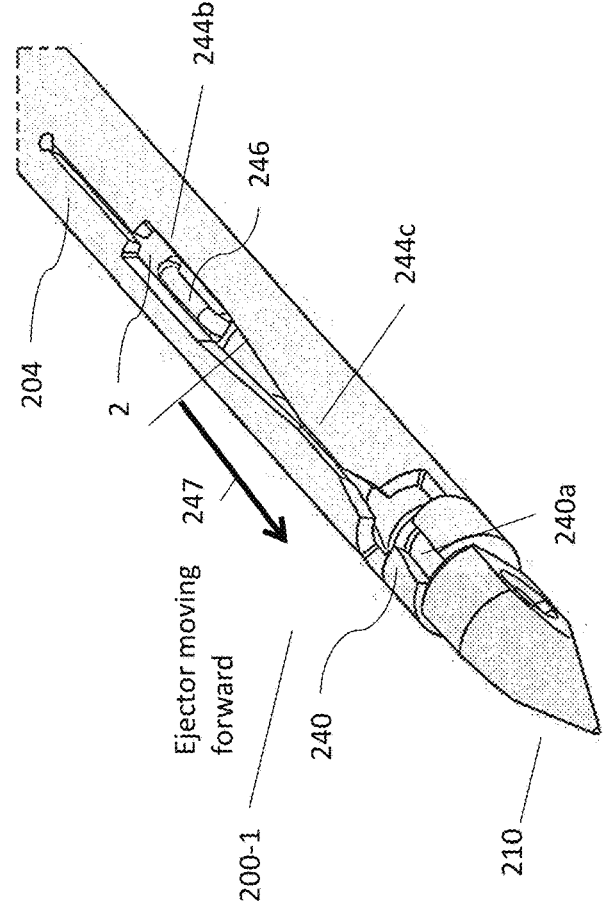

FIGS. 5A-5C show another embodiment of the shuttle transmitter 200-1, including a tube 204, for gripping (engaging) the shuttle 210, such as a shuttle needle, by a mechanical holding interface 235. For example, the shuttle needle 210 may be the shuttle needle of FIGS. 3A-3C, detailed above. Here, the tube 204, at its distal end 204d, includes a crimp 240, with a gap 240a, in communication with a recess 242, and a proximally extending slit 244. The slit 244 includes a distal narrow width portion 244a which tapers proximally outward to a proximal portion 244b of a wide width. The slit 244 is designed to accommodate a protrusion 246 on the rod 206.

As shown in FIG. 5B, the protrusion 246 on the rod 206 initially rests within the wide width portion 244b of the slit 244, such that the shuttle needle 210 is engaged (held) by the crimp 240. When the shuttle needle 210 is to be released, the rod 206 is moved distally (arrow 247), such that the protrusion 246 enters and moves distally in the narrow width portion 244a of the slit 244, as shown in FIG. 5C. As shown in FIG. 5C, this distal movement forces the portions of the tube 204 including the crimp 240 outward (as shown by the arrows 249), widening the gap 240a of the crimp 240, and coupled with the tube 204, for example, made of a shape memory alloy, such as Nitinol, causes release of the shuttle needle 210 from the tube 204.

In alternate embodiments, the crimp 240 can be substituted for by mechanical fingers, with gaps between each of the mechanical fingers. This allows the outer tube 202 to be spreads apart, as detailed for FIGS. 5A-5D above.

FIGS. 6A-6D show a shuttle transmitter 200-2 including a collet-like interface. As shown in FIGS. 6A and 6B, the tube 204 include a slit 260, which coupled with the tube 204 of a shape memory alloy, such as Nitinol, allows the tube 204 to expand radially outward, releasing the shuttle needle 210 from the gripping engagement with the tube 204. As shown in FIG. 6A, the outer tube 202 is over the tube 204, locking the shuttle needle 210 in place. In FIG. 6B, the outer tube 202 is moved proximally (as per the arrow 262), exposing the tube 204, such that the tube 204 can extend outward (as indicated by the arrows 264), and coupled with the distal movement (arrow 266) of the rod 206, releases the shuttle needle 210 from the gripping engagement of the tube 204, as shown in FIG. 6C.

FIG. 6D shows a detailed view of an implementation of the shuttle transmitter 200-2, where the tube 204 includes inwardly directed holding teeth 270 (individual or a ring thereof), which engage an indentation 310 in the shuttle needle 210, for an additional frictional and/or mechanical engagement. The shape of these holding teeth 270 is chosen such that they are flexed outwards on application of axial force above a certain threshold to release shuttle needle 210, but when outer tube 202 is advanced around the tube 204, this outwards flexion is prevented, thereby providing positive locking. Motion of outer tube 202 is preferably also controlled from the handle of the device, as with the other movable elements. Tube 260 may preferably made of superelastic, pre-shaped alloy such as Nitinol.

Figure 7B:
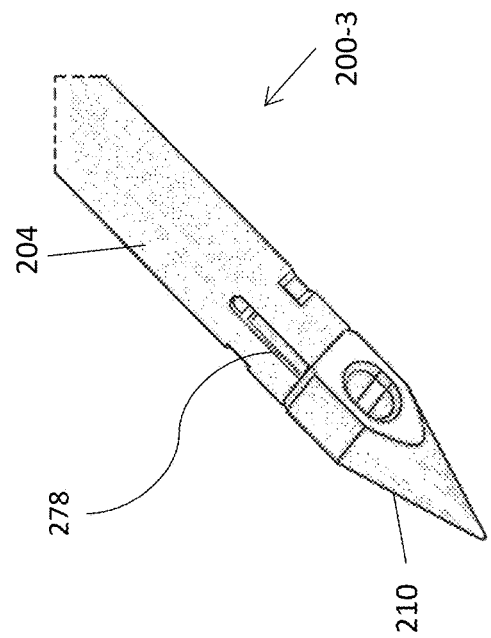
FIGS. 7A and 7B are perspective views of another alternate suturing module for the suturing apparatus of FIG. 1A.
Figure 7A:
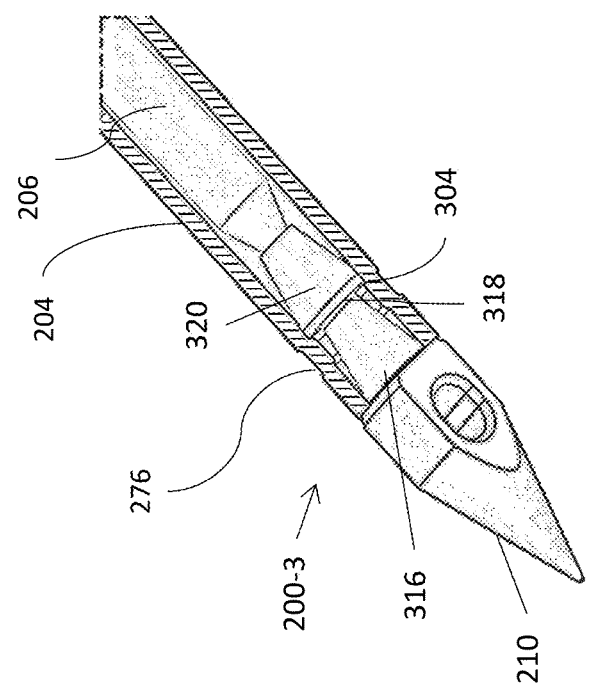

FIGS. 7A and 7B show a shuttle transmitter 200-3 including a snap holding interface. Here, the tube 204 includes one or more indentation 276, which fits between a recess 314, formed at the junction of a proximally inward medial section 316 and a shoulder 318 of a proximal neck 320, of the shuttle needle. A similar effect can be achieved by forming an opening or "window" in tube 204 in which the broadest part of the shuttle needle tends to become seated. The rod 206, seated in the recess 302 of the shuttle needle 210, as shown in FIG. 7A, is moved distally, to overcome the retaining forces applied by the indentation within the tube 204, ejecting the shuttle needle 210 distally so as to be released from the gripping engagement of the tube 204. Tube 204 in this case may be made from any suitable elastically deformable material, optionally slotted to provide enhanced flexibility, and/or by use of a superelastic alloy, such as Nitinol.

FIG. 7B shows an alternate embodiment of the shuttle transmitter 200-3, where the tube 204 includes one or more slits 278, extending proximally from the distal end 204d of the tube 204. These slits 278 facilitate outward flexing of the tube 204, when the shuttle needle 210 is pushed distally by the rod 206.

Inwardly directed holding teeth 270 (individual or a ring thereof), which engage an indentation 310 in the shuttle needle 210, for an additional frictional engagement.

FIGS. 8A-8C show a shuttle transmitter 200-4, where the tube 204 frictionally engages an engagement surface (neck) 330 of the shuttle needle 210 (FIG. 8A). The engagement surface includes a partial cylindrical surface 330a having a first diameter $D_1$ and at least one chamfer surface 330b such that a perimeter of said engagement surface is less than it would be if it were a full cylinder (i.e., less than $\pi D_1$). Tube 204 has at least one internal dimension, typically its diameter $D_2$, that is smaller than $D_1$, i.e., that cannot fit over the engagement surface without undergoing deformation, but is implemented with sufficient flexibility, typically through use of superelastic materials, such as Nitinol, that it is elastically deformable to fit over the engagement surface. This solution can clearly be implemented with a range of geometries of the engagement surface and the end of the tube that are formed with incompatible shapes that cannot fit one with the other without deformation of the tube, but can be elastically deformed to fit together, thereby generating frictional retention of the shuttle needle. The frictional retention may be overcome by the releaser, such as rod 206, advancing relative to the tube 204 so as to overcome the frictional retention forces and eject the shuttle needle.

Figure 9B:
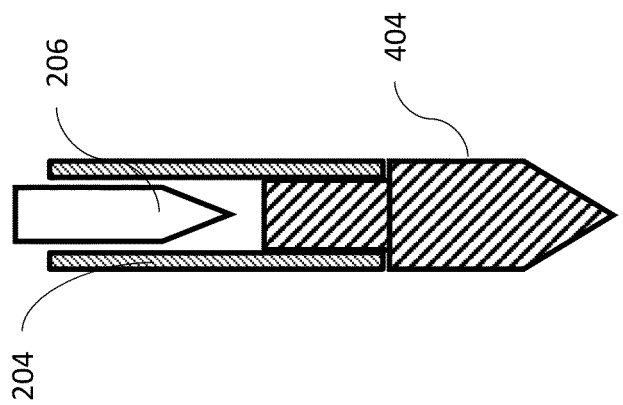
Figure 9A:
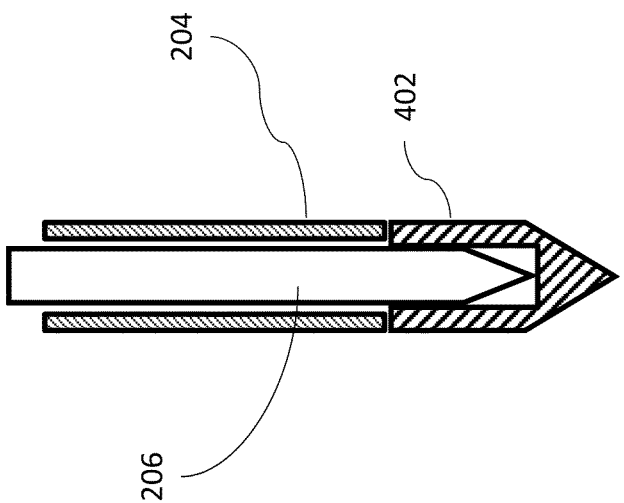

FIGS. 9A-9C show general examples of shuttles 210 (for example, as shown in FIG. 2A). FIGS. 9A and 9B show shuttles in the form of needles (shuttle needles) 402, 404, while FIG. 9C shows a shuttle 406. For example, in FIG. 9A, the shuttle needle 402 is a female-type, as it is frictionally engaged by the rod 206, the rod movable within the tube 204. For example, in FIG. 9B, the shuttle needle 404 is a male-type, as it is frictionally engaged by tube 204, and pushed distally by the rod 206, when disengagement is of the shuttle needle 404 is desired.

In each case of a shuttle needle with a piercing tip, it should be noted that the piercing tip may have any form suitable for piercing the corresponding material to be sutured, and is not limited to a conical tip. Alternative forms include various forms with bevels and/or sharpened ridges, with three-fold, four-fold or other symmetry, or with asymmetric tips.

In FIG. 9C the shuttle 406 includes an open central core 408, through which the piercing tip 206a of the rod 206 extends through, in order to function as the piercing tip for the shuttle 406. The rod 206 is of a diameter at least equal to and typically greater than the diameter of the core 408, to frictionally engage the shuttle 406. When release of the shuttle 406 from engagement with the rod 206 is desired, the tube 204 is moved distally, pushing the shuttle 406 off of the rod 206, or, the rod 206 is moved proximally, such that the contact between the shuttle 406 and the tube 204, allows the shuttle 406 to be freed from the engagement of the rod, or combinations of both of the aforementioned movements.

In each of the options of FIGS. 9A-9C, the needle transmitter may be configured to present a needle like pointed end without the present of the shuttle or shuttle needle.

Figure 10:
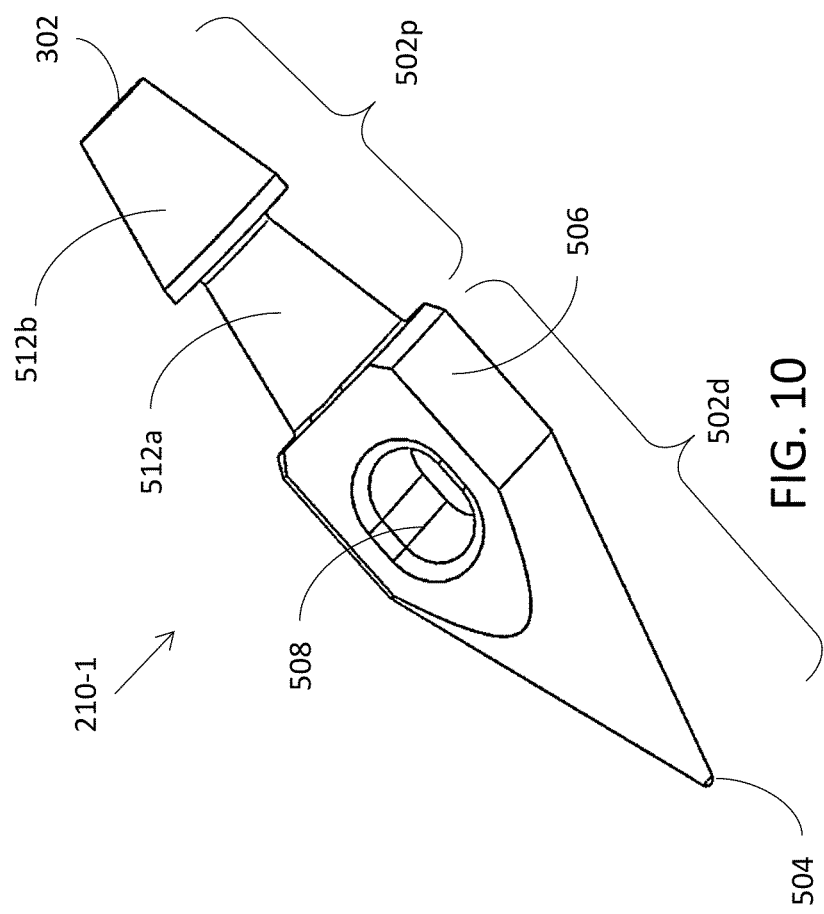
FIG. 10 is a perspective view of a shuttle needle for the suturing apparatus of FIG. 1A.

FIG. 10 shows the shuttle needle 210-1, in an embodiment thereof. In general terms, the shuttle needle typically includes a distal end configured for tissue penetration, a central (medial) section typically configured as interface for suture thread/filament engagement, and a proximal end, typically configured as interface to the needle transmitter module. Thus, in the example illustrated here, the shuttle needle 210-1 includes a distal end 502d, with a pointed tip 504, for tissue piercing, and a proximal end 502p. Proximal to the point 504 at the distal end 502d is a suture interface 506 which includes an aperture 508 for receiving a suture and having it secured to the shuttle needle 210-1. The shuttle needle may include one or more side indentations, preferably two, optionally positioned opposite to each other. The indentions may be only in the central (medial) section of the needle, but optionally also in other sections of the needle. In some embodiments, having more than one indentation, each indention may have a different shape and form. The central section of the shuttle needle may include an aperture for receiving a suture thread or filament. The aperture may have a slotted shape, preferably a circular shape, with constant diameter, optionally tapered shape. In yet another embodiment the aperture may include several diameters, each for a different, limited, depth of the aperture.

A medial tapered neck 512a, which is tapered proximally inward, joins a tapered proximal end section 512b, which is tapered proximally inward. The medial tapered neck 512a joins a flat circular base 514 of the proximal end section 512b. The diameter of the circular base 516 is greater than the proximal end of the medial neck 512a, forming a shoulder 518. The proximal end section 512b terminates proximally at a recess 516. The recess 516, as detailed above, receives the piercing tip 206a of the rod 206, of the shuttle transmitter 200.

Figure 11:
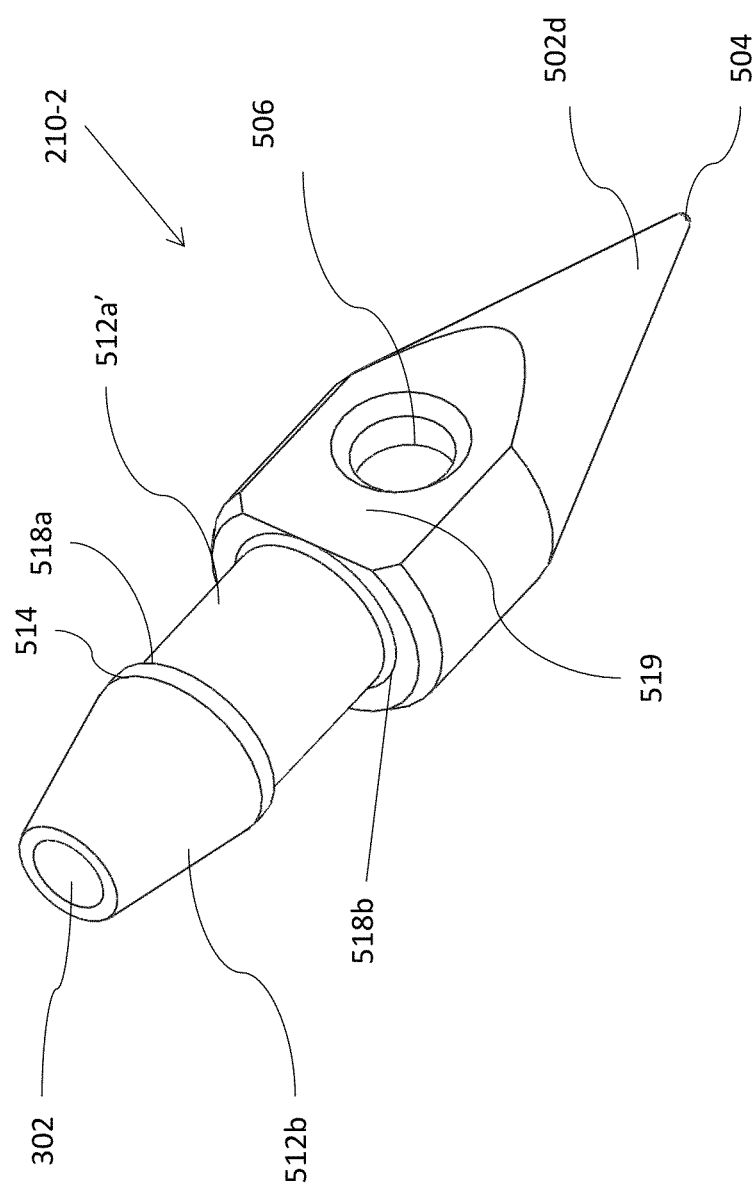
FIG. 11 is a perspective view of another shuttle needle for the suturing apparatus of FIG. 1A.

FIG. 11 shows the shuttle needle 210-2, in another embodiment. This shuttle needle 210-2 is similar to shuttle needle 210-1 of FIG. 10, with the same or identical elements taking the same numbers and descriptions as for FIG. 10 above, except that the medial tapered neck 512a is replaced by a medial cylindrical neck 512a', of a diameter less than the diameter of the base 514, forming a shoulder 518a. A second shoulder 518b is formed at the junction of the distal end 502d and the medial cylindrical neck 512a'. Side recesses or flats 519 may be on the lateral sides of the shuttle needle 210-2 at the distal end 502*d*.

Figure 12A:
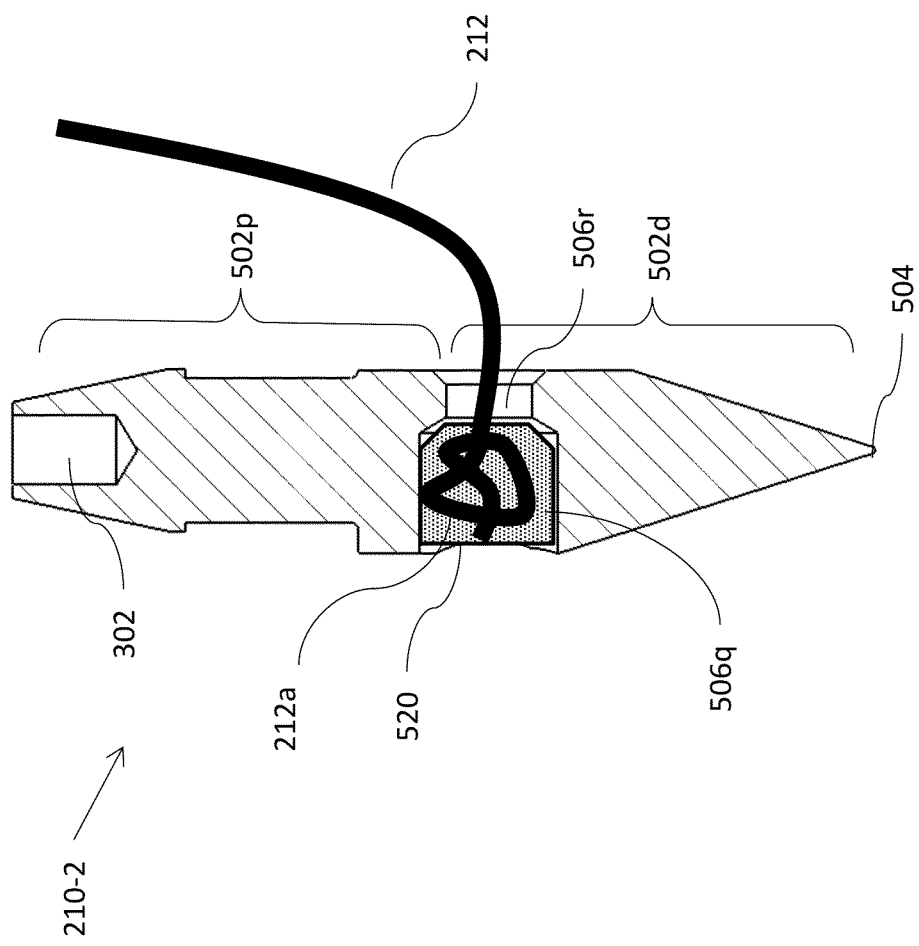
FIGS. 12A and 12B show suture attachment to an example shuttle needle, such as the shuttle needle of FIG. 11.
Figure 12B:
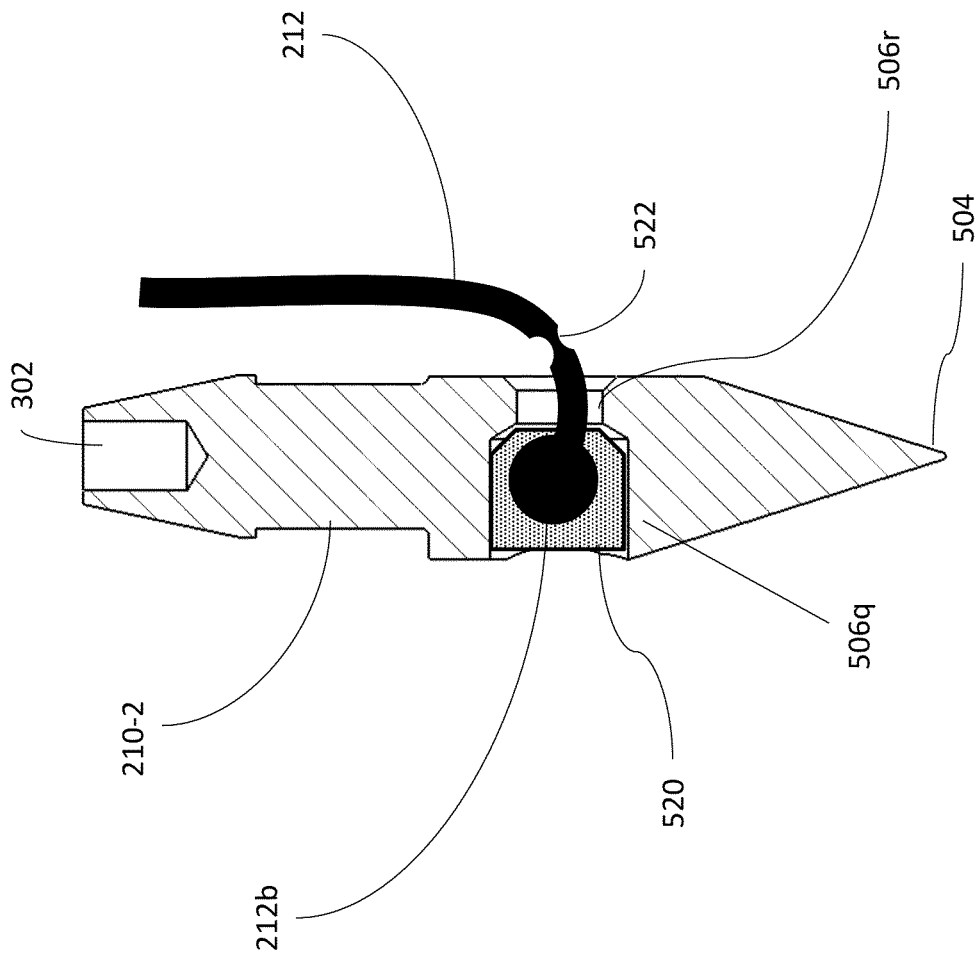

FIGS. 12A and 12B show the shuttle needle 210-2 of FIG. 11, holding a suture 212. The aperture 506 is, for example, rounded (circular) and of two different diameter portions 506*q*, 506*r*, with the suture 212 extending through a smaller diameter portion 506*q* to a larger diameter portion 506*r*, which receives the suture 212 as a knot 212*a*, and filled in with adhesive 520, such as an ultraviolet (UV) type adhesive or the like, as shown in FIG. 12A. Alternately, as shown in FIG. 12B, which is similar to FIG. 12A, the suture 212 (enlarged monofilament 212*b*) is modified with spherical or cylindrical cut-outs 522, to create a "living hinge" and a small bending radii for the suture 212 (mono filament). Although illustrated here as attached near an end of the suture, attachment of the suture to the shuttle needle may equally be at any position along a length of a suture, including attachment to a loop which passes through an aperture of the suture.

Parenthetically, it will be noted that in many cases, the suture 212 emerges laterally from a medial region of the shuttle, particularly when it is desired to provide a distal penetrating tip and a proximal portion to be gripped by the shuttle holder. The aforementioned difference in external diameter between outer tube 202 and tube 204 helps to accommodate the suture alongside the shuttle needle and/or tube 204 when the shuttle transmitter is retracted within a guide channel sized to fit outer tube 202.

Figure 13:
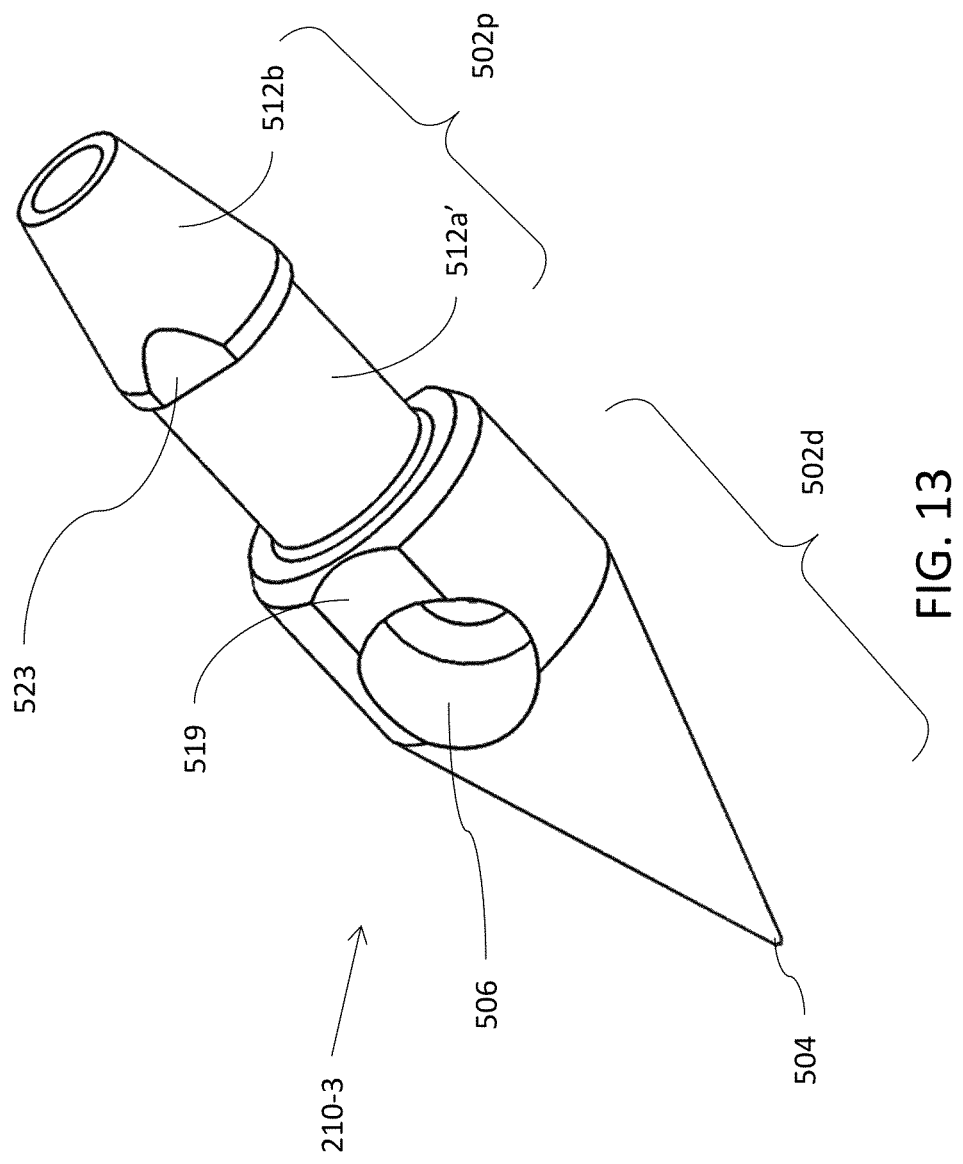
FIG. 13 is a perspective view of another shuttle needle for the suturing apparatus of FIG. 1A.

FIG. 13 shows the shuttle needle 210-3, in another embodiment. This shuttle needle 210-3 is similar to shuttle needle 210-2 of FIG. 11, with the same or identical elements taking the same numbers and descriptions as for FIG. 11 above. Differences in the shuttle needle 210-3 from shuttle needle 210-2 include the proximal end section 512*b* may include one or more indents, flattened portions or a polygon parameter 523, for example, two of these elements 523, oppositely disposed from each other.

Figures 14A, 14B, 14C, 14D:
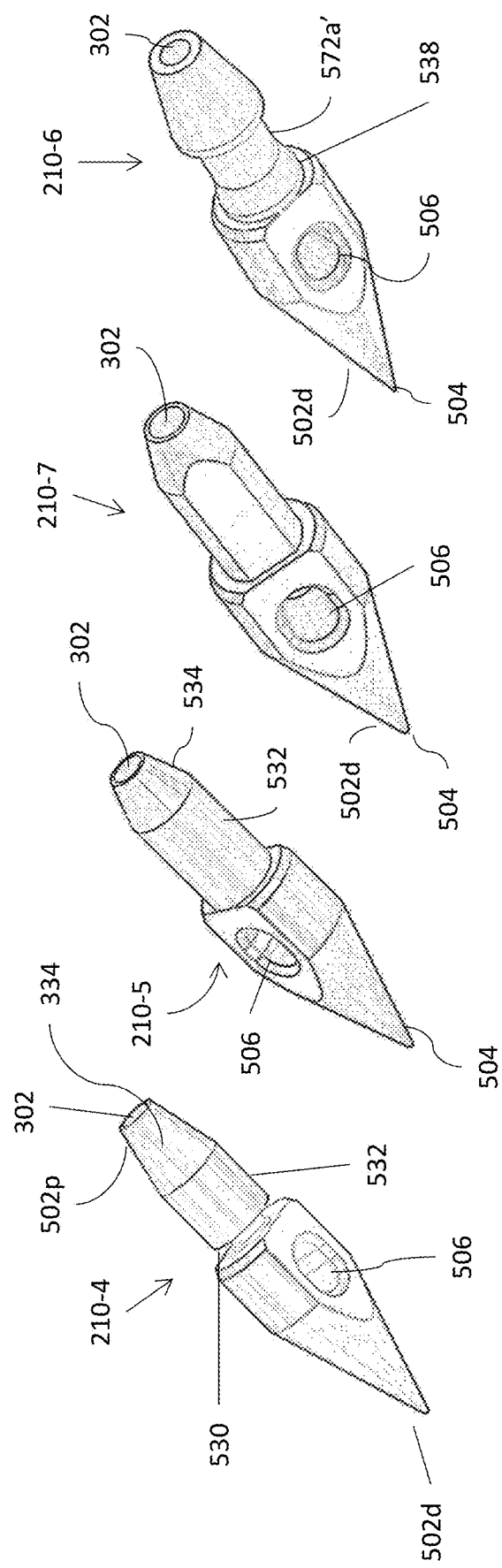
FIGS. 14A, 14B, 14C and 14D are perspective views of other shuttle needles for the suturing apparatus of FIG. 1A.

FIGS. 14A-14D show alternate shuttle needles, 210-4, 210-5, 210-6, 210-7. The shuttle needle 210-4 of FIG. 14A includes a distal end 502*d* similar to that of FIG. 10, with a gap 530, between the distal end 502*d* and the proximal end 502*p*. The proximal end 502*p* includes a medial cylindrical neck 532 which meets a conical portion 534 that tapers inward proximally, and terminates in a recess 516. The shuttle needle 210-5 of FIG. 14B is similar to the shuttle needle 210-4 of FIG. 14A, except the gap 530 is not present, and the neck 532 is longer, while the conical portion 534 is shorter. FIG. 14C shows a shuttle needle 210-6 similar to the shuttle needle 210-2 of FIG. 11, except that the medial cylindrical neck 512*a*' includes a conical section 538 extending proximally from the distal end 502*d* to form an inwardly tapered collar around the medial cylindrical neck 512*a*'. FIG. 14D shows a shuttle needle 210-7, which is the shuttle needle 210 of FIG. 8A, and described above, the description is applicable here.

Figure 15B:
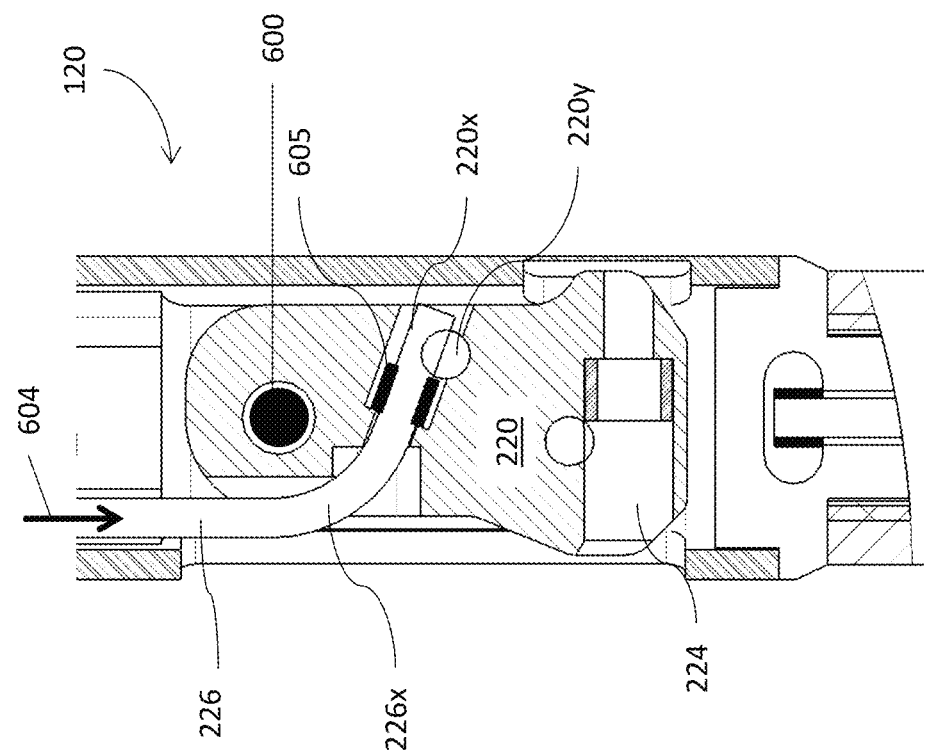
FIGS. 15A, and 15B are cross sectional views of a shuttle receiver and actuation mechanism for the suturing apparatus of FIG. 1A.
Figure 15A:
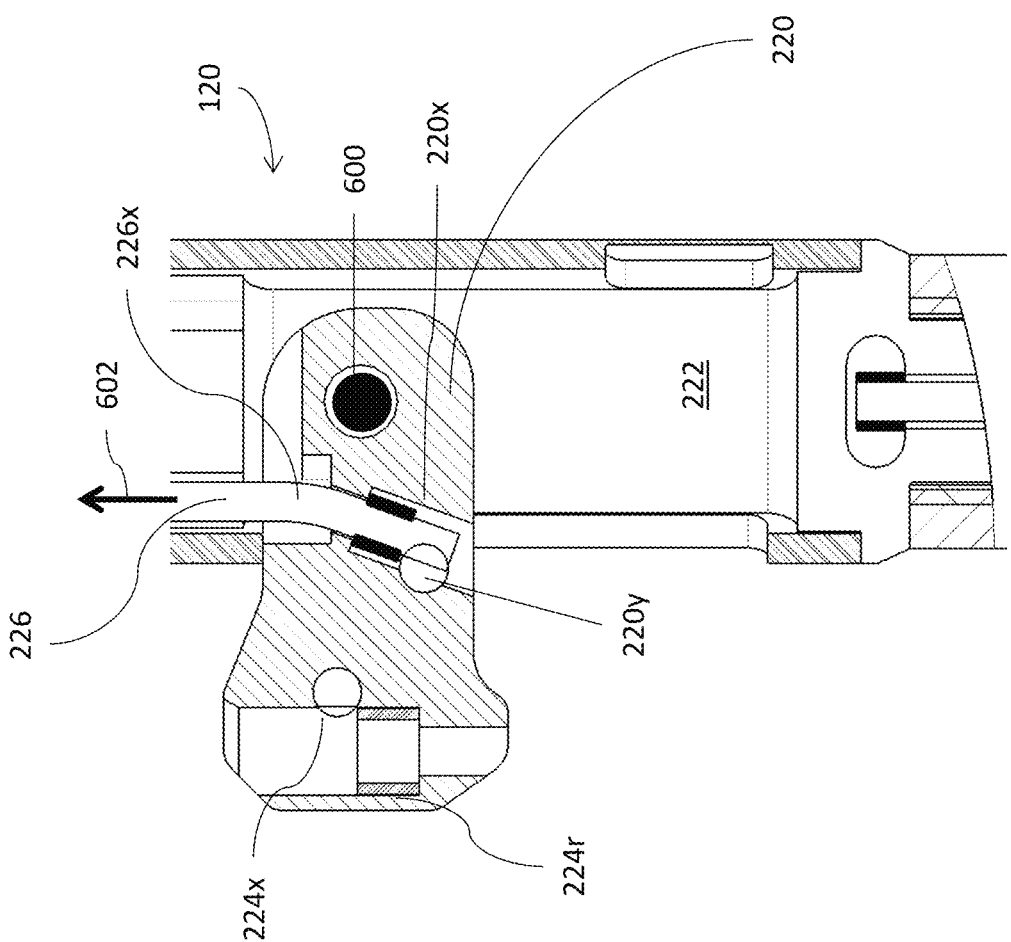

FIGS. 15A and 15B show an exemplary implementation of the receiver (shuttle receiver) 220 in detail. The receiver 220 is attached to the bridging portion 120 by a pin 600 or other structure which defines a hinge axis, or otherwise guides the deployment and retraction motion of receiver 220, which allows for rotational movement of the receiver 220. The receiver 220 is moved rotationally, by an actuator 226, which moves the receiver between a deployed or extended position, shown in FIG. 15A and a non-deployed or retracted position, as shown in FIG. 15B. When the actuator 226 is pulled proximally (as per the arrow 602), the receiver 220 moves outward, into the deployed or extended position (FIG. 15A) for receiving and engaging a shuttle 210, and when pushed distally (as per the arrow 604), moves the receiver 220 into the slot 222 (FIG. 15B) (the non-deployed or retracted position). The actuator 226 is, for example, made of a shape memory alloy, such as Nitinol, and preferably includes a preshaped bend 226*x*, which acts as a spring, to retract the receiver 220 into the slot 222 to its retracted position. The actuator 226 attaches to a channel 220*x* in the receiver 220, by one or more of welds, adhesives or mechanical fasteners, such as crimps 605. Additionally, or alternatively, a lock pin 220*y* holds the actuator 226 in place.

The end of the receiver 220 which extends out of the slot 222, includes a pocket 224 for receiving and engaging the shuttle 210, for example, any of the shuttle needles 210 to 201-7 detailed above. The pocket 224 is typically of a shape corresponding to that of the shuttle 210. In the example illustrated here, a flexible element 224*r* in the form or a ring or tube is positioned and configured to receive and engage the shuttle when pushed into the pocket, and also to allow extraction of the shuttle by the shuttle transmitter 200, as described herein. In the implementation illustrated here, flexible element 224*r* is retained by a lock pin 224*x* extending transversely across at least part of receiver 220.

FIGS. 15C and 15D show the receiver (shuttle receiver) 220 of FIGS. 15A and 15B, where a lock member 610 has been added. The lock member 610 is a wire or the like, that fills a space 612 between the mounted end of the receiver 220 and the wall 222*x* of the slot 222, to maintain the receiver 220 in the deployed or extended position, as shown in FIG. 15C. For example, once the receiver 220 is in the deployed position (as moved by the actuator 226 being moved proximally, as per the arrow 614*a*), the lock member 610 is moved distally (as per the arrow 614*b*) into the space 612, keeping the receiver in the deployed position. When the deployment of the receiver 220 ends, as shown in FIG. 15D, the lock member 610 is moved proximally (as per the arrow 618*a*), and once clear of the receiver 220, the actuator 226 is moved distally (as per the arrow 618*b*), so that the receiver 220 is retracted into the slot 222 (by a pivotal or rotational movement about the pin 600, as shown by double headed arrow 619). The lock member 610, for example, extends from the bridging portion 120 through the shaft 110, and is controlled from the handle 130. Engagement of the lock member 610 ensures continuous and reliable deployment of receiver 220 in its deployed position without requiring continuous application of tension to actuator 226 during performance of a procedure.

Figure 15F:
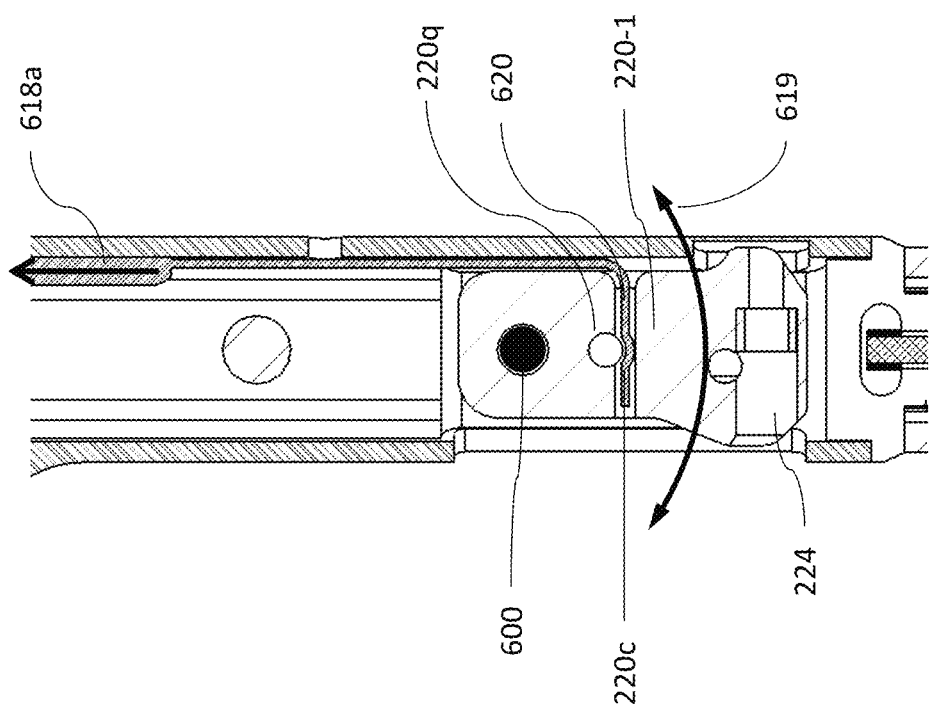
FIGS. 15E and 15F are cross sectional views of an alternate shuttle receiver and actuation and locking mechanism for the suturing apparatus of FIG. 1A.
Figure 15E:
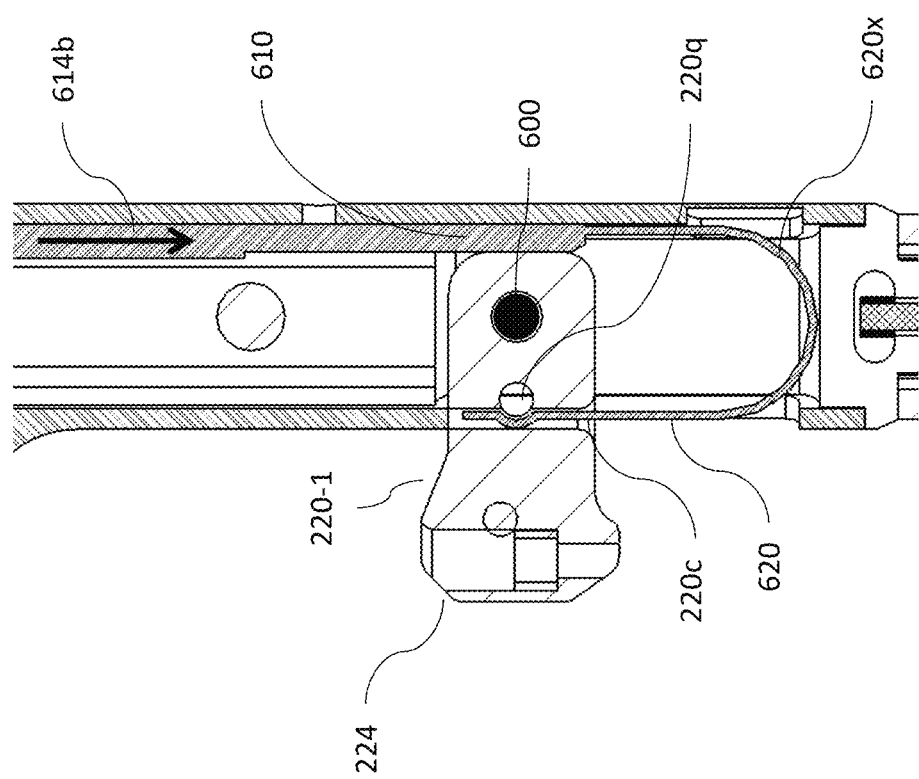

FIGS. 15E and 15F show an alternate receiver (shuttle receiver) 220-1, where an actuator element 620 serves as both the lock member and the actuator. The lock member 620, for example, extends from the bridging portion 120 through the shaft 110, and is controlled from the handle 130. The actuator element 620 is, for example, a wire, attached to the receiver 220 within a channel 220*c* of the receiver 220, for example, by a mechanical pin 220*q* (shown in FIG. 15F), but could also be by adhesives, welds and the like. When moved distally (as per the arrow 622*a*) through a first range of motion, the actuator element 620 moves the receiver 220 to a deployed position. Further displacement of the actuator element 620 brings a thickened portion of the actuator element, corresponding to lock member 610, into a locking position, filling the space 612 between the mounted end of the receiver 220 and the wall 222*x* of the slot 222 so as to hold the receiver 220 in position. The actuator element 620 includes a preshaped bend 620*x*, which acts as a spring to deploy the receiver 220 when the actuator element 620 is pushed distally. When the deployment of the receiver 220 is no longer required, as shown in FIG. 15F, the actuator element 620 is moved proximally (as per the arrow 618b), such that lock member 610 is disengaged and subsequent further motion of actuator element 620 returns the receiver 220 to its retracted position seated in the slot 222 (by pivotal or rotational movement about the pin 600, as shown by double headed arrow 619) in the non-deployed or retracted position.

Figure 16B:
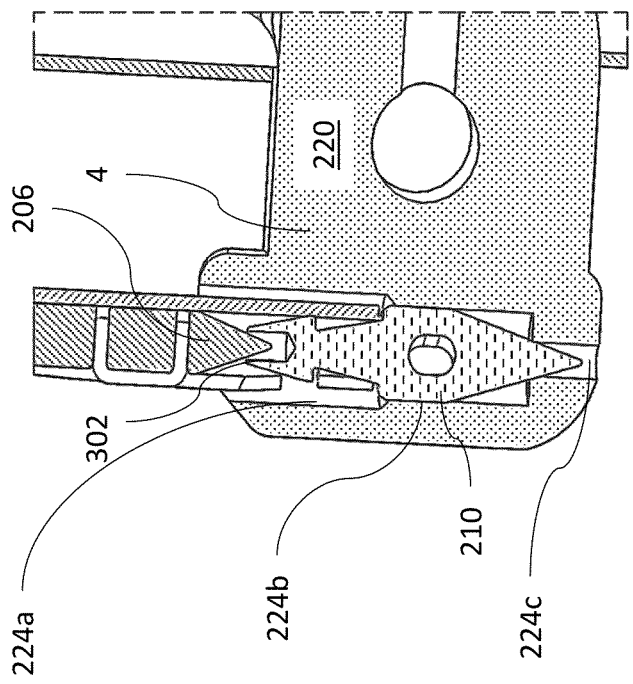
FIG. 16B is a cross-sectional view of the shuttle receiver, including the pocket of FIG. 16A engaging a shuttle needle.
Figure 16A:
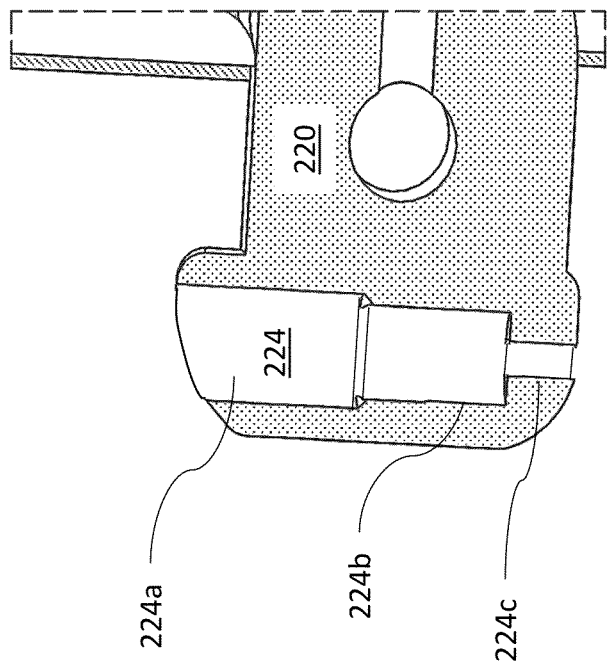
FIG. 16A is a cross-sectional view of the shuttle receiver, including the pocket, of the suturing apparatus of FIG. 1A.

FIG. 16A shows the pocket 224 of the receiver 220 while FIG. 16B shows a shuttle needle 210, engaged in the pocket 224. The pocket 224, for example, includes three sections 224a, 224b, 224c, to receive and engage (hold) the shuttle, for example, a shuttle needle. The first section is a large diameter or upper section 224a. This section 224a is of a diameter to allow for entry of the tube 204 and rod 206 of the shuttle transmitter 200, as well as radial expansion of the tube 204 in this section, and to provide clearance to accommodate the suture thread or filament alongside the shuttle. The middle or medium diameter section 224b is preferably sized to accommodate the largest shuttle needle 210 diameter, and, for example, is shaped to correspond to the shape of the largest diameter portion of the shuttle needle 210, and is preferably provided with features to grip or otherwise hold the shuttle needle 210 in place, and engaged in the pocket 224. The small diameter or lower section 224c of the pocket 224 receives the distal-most end, including the pointed tip of the shuttle needle 210, and the shoulder formed at the transition between sections 224b and 224c acts as a stopper for distal movement of the shuttle needle 210 upon its placement into the pocket 224. The stopper feature can clearly be implemented in a large number of different forms, and the pocket may be open or closed at its lower end.

FIG. 16 shows the pocket 224-1 with snaps or gripping elements 224e. The shuttle receiver 220 is here formed from a flexible material, possibly a polymer material, and preferably has a central slot 225 which subdivides the pocket into two parts to allow for spring-like movement, in order to spread out, and snap back inward so that snaps 224e engage the shuttle needle 210. The distal ends of the snaps (gripping elements) 224e are preferably tapered inward, to allow retraction forces on the shuttle needle 210 to spread the two parts of the pocket, and hence also the snaps (flanges) 224e, apart when the shuttle needle 210 is moved proximally for retraction.

These snaps 224e may be part of (e.g., integral with) the walls of the pocket 224-1 themselves. This "snap" construction preferably allows a shuttle needle 210, with or without recessed sides, to be held at any rotational orientation radial position. Additionally, the tube 204 of the shuttle transmitter 200 may be designed to expand outward, while inserted in the pocket 224-1, allowing for retrieval of the shuttle needle 210.

Figures 16C, 16D:
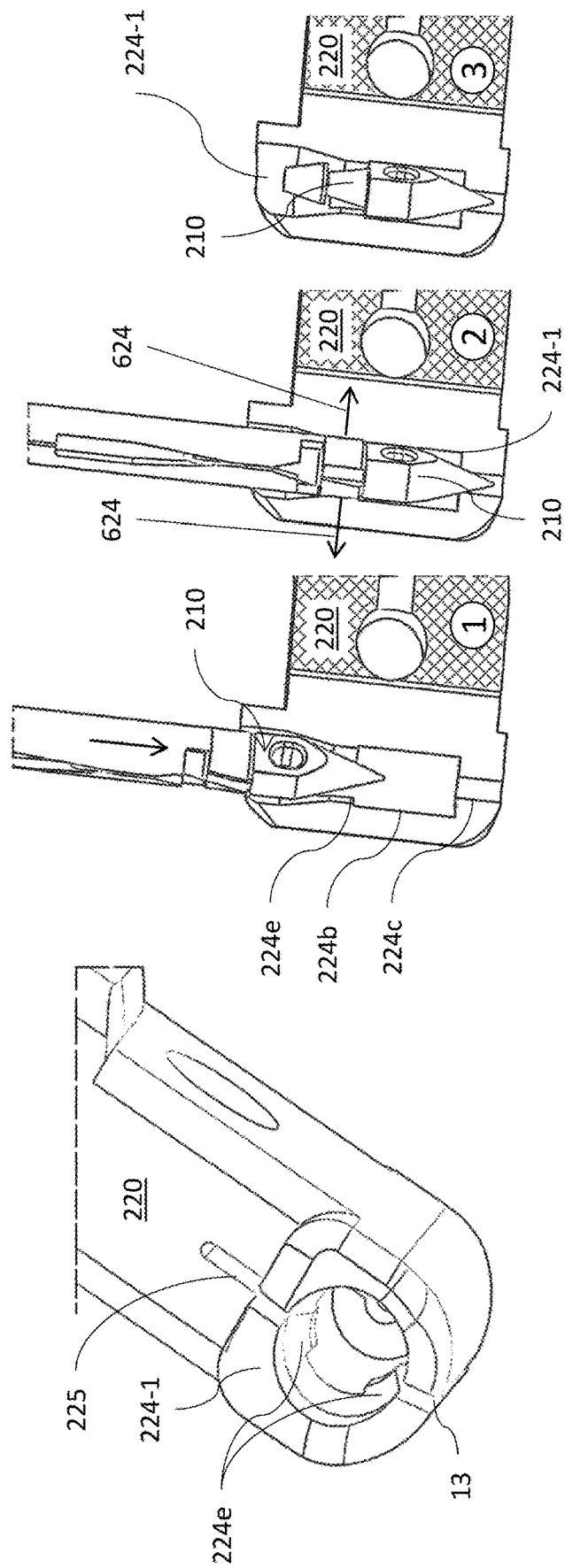
FIG. 16C is a perspective view of an alternate shuttle receiver with snap elements in the pocket, for the suturing apparatus of FIG. 1A.
FIG. 16D includes cross-sectional views of shuttle needle entry and engagement in the pocket of the receiver of FIG. 16C.
Figure 16F:
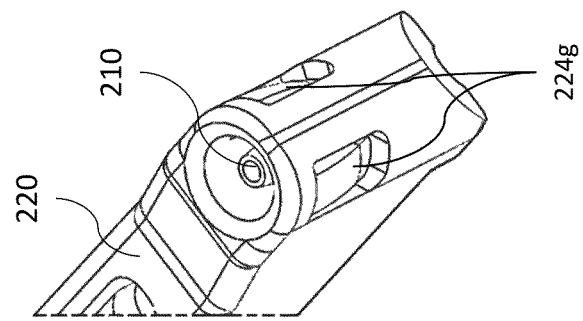
FIGS. 16E and 16F are a cut-away and a full perspective view of an alternate shuttle receiver, including the pocket, for the suturing apparatus of FIG. 1A.

FIG. 16D shows three positions of the shuttle needle 210 as it enters the pocket 224-1. These positions include "Position 1", where the shuttle needle 210 is inserted into the pocket. This motion continues until the shuttle needle 210 snaps into the pocket 224-1 at "Position 2" (indicated by the arrows 624), at which point the releaser is actuated to release the shuttle transmitters hold of the shuttle needle. This allows withdrawal of the shuttle transmitter to leave the shuttle needle 210 temporarily retained within the pocket 224-1, as shown in "Position 3", where it is held temporarily for a suturing step.

Figure 16E:
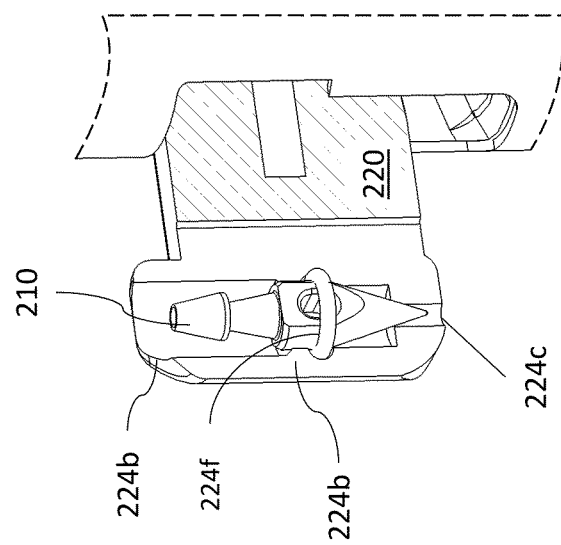

As an alternative to flexibility of the entire pocket, temporary retention of the shuttle needle within the pocket may be achieved also with a relatively rigid pocket, by providing one or more resilient element to engage or grip the shuttle needle. In the example of FIG. 16E, a pocket 224 including a resilient element 224f. This resilient element 224f provides additional forces for engagement of the shuttle needle 210. The spring 224f may be an O-ring, typically formed from elastomeric material or from superelastic shape memory alloy, a metal C-ring, or any other metal or polymer element to secure engagement of the shuttle needle 210 inside of the pocket 224. Depending on the material of the shuttle received 220, one or more resilient element may be integrally formed with the material of the pocket, as illustrated in the variant implementation of FIG. 16F by integral spring leaves 224g.

Figure 17:
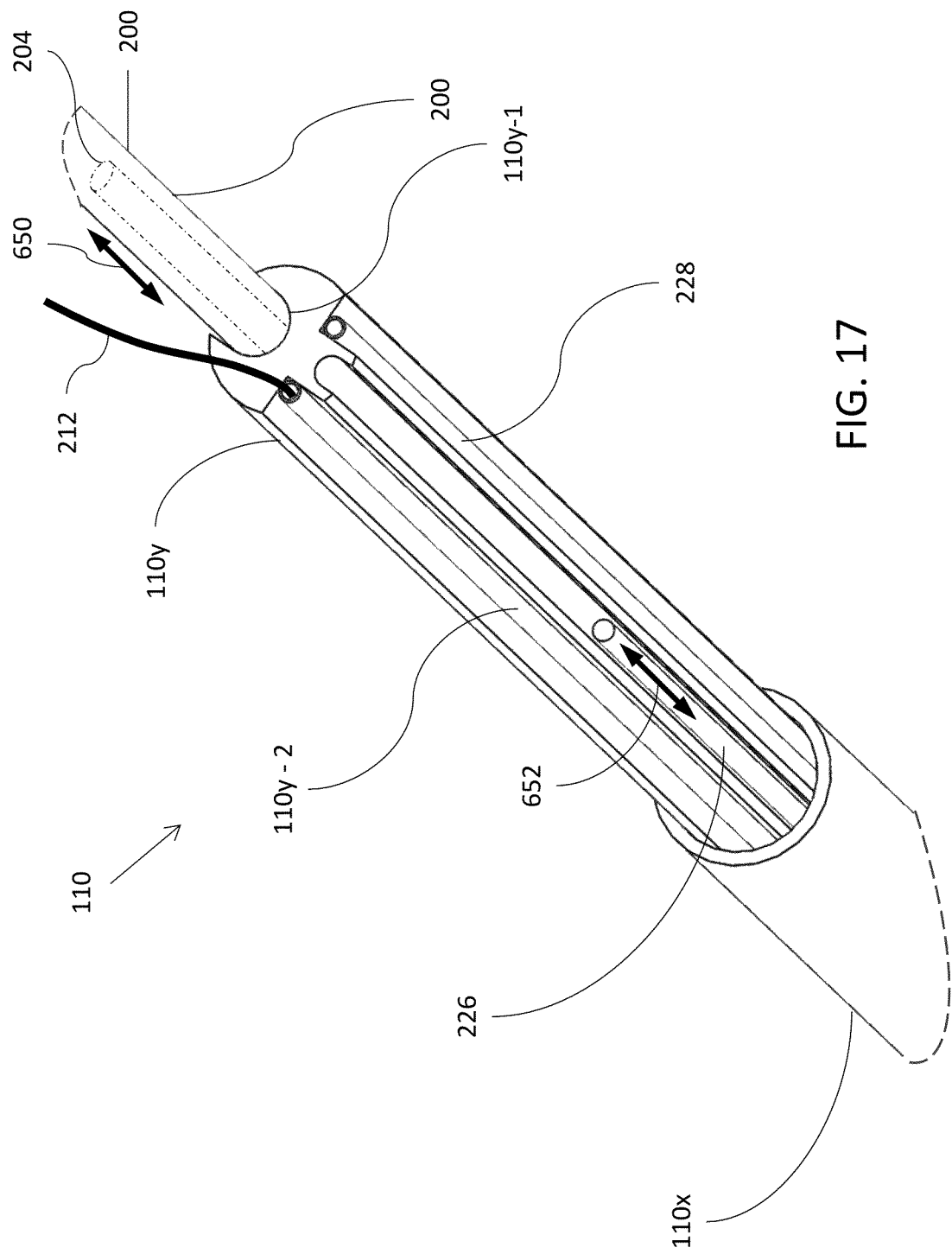
FIG. 17 is a cut away view of the shaft of the suturing apparatus of FIG. 1A.
Figure 18:
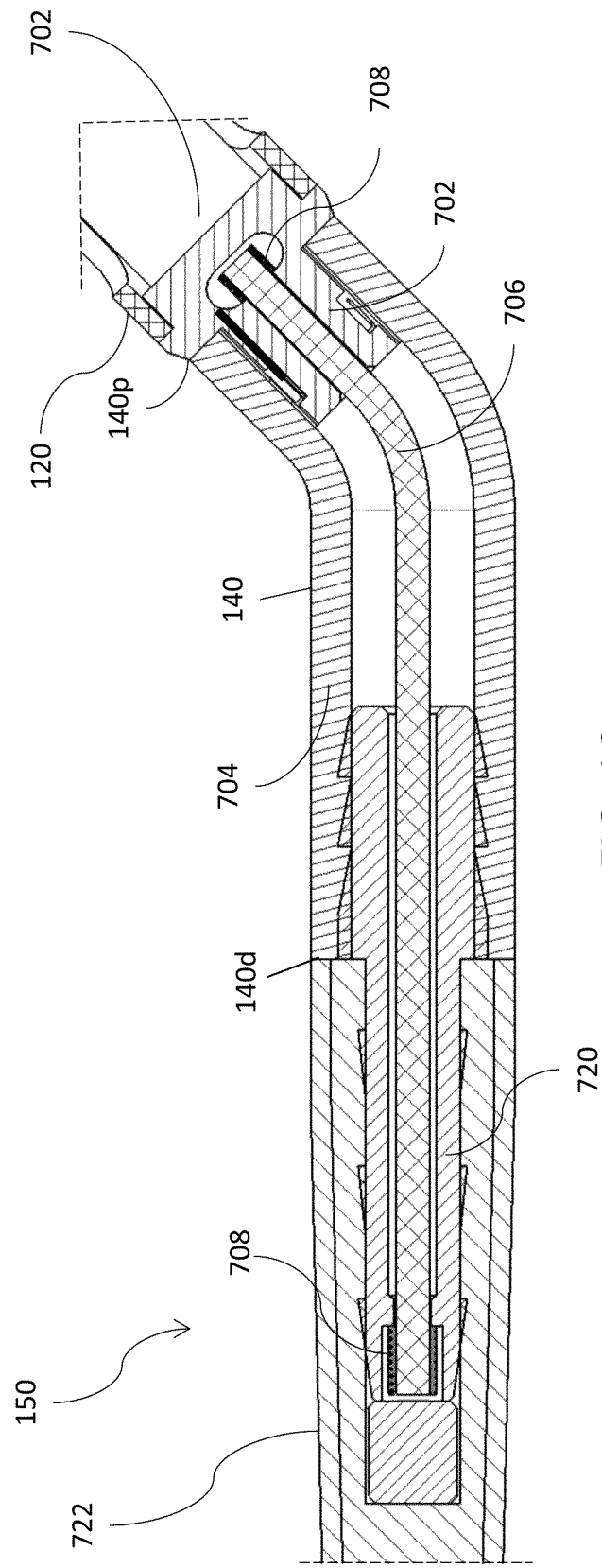
FIG. 18 is a cross sectional view of the bridging portion, the flexible joint and the dilator of the suturing apparatus of FIG. 1A.

FIG. 17 shows an exemplary implementation of the shaft 110. In this example, the shaft 110 includes a shaft envelope 110x which supports a shaft insert 110y, which may be implemented as a multi-lumen tube which accommodates a suture conveyor lumen and a bleeder tube. The shaft insert 110y includes a channel 110y-1 which supports the shuttle transmitter 200 by supporting the outer tube 202 so as to be moveable proximally and distally (as indicated by the double headed arrow 650), as is the actuator 226, moveable proximally and distally (as per the double headed arrow 652) along the shaft insert 110y. A suture tubal conveyer 110y-2 facilitates a suture 212 passing therethrough. The bleeder tube 228 is also supported by the shaft insert 110y FIG. 18 shows the flexible connector 140, which preferably also forms part of a rotatable joint, rotatably connected to the bridging portion 120 at its proximal end 140p, and connected to the dilator 150 at its distal end 140d. In the implementation illustrated here, the flexible connector 140 includes a tube connector 702, which attaches to the distal end of the bridging portion 120. The tube connector 702 also attaches to an outer tube 704. The tube connector 702, receives a central flexible member 706, typically made of superelastic wire, such as Nitinol, or other flexible metal or plastic. In this non-limiting example, central flexible member 706 forms the primary mechanical linkage across the connection, while tube connector 702 provides a continuous smooth tubal form between bridging portion 120 and dilator 150. The central flexible member 706 extends centrally into the dilator 150. Swivel bearings 708 between the tube connector 702 and the central flexible member 706 allow for rotation the of the handle 130 and suturing module 102 (shaft 110 and bridging portion 120), about the flexible connector 140 and the dilator 150, in order to reposition the suturing module for shuttle retraction (from an initial shuttle engagement into the pocket 224) and a subsequent shuttle engagement of the shuttle 210 into the pocket 224.

According to certain particularly preferred implementations of the present invention implemented, for example, in the context of a vascular closure device, the device is advantageously integrated with a dilator 150, which serves to dilate the access site into the blood vessel for the shaft 110 and bridging portion 120. The dilator 150 as illustrated here is a tubular structure, including a central connector 720 for joining the dilator 150 to the flexible connector 140. In the dilator 150, optionally between the central connector 720 and the dilator outer tube 722 are swivel bearings 708. The dilator 150, when inserted into a blood vessel, is aligned with the direction of the blood vessel, and is typically at approximately 45 degrees to the longitudinal axis of the suturing device. A rotatable connection at one or both ends of the flexible connector 140 facilitates rotation of the suturing device to form a circular suture pattern while the dilator remains aligned with the blood vessel and typically does not rotate. The flexible connector 140 should however transfer axial forces from the bridging portion 120 to pull or push the dilator 150 during insertion into and removal from the blood vessel. At the same time, for example, preferably after the dilator 150 is positioned in the blood vessel, the flexible member 140, allows the rotation of the bridging portion 120 around its line of action, for example, without rotation of the dilator 150.

The bridging portion 120 and the outer tube 704 of the flexible connector 140, are, for example, aligned axially with respect to each other. The surfaces of the bridging portion 120, outer tube 704 of the flexible connector 140, and the outer tube 722 of the dilator 150 are, in this example, flush with each other, to have a smooth tubal surface. The connection of the dilator 150 to the suturing module 102 is implemented via the flexible connector 140, which, for example, allows the dilator 150 to align itself within the blood vessel, typically at approximately 45 degrees to the bridging portion 120. The flexible connector 140, for example, transfers axial forces from the bridging portion 120 to push or pull the dilator 150 into the blood vessel. Contemporaneous with the dilator 150 and bridging portion 120 placed into the vessel, the flexible connector 140 allows rotation of the suturing module 102 about the dilator 150, without rotation of the dilator 150.

FIGS. 19A-19E show schematics of various rotatable connections between the bridging portion 120 and the dilator 150, via the flexible connector 140. The various rotations are in accordance with the arrows in each of FIGS. 19A-19E.

Figure 19B:
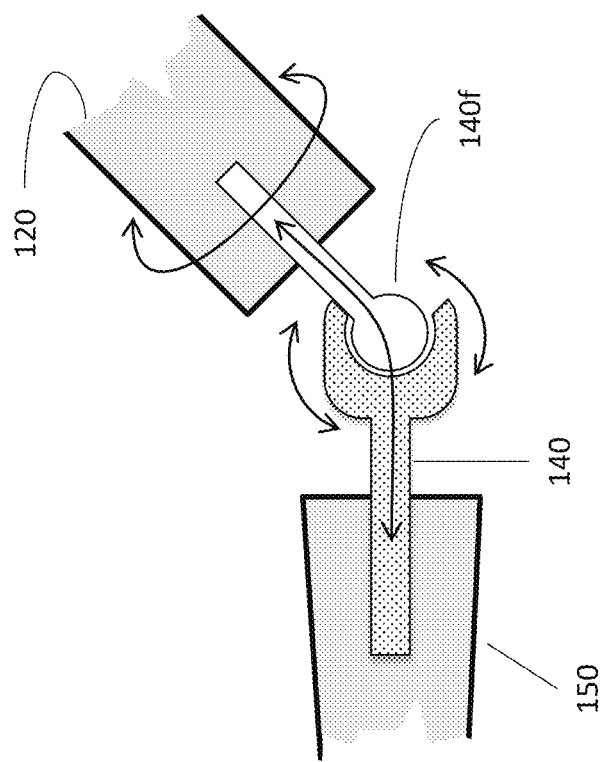
Figure 19A:
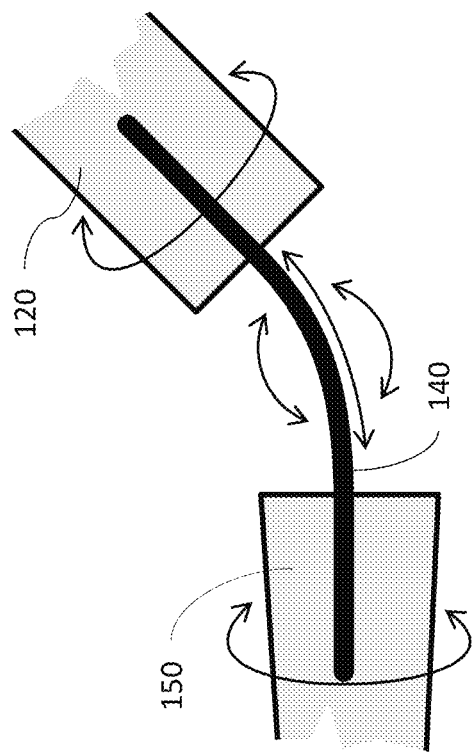

FIG. 19A shows the flexible connector 140 as a flexible member having fixed connections to bridging portion 120 and the dilator 150. The flexible member is made, for example, of a shape memory alloy, such as Nitinol, and serves to transfer radial forces and radial torques.

FIG. 19B shows a flexible connector 140 including a flexible joint 140 with a central spherical ball-socket bearing 140*f*. This arrangement allows the bridging portion 120 to rotate while the dilator 150 remains fixed.

FIG. 19C shows a swivel bearing mounting 708 between the flexible connector and dilator 150, while the connection between the bridging portion 120 and the flexible connector is "fixed" (i.e., non-rotatable).

FIG. 19D shows a swivel bearing mounting 708' in the bridging portion 120, and a fixed connection to the dilator 150, allowing the bridging portion 120 to rotate while the dilator 150 remains fixed. FIGS. 19C and 19D each thus correspond to a simplified (partial) implementation of the flexible joint arrangement of FIG. 18, which included swivel joints at both ends of the flexible connector.

FIG. 19E shows a flexible joint 140 with central spherical ball-socket bearings 752, 754 on the bridging portion 120 and the dilator 150. The connecting rod between spherical bearings 752 and 754 may be flexible or rigid. In this arrangement, rotation of the bridging portion 120 relative to the dilator 150 can be accommodated by one or both of the spherical bearings 752 and 754.

FIGS. 20 and 21 show the handle 130. The handle 130 serves as the control mechanism for shuttle (shuttle needle) insertion and retraction, as well as movement of the actuator 226, for moving the shuttle receiver 220, into an out of the slot 222 of the bridging portion 120, when receiver 220 deployment and retraction are desired.

The handle 130 includes a body 802, which receives and attaches to the shaft 110 (not shown). Handle 130 typically has a lockable slider (not shown) or other actuator for controlling deployment and retraction of the shuttle receiver, for embodiments in which the shuttle receiver is retractable. A main knob 804 is preferably associated with at the shuttle transmitter for displacing the shuttle transmitter distally and proximally, while a secondary knob (or push button) 806 actuated relative motion of the shuttle holder and the shuttle releaser so as to achieve releasing or to allow reengagement of the shuttle transmitter with the shuttle. Rotation or other motion of the suturing module 102 between passes of the shuttle may be achieved by motion of the handle 130 as a whole. Handle 130 has been described here to the extent required to implement control of the suturing module 102, and can be readily implemented by a person having ordinary skill in the art.

Figure 22A:
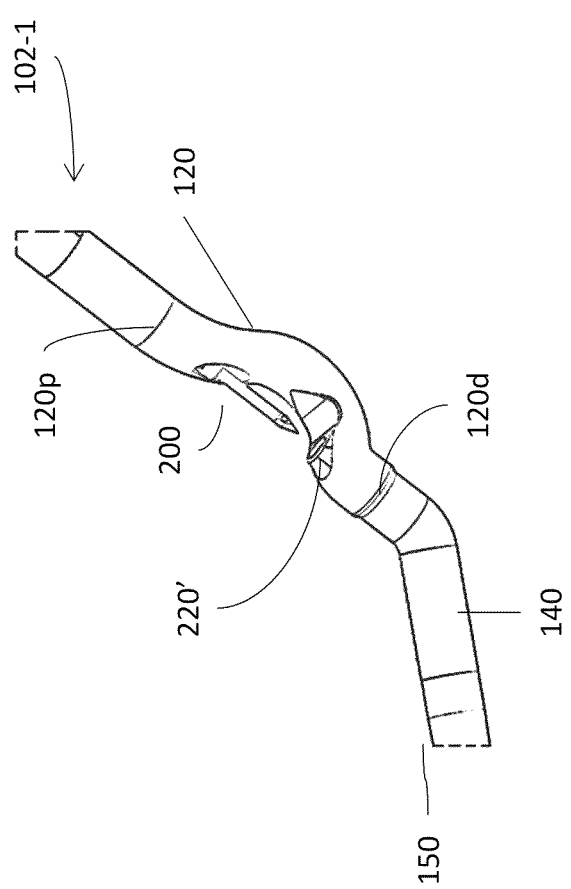
FIG. 22A is a perspective view of a suturing module including an integrated needle receiver, for the suturing apparatus of FIG. 1A.

FIG. 22A shows an alternate suturing module 102-1 for the suturing apparatus 100. This module 102-1 includes an integrated shuttle (needle) receiver 220', which is similar to the shuttle (needle) receiver 220, but integral with the module 102-1. The shuttle transmitter module 200 is integrated with a modified bridging portion 120, and is aligned with the integrated needle receiver 220', thereby providing functionality that is equivalent to that shown in FIG. 2C above. The modified bridging portion 120 functions as a mechanism defining a center of rotation of the suturing module, and is rotatable relative to the flexible joint 140, or at least relative to the dilator, as detailed above. This and other embodiments of the device can also be used for suturing in patterns that employ a component of displacement, with or without rotation.

Figure 22B:
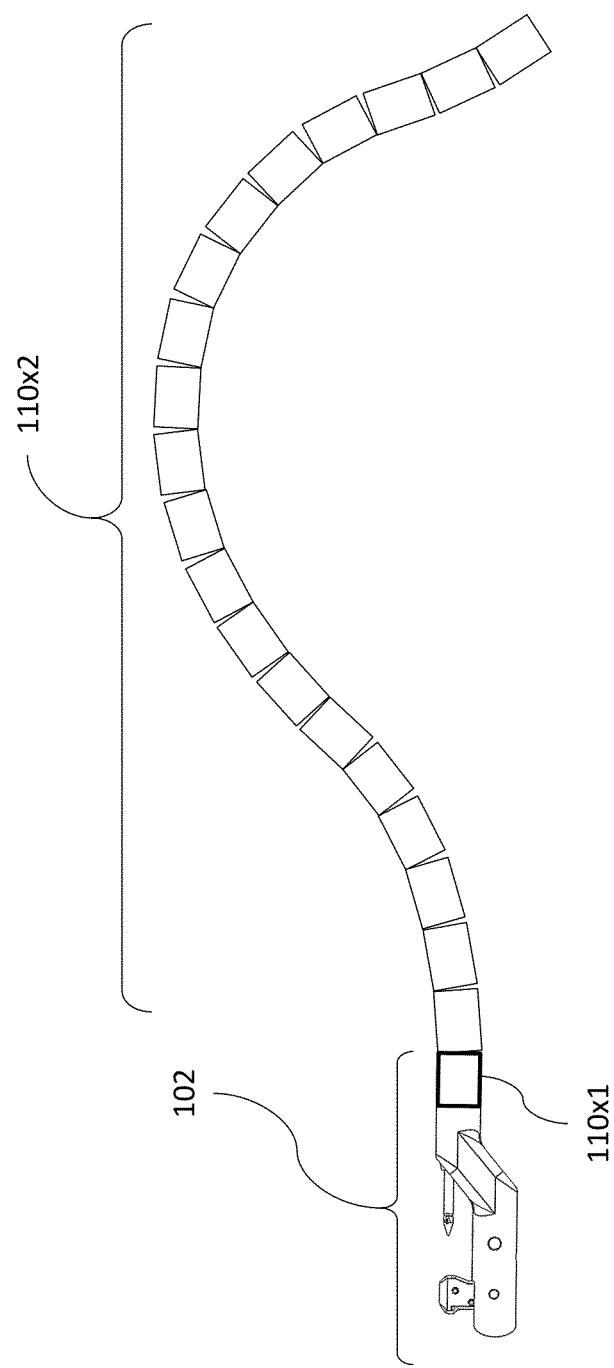
FIG. 22B is a perspective view of an alternate suturing apparatus.

FIG. 22B shows an alternate suturing apparatus 100-1. This suturing apparatus 100-1 includes a suturing module 102, as described above for FIG. 1A above, but includes a short, straight shaft segment 110*x*1, extending from the bridging portion. The segment 110*x*1 is constructed and arranged for linear motion of internal suturing members, and a shaft 110*x*2, which includes all actuators, effectors, tubing and the like. The shaft 110*x*2 is configured to be a flexible shaft, suitable for example for insertion via a curved or otherwise convoluted route to an intra-body location for performance of a minimally-invasive surgical procedure. The flexible shaft may be formed from flexible materials, and/or may employ a structure of jointed or flexibly-interconnected segments that accommodate flexion between segments, as shown. The device may be rendered steerable by inclusion of a steering mechanism, as is known in the art.

Operation-Suturing Process

1. Shuttle Insertion

Attention is directed to FIGS. 23A-23G, which show the shuttle insertion process. The motions of tube 204 and rod 206 are seen particularly clearly also in the cross-sectional views of FIGS. 24A-24E. In describing this shuttle insertion process, which is the first part of the suturing operation, to make a stitch, reference is made to the elements in drawing FIGS. 1A-22B, with the descriptions of the elements provided above.

FIG. 23A is the first subprocess of the shuttle insertion and suture insertion process. The suture 212 is joined to the shuttle needle 210, and the shuttle transmitter 200 is retracted into the shaft 110, as shown in FIG. 2B. A portion of the bridging portion 120 has been inserted into the tissue, for example, a blood vessel 1002, this portion including, for example, at least the shuttle receiver 220 and the port 227*a* for the bleeder tube 228. Should blood exit the port 227*b* of the bleeder tube 228 in the shaft 110, the position of the bridging portion 120 in the vessel 1002 can be confirmed. The shuttle receiver 220 is deployed or in the extended position, to receive the shuttle needle 210. The bridging portion 120, flexible joint 140 and dilator 150 have been inserted into the vessel 1002 by conventional insertion procedures.

FIG. 23B and FIG. 24A show the next subprocess, where the shuttle needle 210 (with the suture 212), as engaged on the shuttle transmitter 200, e.g., the tube 204 (and the rod 206) is advanced distally toward the shuttle receiver 220.

The shuttle needle 210 continues to be advanced by distal movement of at least the tube 204, such that the pointed tip at the distal end 210d of the shuttle needle 210 contacts the tissue, as shown in FIG. 23C, ultimately piercing and penetrating the tissue, e.g., the blood vessel wall 1002, as shown in FIG. 23D. Additionally, in FIG. 23D, the shuttle needle 210 enters the pocket 224 of the shuttle receiver 220, with distal movement of the shuttle needle 210 continuing until the tip at the distal end 210d, seats in the small diameter section 224c of the pocket 224, acting as a "stopper" for distal movement of the shuttle needle 210. The shuttle needle 210 has now been engaged in the pocket 224 of the shuttle receiver 220, for example, by frictional forces, for example, as shown in FIGS. 16A and 16D (Position 2). This corresponds to the state of FIG. 24B. At this point, the shuttle is released by the shuttle transmitter. In the example illustrated here, this is achieved by advancing rod 206 until it engages the proximal portion of the shuttle needle 210 (FIG. 24C) and then withdrawing tube 204 while rod 206 presses distally to hold the shuttle needle 210 in the pocket (FIG. 24D). The shuttle transmitter 200 can then be withdrawn, leaving the shuttle needle in the shuttle receiver pocket. It will be noted that this description applies to a particular non-limiting implementation of the holder and the releaser of shuttle transmitter 200. The corresponding stages according to the alternative implementations, such as those illustrated above with reference to FIGS. 5A to 5C and FIGS. 6A to 6D, will be clear to a person ordinarily skilled in the art.

The tube 204 and rod 206 continue to be retracted proximally, out of the vessel 1002 and tissue, as shown in FIG. 23F, until fully retracted into the outer tube 202 and the shaft 110, as shown in FIG. 24G. As shown in FIGS. 23E, 23F and 23G, the shuttle needle 210 holding the suture 212 is engaged (held or gripped) in the pocket 224 of the shuttle (needle) receiver 220, by frictional forces, as described above.

Figure 24F:
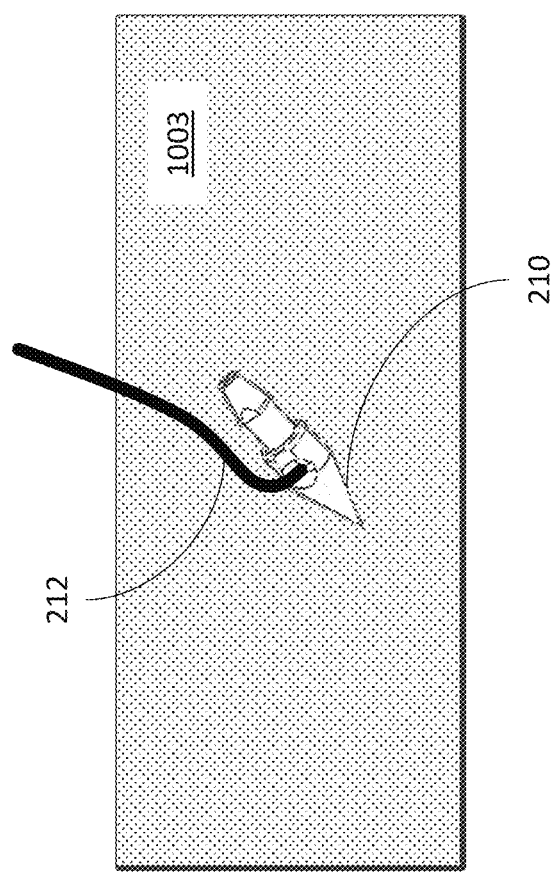

FIG. 24F shows an alternate process, where instead of the shuttle needle 210 being placed into the pocket 224 of the shuttle receiver 220 by shuttle transmitter 200, the shuttle receiver 220 is not involved in the process. Rather, the shuttle needle 210 with the suture 212 is placed into a material 1003, which may be the sutured material, or some other nearby material. The shuttle needle 210 may then serve as an anchor for the suture 212. This may be used as a final step of a suturing process, where the shuttle needle is to remain in the tissue as an anchor for the end of the suture.

2. Shuttle Retraction

Attention is directed to FIGS. 25A-25G, which show the shuttle retraction process. The corresponding operation of the rod 206 and tube 204 may be understood as corresponding to the states of FIGS. 24A-24E in reverse order. In describing this shuttle retraction process, which is the second part of the suturing operation, to make a stitch, reference is made to the elements in drawing FIGS. 1A-22B, with the descriptions of the elements provided above.

In FIG. 25A, the suture 212 has been let out of the shaft 110 and the bridging portion 120 and the shaft 110 have been rotated (from the position shown in FIG. 23G), such that the shuttle transmitter 200 and the outer tube 202, tube 204 and rod 206, are aligned with the pocket 224 of the shuttle receiver 220, which is engaging (holding or gripping) the shuttle needle 210, holding the suture 212.

The shuttle transmitter 200, i.e., the outer tube 202, tube 204 and rod 206, are now retracted, by being moved distally out of the shaft 110, as shown in FIG. 25B. The distal movement continues as the piercing tip 206a of the rod 206 pierces the tissue and the vessel 1002, with the tube 204 also moving distally, following the rod 206, as shown in FIG. 25C.

As shown in FIG. 25D, the rod 206 and tube 204 enter the pocket 224 and the rod 204 contacts the shuttle needle 210 at the recess 302, while the tube 204 frictionally engages the shuttle needle 210. This frictional engagement of the tube 204 with the shuttle needle 210 is with forces strong enough, such that when the tube 204 and rod 206, are retracted, by being moved proximally, the shuttle needle 210 is gripped and engaged by the tube 204, with forces sufficient to break the engagement of the shuttle needle 210 by the pocket 224.

In FIG. 25E, the tube 204 and rod 206 are retracted by being moved proximally, with the shuttle needle 210 gripped (engaged) by the tube, for example, by frictional forces, such that the shuttle needle 210, with the suture 212 is retracted. The retraction continues, as the shuttle needle 210, engaged by the tube 204, the tube 204, the rod 206, and optionally the outer tube 202, are moved proximally, as shown in FIG. 25F. The proximal movement of the shuttle needle 210, engaged by the tube 204, the tube 204, the rod 206, and optionally the outer tube 202, is complete, as shown in FIG. 25G, as their elements are now all inside of the shaft 110. A detailed view of this completed retraction is shown in FIG. 25H.

The apparatus 100 may now be returned to the position and orientation of, or similar to that shown in FIG. 23A, to perform a next or subsequent suture.

Figure 26A:
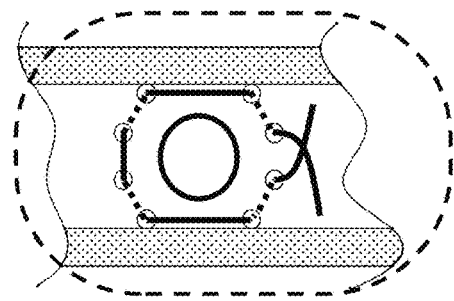
FIGS. 26A-26E are diagrams of stitching patterns produced by the apparatus of FIG. 1A.
Figure 26B:
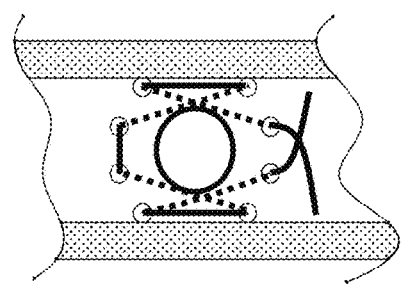
Figure 26C:
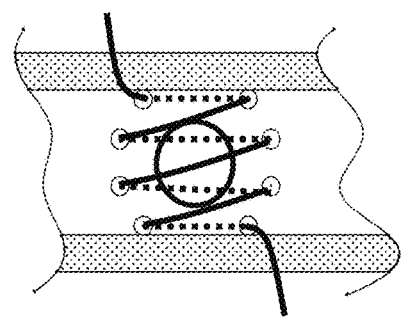
Figure 26D:
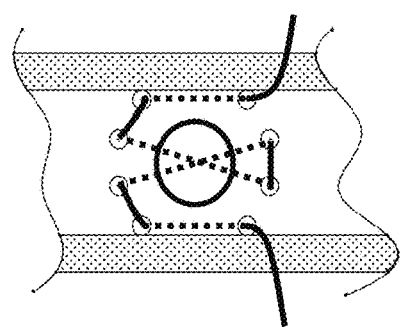
Figure 26E:
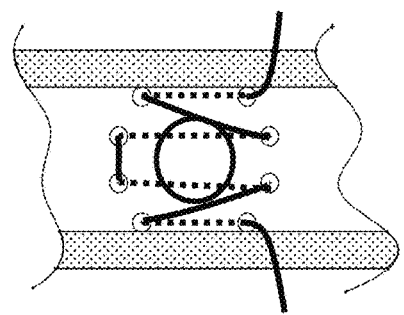

FIGS. 26A-26E show various suturing patterns produced in accordance with the suturing process of FIGS. 23A-25H, preferably including an even number of suturing (penetration) points. FIG. 26A shows a Purse-String Suture pattern (PSS), preferably with an even number of suturing points, and typically at least 4 suturing points.

Figure 26F:
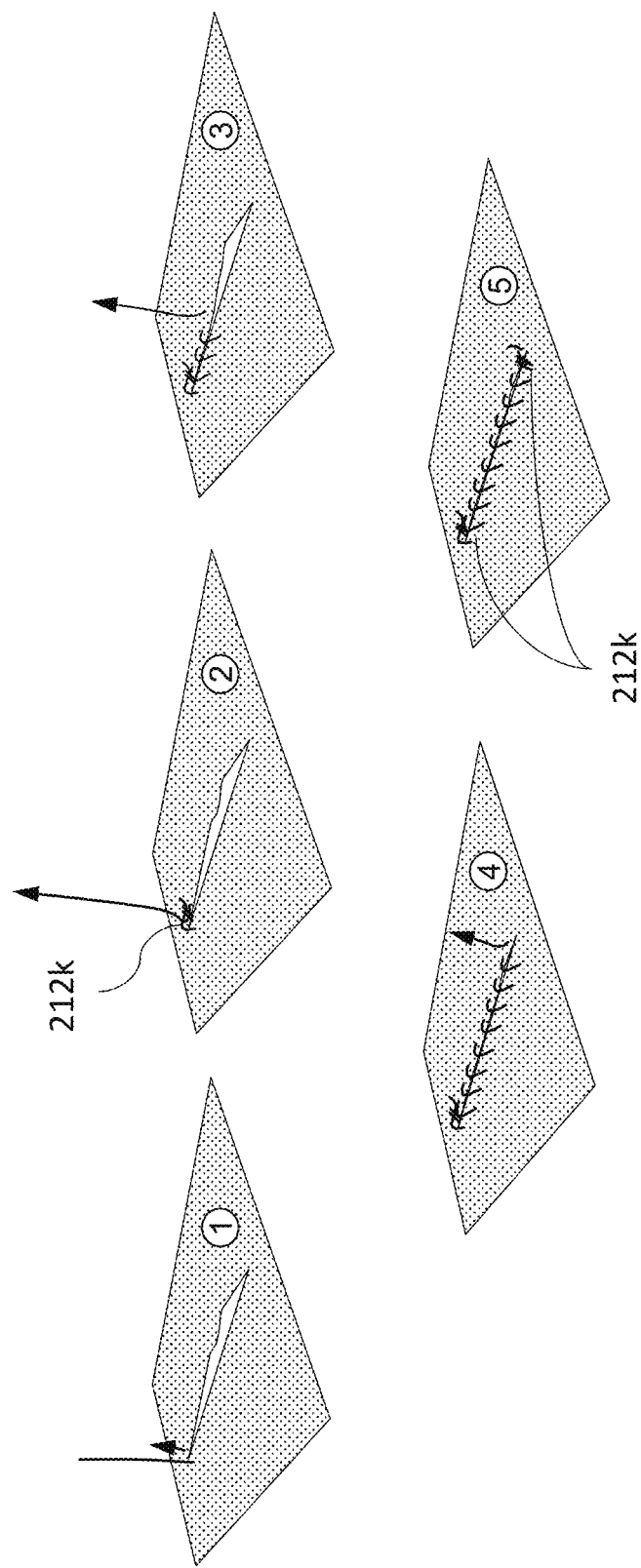
FIG. 26F is a diagram for producing a running stitch by the apparatus of FIG. 1A.

FIG. 26F shows stages, labeled 1-5, in the formation of a running stitch, and more specifically, a spiral suture, where some or all of the stitches cross between two sides of an incision or wound, or between adjacent edges of two side-by-side materials, and where relative motion between successive stitches advances the device along the edges of the material. Also illustrated here, but applicable also in other contexts, is an optional technique for anchoring one or both ends of a suture by performing multiple stiches in overlapping relation by repeated penetration in closely adjacent locations on the material, thereby achieving a self-locking or knotted fixing of the end of the suture. The knots are labeled here 212k. This technique may be used either at the beginning or end of a suture, or both.

Figure 27A:
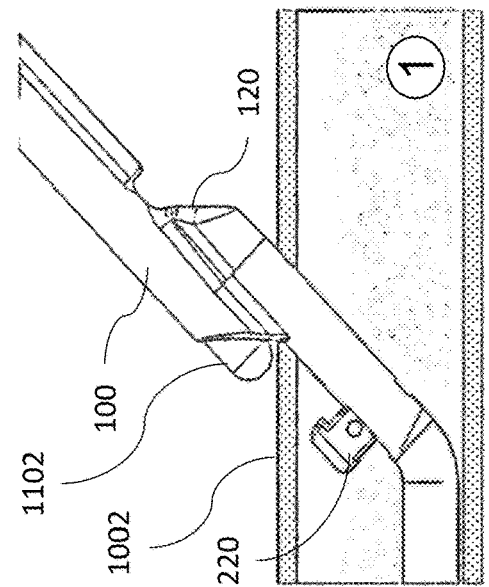
FIG. 27A-27C are diagrams of a preload member for the apparatus of FIG. 1A.
Figure 27B:
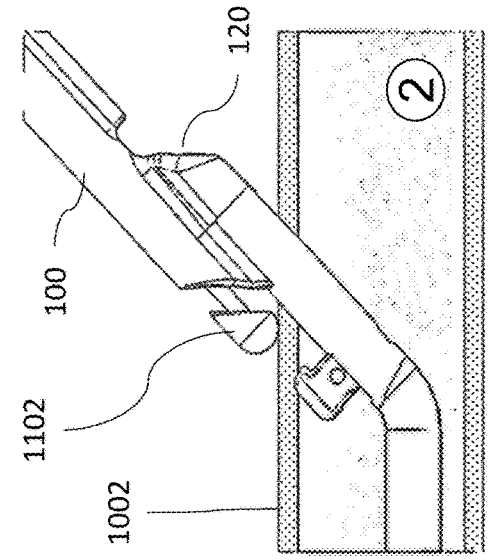
Figure 27C:
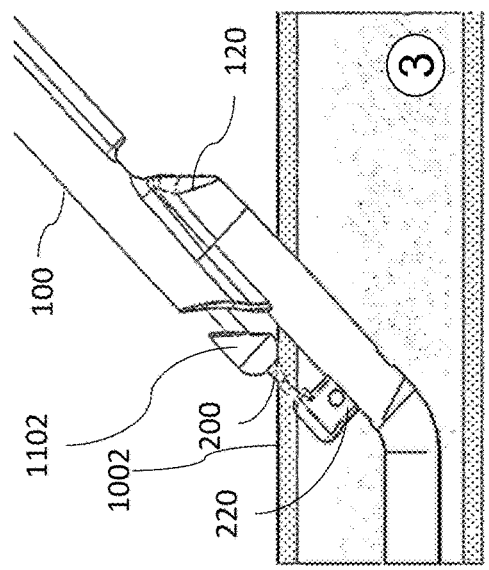

FIGS. 27-27C show an alternate embodiment, where the apparatus 100 includes a preload member 1102 as part of the needle transmitter 200. The preload member 1102 may be activated prior to any needle 210 insertion or retraction through a sutured media. The distal end 1102a of the preload member 1102, for example, has a spherical shape to allow implementation of pinching forces at different angles on tubal surfaces, such as blood vessel walls. FIG. 27A there is shown a cross section of a blood vessel 1002 with the suturing module in an initial position. In FIG. 27B, the blood vessel 1002 wall is pinched. In FIG. 27C, a suture is implemented.

Figure 28:
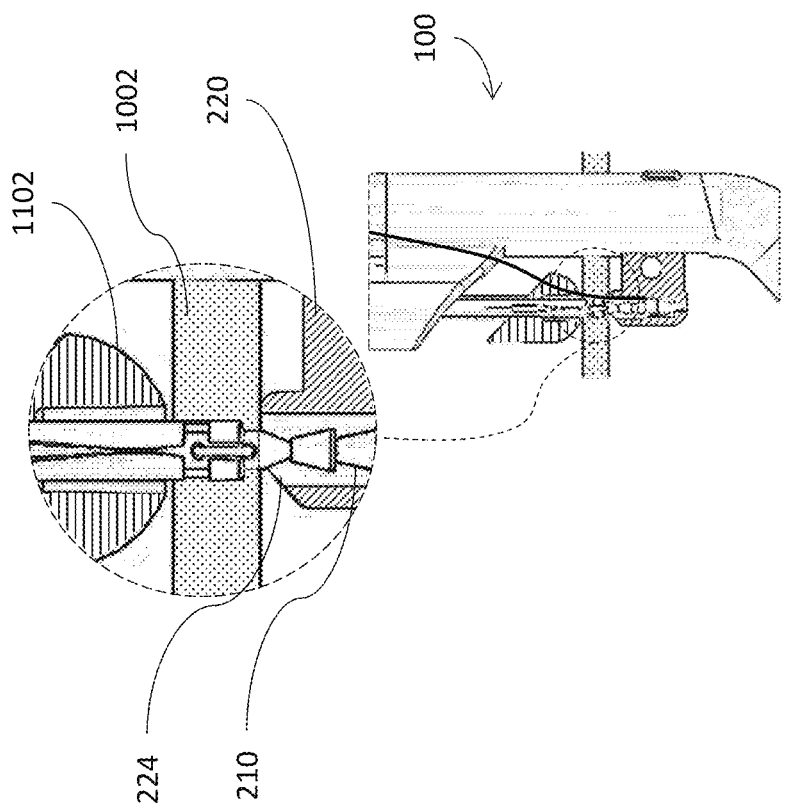
FIG. 28 is a diagram of needle insertion showing operation of a pinching member including a detailed view.

For example, as shown in FIG. 28, as part of the needle insertion process, the needle 210 is show held inside the needle receiver 200 by the ejector rod 206. While the needle transmitter 200 (i.e., tube 204) is retracting, the preload member 1102 is operating as a pinching member, as it is activated and locking the sutured media in place before beginning the suturing actions.

FIGS. 29A-29E detail a suture thread conveyance operation in the apparatus 100 of FIGS. 27A-27C. The suture thread, for example, is conveyed (feed) to the suturing mechanism 102, typically to the first piercing point concealed in the shaft 110. The conveying route ends with an access hole 1114 in the shaft 110, proximal to the rotation access of the apparatus 100 when used to make a suture hole, for example, a hole in a blood vessel. The thread 212 is typically routed from the access hole 1114 in the shaft 110 to the needle 210 on the proximal side of the suturing mechanism 102. This is the side opposite to the rotational motion of the apparatus 100 during implementation of a circular suturing pattern. This arrangement provides free rotation of the apparatus 100 without the need to drag the suture thread 212 passing to the first piercing point through the shaft 110 of the apparatus 100. FIG. 29A shows an initial state for the thread conveying. FIG. 29B shows an implementation of the first piercing point, for example, where the needle 210 is transferred into the needle receiver 220. FIG. 29C shows the suturing mechanism 102 being rotated (e.g., clockwise) to a new piercing point. FIG. 29D shows a new piercing point being implemented. FIG. 29E shows the needle 210 and connected suture 212 being pulled out at the second piercing point.

FIGS. 30A-30C show a sequence for suture conveying. For example, shown is a three-dimensional view of the suturing mechanism 102 progressing through a circular suture pattern, and optionally, a purse string suture (PSS) pattern. The suture thread 212, routed and feed to the first piercing point through a centrally located feed hole, to prevent wind or twist of the thread around the apparatus 100 (e.g., shaft 110 and bridging portion 120) during progress of the suture. FIG. 30A shows the implementation of the first piercing point. FIG. 30B shows the implementation of a third piercing point. FIG. 30C shows the implementation of a sixth piercing point. This sequence is illustrated here arbitrarily in the example of a suturing mechanism having a preload member 1102, but applies equally to implementations without such a preload member.

Alternately, other members, assemblies and methods may be used to convey the suture thread to the first piercing point. For example, the thread 212 may be routed freely along the shaft 110. The thread 212 may be temporarily glued to the shaft 110, and typically break away from the shaft 110 during rotation. The thread may be routed through a conduit, which is not part of the shaft 110. The conduit may be temporarily glued to the shaft 110 and typically breaks away from the shaft 110 during shaft 110 rotation. The aforementioned conduit may be connected to the shaft 110 by the use of ring-like hinges.

Another alternate is to convey the suture 212 directly through the shaft 110, via the hole 214 (FIG. 2A). A hole in the shaft 110, proximate to the suturing mechanism 102 and proximal to the line of rotation of the apparatus 100, during implementation of the circular suture will provide a routing line between the shaft 110 and the needle 210.

FIGS. 31A-31C show the apparatus 100 of FIGS. 267-27C in a suture retrieving process. After completion of a suture and before shuttle needle 210 retrieval, the needle transmitter 200, together with the needle 210 connected to the suture 212, may be pulled outward to a point where an internal locking member, such as a resilient member 1118, concealed in the shaft 110, may expand or otherwise be displaced and block the needle 210 from moving backwards. FIG. 31A shows the suture 212 as the needle 210 is initially retracted from the receiver 220. FIG. 31B shows the suture 210 in the shaft 110, with needle 210 retraction complete, and a locking member 1118, e.g., a spring, blocking further distal movement of the needle 210. Locking member 1118 thus serves as a shuttle lock, preventing release of shuttle needle 210 from the shaft, and allowing the user to apply considerable tension on the suture in an axial direction of the shaft without concern that the shuttle might become separated from shuttle transmitter 200. FIG. 31C shows the suture thread 212, as connected to the needle 210, is secured inside of the shaft 110 by the flexible member 1118 (as the suture 212 is moved proximally, in the direction of the arrow 1120).

Alternate embodiments of the apparatus 100 include those including a robotically or manually manipulatable shuttle transmitter and a robotically or manually manipulatable shuttle receiver. The respective transmitters/receivers can be aligned opposite each other at the first/second locations. This is achieved, for example, either by two robotic subsystems in spatial registration or by using imaging devices to allow for manual alignment of the robotic subsystems with respect to the tissue locations.

Although illustrated above in the context of a vascular closure device, it should be noted that the suturing mechanism of the present invention may readily be implemented in other contexts and for other procedures, including but not limited to: closure of incisions, wounds or defects in a single material; modification of a shape or other properties of a single material; attachment of two or more materials arranged in overlapping relation by suturing through both layers; bringing together of two edges of two regions of material which may be of the same type or bodies of different materials; and anchoring of a suture in a material by forming stitches in overlapping relation by repeated closely-adjacent passes through the material. The material in question for any and all of the above may be a natural biological tissue or any other material. The device and method may also perform suturing to interconnect a prosthetic device or material with natural tissue.

One additional set of procedures suitable for implementation using the suturing devices of the present invention are coronary procedures including, but not limited to, (PFO) Patent foramen ovale, (ASD) Atrial septal defect and other sorts of structural heart disease.

The disclosed subject matter is also applicable to a range of cardiovascular procedures including but not limited to, Left atrial appendage occlusion (LAAO), Left atrial appendage closure (LAAC), (AAA or EVAR) Aneurysm repairs and more generally in transcatheter valve repairs, and as a minimally invasive heart apex closure or a minimally invasive repair of left ventricular.

The disclosed subject matter is also applicable to a wide range of minimally invasive procedures including, but not limited to, suturing operations during endoscopic procedures, laparoscopic procedures, gastroscopic procedures, otoscopic procedures and minimally invasive gynecologic procedures.

Although the disclosed subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A suturing device for passing a suture through a material at a first location from a first side to a second side of the material and back through the material at a second location from the second side to the first side of the material, the suturing device comprising:
   (a) a shuttle for holding the suture, said shuttle having a pointed distal tip;
   (b) a shuttle transmitter comprising an elongated penetrating portion extending along and displaceable along an axis, said elongated penetrating portion including: an elongated shuttle holder having a distal engagement configuration adapted to hold said shuttle; and an elongated shuttle releaser extending along said penetrating portion and effective when displaced linearly along said axis relative to said shuttle holder to release said shuttle from engagement with said shuttle holder; and
   (c) a shuttle receiver for receiving said shuttle on the second side of the material,
   wherein said shuttle holder holds said shuttle so that said shuttle and said shuttle transmitter together form a first penetrating configuration movable so that said pointed distal tip of said shuttle penetrates the material at the first location and the shuttle engages the shuttle receiver,
   and wherein subsequent axial displacement of said shuttle releaser relative to said shuttle holder releases said shuttle from said shuttle holder for withdrawal of the shuttle transmitter through the material at the first location leaving the shuttle engaged with the shuttle receiver,
   and wherein said shuttle transmitter presents a second penetrating configuration with a penetrating tip, said second penetrating configuration being movable when aligned with the second location opposite said shuttle receiver so that the penetrating tip and said distal engagement configuration of said shuttle holder penetrate and pass through the material at the second location,
   said distal engagement configuration of said shuttle holder holding said shuttle for withdrawing the shuttle through the material at the second location.

2. The suturing device of claim 1, wherein, proximal to said pointed distal tip, said shuttle has a medial region for connection of the suture and a proximal region for engagement with said shuttle holder, said proximal region of said shuttle having an axial recess for receiving and aligning said penetrating tip of said shuttle transmitter with said shuttle after penetration of the material in said second penetrating configuration at the second location.

3. The suturing device of claim 2, wherein said shuttle holder comprises a tubular element configured to fit over and engage said proximal region of said shuttle.

4. The suturing device of claim 3, wherein said tubular element is formed from a superelastic alloy.

5. The suturing device of claim 3, wherein said tubular element is formed with at least one resilient feature for engaging said proximal region of said shuttle.

6. The suturing device of claim 3, wherein said releaser comprises a rod deployed within said tubular element, said rod and said tubular element being differentially axially displaceable such that, when said rod is advanced relative to said tubular element, said rod engages said axial recess of said shuttle, applying force on said shuttle so as to eject said shuttle from said shuttle holder and projects from said shuttle holder to provide said penetrating tip of said second penetrating configuration.

7. The suturing device of claim 1, further comprising a bridging portion in mechanical communication with said shuttle transmitter and with said shuttle receiver so as to maintain alignment of said shuttle transmitter with said shuttle receiver.

8. The suturing device of claim 7, wherein said shuttle receiver is retractably mounted to said bridging portion.

9. The suturing device of claim 8, wherein extension of said shuttle receiver from a retracted position to an extended position is implemented by displacement of an actuator element through a first range of motion, and wherein further displacement of said actuator element beyond said first range of motion locks said shuttle receiver against retraction.

10. The suturing device of claim 8, wherein extension of said shuttle receiver from a retracted position to an extended position is implemented by displacement of an actuator element formed from a shape-memory alloy that is pre-shaped to facilitate retraction of said shuttle receiver.

11. The suturing device of claim 7, further comprising a dilator deployed distally to said bridging portion, said dilator being interconnected with said bridging portion via a deflectable joint.

12. The suturing device of claim 7, further comprising:
   a shaft extending proximally from said bridging portion;
   a bleeder port opening in said bridging portion; and,
   a bleeder tube extending from the bleeder port opening proximally along said shaft to a bleeder tube outlet.

13. The suturing device of claim 7, further comprising:
   a suture feed volume in communication with a suture release aperture; and
   a suture located partially within said suture feed volume and extending from said suture release aperture to said shuttle, said suture being attached to said shuttle,
   wherein said shuttle transmitter and said shuttle receiver are aligned along said axis, at least part of said bridging portion being offset from said axis in a first direction, and wherein said suture release aperture is oriented to face away from said axis.

14. The suturing device of claim 7, further comprising a shaft extending proximally from said bridging portion, said shuttle transmitter being axially displaceable within a channel of said shaft and being retractable to a position in which said shuttle transmitter and said shuttle are located fully within the channel.

15. The suturing device of claim 7, wherein said shuttle receiver is formed with a pocket, said shuttle being received within said pocket, and a part of said shuttle holder being insertable into said pocket for engaging said shuttle and withdrawing said shuttle from said pocket.

16. The suturing device of claim 1, wherein said shuttle transmitter has said penetrating portion having a penetrating length for traversing the material at the first and second locations, said penetrating length being larger than a length of said shuttle.

17. The suturing device of claim 1, wherein said shuttle transmitter is associated with a flexible shaft.

18. The suturing device of claim 1, wherein said shuttle receiver is formed with a pocket for receiving said shuttle and a resilient retaining element associated with said pocket and configured for releasably retaining said shuttle within said pocket.

19. A suturing device for passing a suture through a material at a first location from a first side to a second side of the material and back through the material at a second location from the second side to the first side of the material, the suturing device comprising:
(a) a shuttle having a pointed distal tip, a suture-connection region for holding the suture and an engagement region;
(b) a shuttle transmitter comprising an elongated penetrating portion extending along and displaceable along an axis, said elongated penetrating portion having a penetrating length, said elongated penetrating portion comprising: an elongated shuttle holder having a distal engagement configuration adapted to engage said engagement region to hold said shuttle; and an elongated shuttle releaser extending along said penetrating length, and effective when displaced linearly along said axis relative to said shuttle holder to release said shuttle from engagement with said shuttle holder; and
(c) a shuttle receiver for receiving said shuttle on the second side of the material,
wherein, in a first relative position of said shuttle holder and said shuttle releaser, said shuttle holder holds said shuttle so that said shuttle and said shuttle transmitter together form a first penetrating configuration movable along said axis so that said pointed distal tip of said shuttle and at least part of said penetrating length of said shuttle transmitter penetrate the material at the first location and the shuttle engages the shuttle receiver,
and wherein axial displacement of said shuttle releaser relative to said shuttle holder to a second relative position releases said shuttle from said shuttle holder for withdrawal of the shuttle transmitter through the material at the first location leaving the shuttle engaged with the shuttle receiver,
and wherein, in said second relative position, said shuttle transmitter presents a second penetrating configuration with a penetrating tip movable when aligned with the second location opposite said shuttle receiver so that the penetrating tip and at least part of said penetrating length penetrate the material at the second location,
and wherein, after reverting to said first relative position of said shuttle holder relative to said shuttle releaser, said shuttle holder holds said shuttle for withdrawing the shuttle through the material at the second location.

20. The suturing device of claim 19, wherein said shuttle holder has a tubular form, and wherein said shuttle releaser comprises a rod deployed within said tubular form and terminating in a distal point, and wherein a proximal end of said shuttle has an axial recess,
and wherein a distal portion of said tubular form provides said distal engagement configuration that engages an external surface of said engagement region of said shuttle,
such that relative motion of said shuttle releaser relative to said shuttle holder from said first relative position to said second relative position brings said distal point of said rod into engagement with said axial recess of said shuttle and ejects said shuttle from said distal engagement configuration.

21. A suturing method for suturing a material comprising the steps of:
(a) providing the suturing device of claim 1;
(b) advancing the shuttle transmitter in the first penetrating configuration so that at least the shuttle penetrates the material at the first location and engages the shuttle receiver;
(c) releasing the shuttle from the shuttle transmitter and withdrawing the shuttle transmitter from the material without the shuttle;
(d) repositioning the shuttle transmitter and the shuttle receiver so that the shuttle transmitter and the shuttle are aligned on opposite sides of the material at the second location;
(e) advancing the shuttle transmitter in the second penetrating configuration so as to penetrate the material at the second location in a direction towards the shuttle;
(f) holding the shuttle with the shuttle transmitter and withdrawing the shuttle through the material at the second location, the shuttle drawing the suture such that the suture extends into the material at the first location and out of the material at the second location.

22. The suturing method of claim 21, further comprising repeating steps (b) and (c) at at least one additional suture entry location on the material and repeating steps (d) and (e) at at least one additional suture exit location on the material, thereby forming a multi-stitch pattern.

23. The suturing method of claim 22, wherein said multi-stitch pattern substantially circumscribes an opening in the material.

24. The suturing method of claim 23, wherein said multi-stitch pattern is a purse string suture substantially circumscribing the opening in the material.

* * * * *